(12) United States Patent
Aoki et al.

(10) Patent No.: US 11,182,880 B2
(45) Date of Patent: Nov. 23, 2021

(54) IMAGE PROCESSING DEVICE, IMAGE PROCESSING METHOD, AND PROGRAM

(71) Applicant: Sony Corporation, Tokyo (JP)

(72) Inventors: Suguru Aoki, Tokyo (JP); Ryuta Satoh, Kanagawa (JP); Atsushi Ito, Kanagawa (JP); Hideki Oyaizu, Tokyo (JP); Takeshi Uemori, Tokyo (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 16/642,389

(22) PCT Filed: Aug. 30, 2018

(86) PCT No.: PCT/JP2018/032076
§ 371 (c)(1),
(2) Date: Feb. 27, 2020

(87) PCT Pub. No.: WO2019/049762
PCT Pub. Date: Mar. 14, 2019

(65) Prior Publication Data
US 2020/0193569 A1   Jun. 18, 2020

(30) Foreign Application Priority Data

Sep. 5, 2017   (JP) .............................. JP2017-170034

(51) Int. Cl.
*G06T 5/00*   (2006.01)
*G06T 5/50*   (2006.01)

(52) U.S. Cl.
CPC ................ *G06T 5/003* (2013.01); *G06T 5/50* (2013.01); *G06T 2207/10024* (2013.01); *G06T 2207/10048* (2013.01); *G06T 2207/20201* (2013.01)

(58) Field of Classification Search
CPC . G06T 5/003; G06T 5/50; G06T 2207/10024; G06T 2207/10048; G06T 2207/20201
See application file for complete search history.

(56) References Cited

U.S. PATENT DOCUMENTS 8,867,856 B2 * 10/2014 Wang ...................... G06T 5/003
                                                        382/254
9,235,876 B2 *  1/2016 Hogasten ............. H04N 5/3658
(Continued)

FOREIGN PATENT DOCUMENTS

CN      103544681 B   6/2017
EP      2 189 939 A2  5/2010
(Continued)

OTHER PUBLICATIONS

U.S. Appl. No. 16/642,392, filed Feb. 27, 2020, Aoki et al.
International Search Report and Written Opinion dated Nov. 6, 2018 in connection with International Application No. PCT/JP2018/032077.
(Continued)

*Primary Examiner* — Phuoc Tran
(74) *Attorney, Agent, or Firm* — Wolf, Greenfield & Sacks, P.C.

(57) ABSTRACT

Methods and apparatus for image processing are provided. The method comprises receiving input of a visible-ray image and a far-infrared-ray image obtained by photographing a same subject, estimating a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest, and performing a correction process on the visible-ray image based, at least in part, on the blur estimation result to generate a corrected visible-ray image from which the blur is reduced, wherein generating the corrected visible-ray image comprises apply-
(Continued)

ing, to the visible ray image, an inverse filter having an inverse characteristic to a characteristic of the selected filter.

14 Claims, 25 Drawing Sheets

(56) References Cited

U.S. PATENT DOCUMENTS

| | | |
|---|---|---|
| 2010/0246989 A1 | 9/2010 | Agrawal et al. |
| 2013/0120601 A1 | 5/2013 | Han |
| 2020/0193570 A1 | 6/2020 | Aoki et al. |

FOREIGN PATENT DOCUMENTS

| | | |
|---|---|---|
| JP | 2002203240 A | 7/2002 |
| JP | 2003-209735 A | 7/2003 |
| JP | 2008176735 A | 7/2008 |
| JP | 2009111596 A | 5/2009 |
| JP | 20131715003 A | 9/2013 |
| JP | 2014157452 A | 8/2014 |
| JP | 2015064890 A | 4/2015 |
| WO | WO-2016194177 A | 12/2016 |

OTHER PUBLICATIONS

International Preliminary Report on Patentability dated Mar. 19, 2020 in connection with International Application No. PCT/JP2018/032076.

International Preliminary Report on Patentability dated Mar. 19, 2020 in connection with International Application No. PCT/JP2018/032077.

Yamashita et al., RGB-NIR imaging with exposure bracketing for joint denoising and deblurring of low-light color images. 2017 IEEE International Conference on Acoustics, Speech, and Signal Processing (ICASSP). Mar. 2017. pp. 6055-6059.

International Search Report and Written Opinion dated Nov. 19, 2018 in connection with International Application No. PCT/JP2018/032076.

Matsui et al., Image Enhancement of Low-Light Scenes with Near-Infrared Flash Images. Lecture Notes in Computer Science. Sep. 23, 2009. pp. 213-223.

Yue et al., Deblur a blurred RGB image with a sharp NIR image through local linear mapping. 2014 IEEE International Conference on Multimedia and Expo (ICME). Jul. 14, 2014. 6 pages. DOI:10.1109/ICME.2014.6890310.

\* cited by examiner

[Fig. 1]
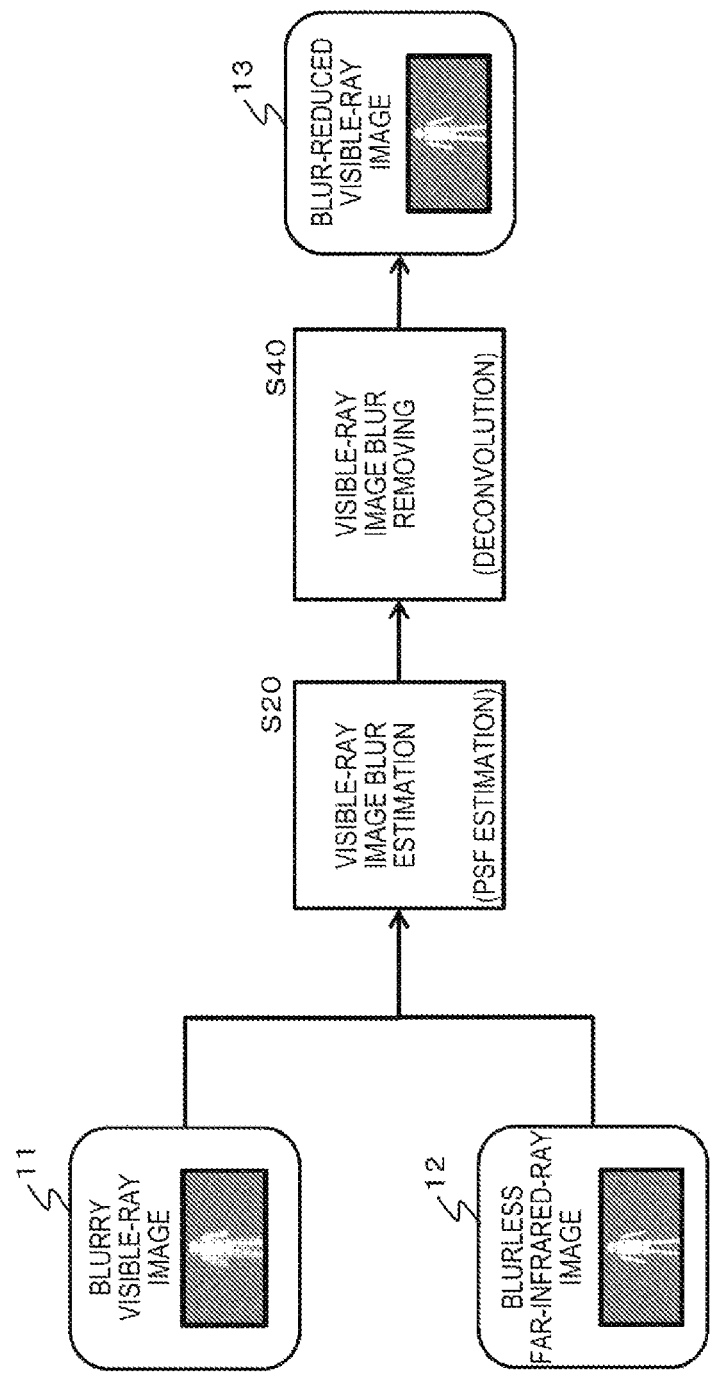

[Fig. 2]
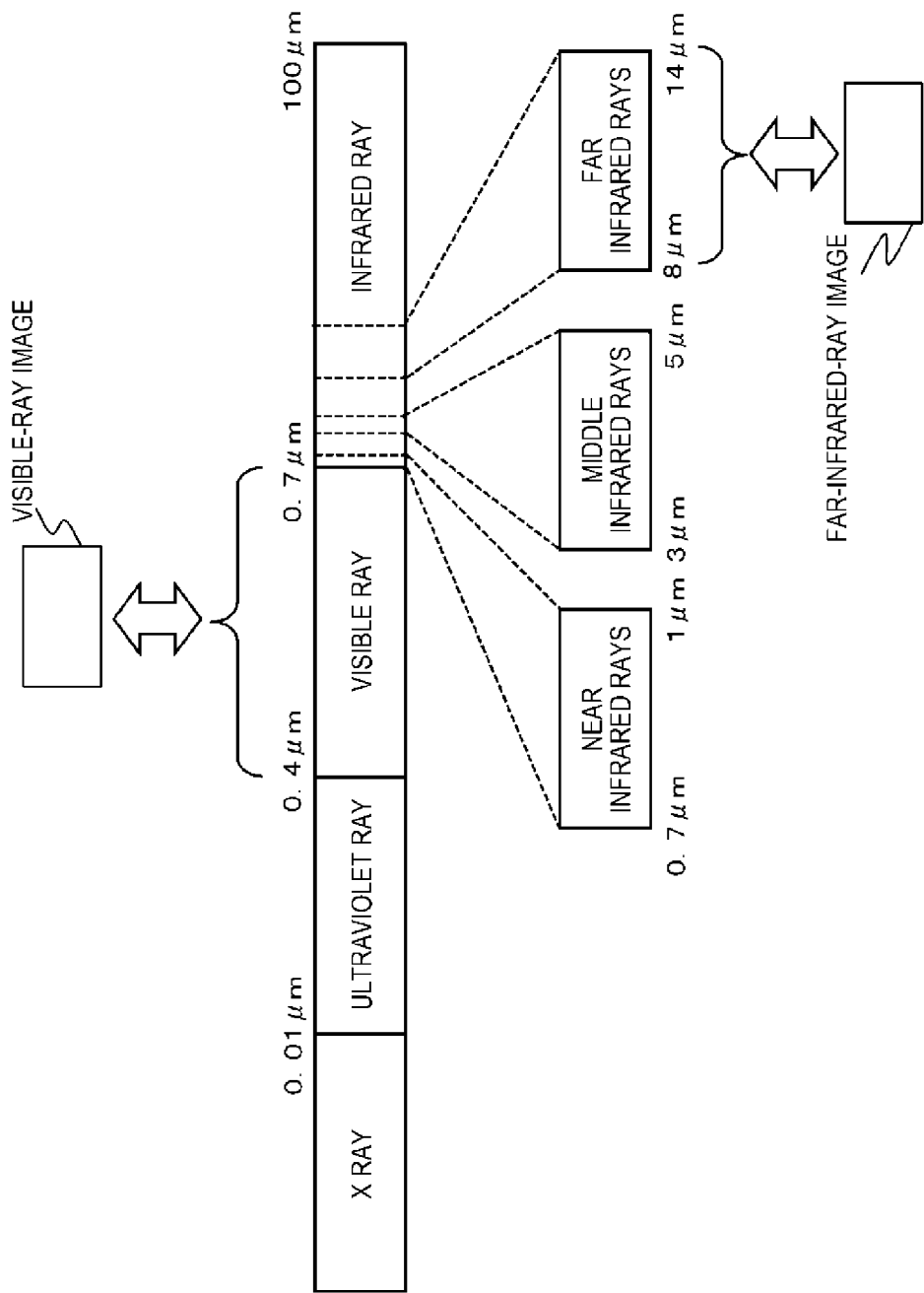

[Fig. 3]
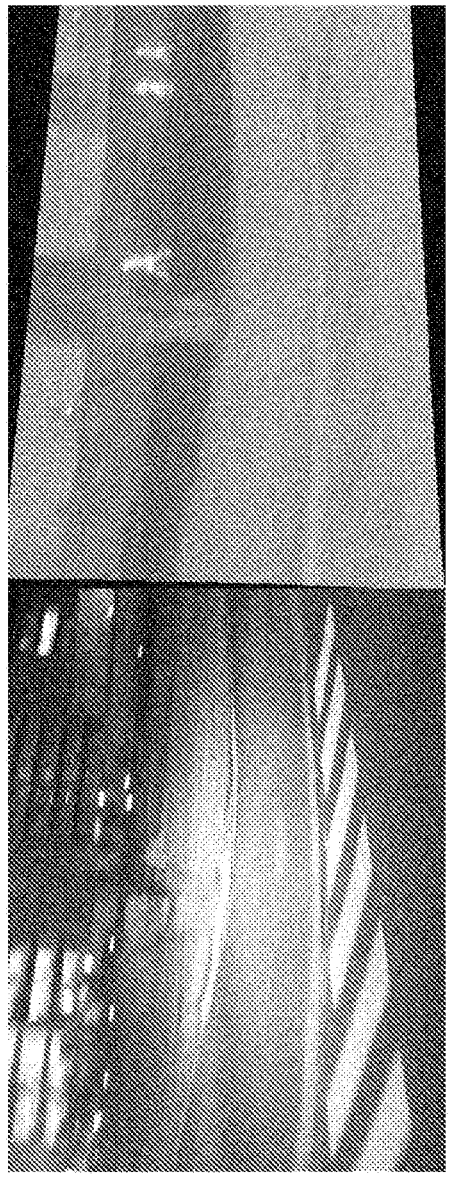

[Fig. 4]
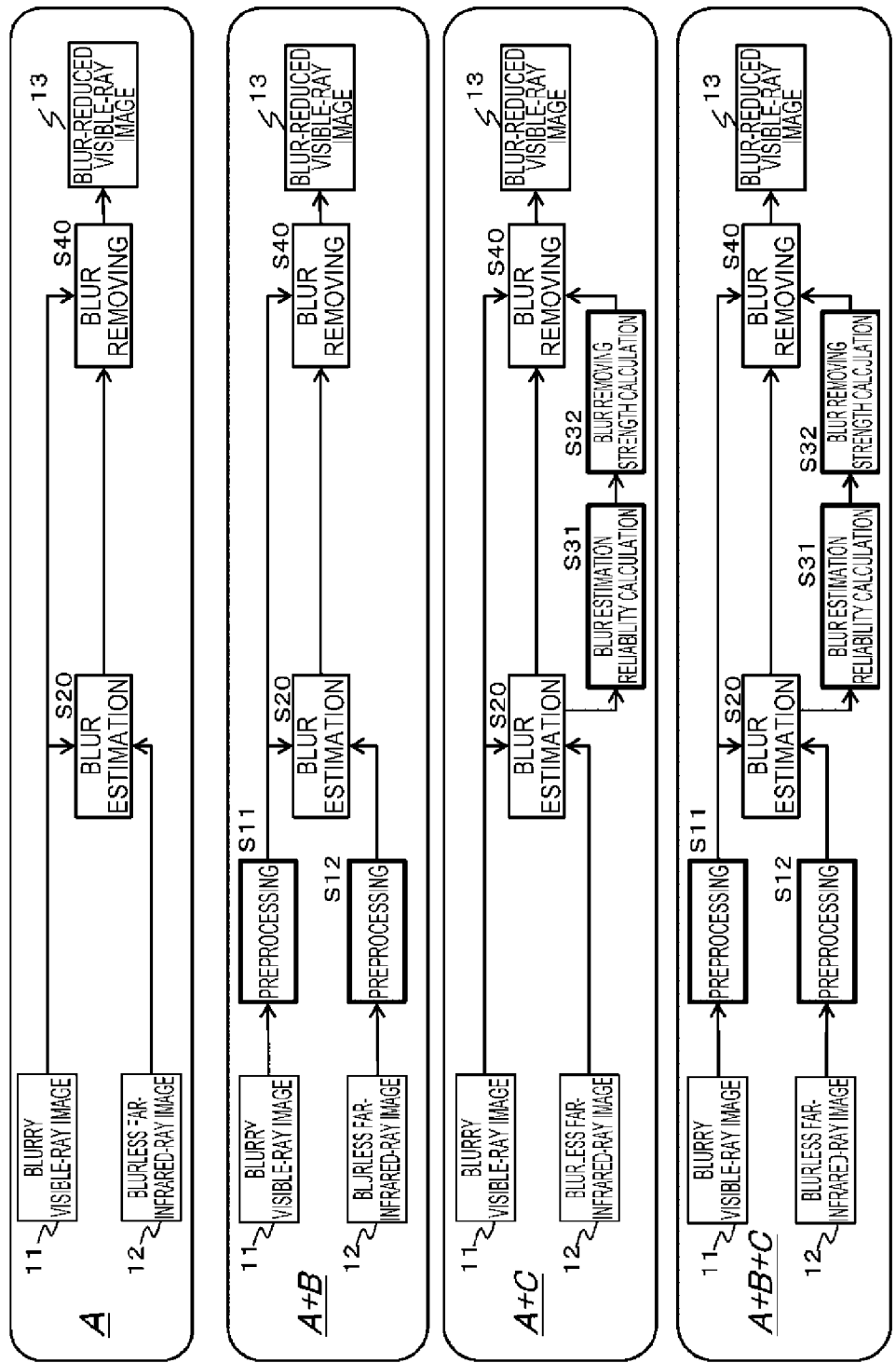

[Fig. 5]
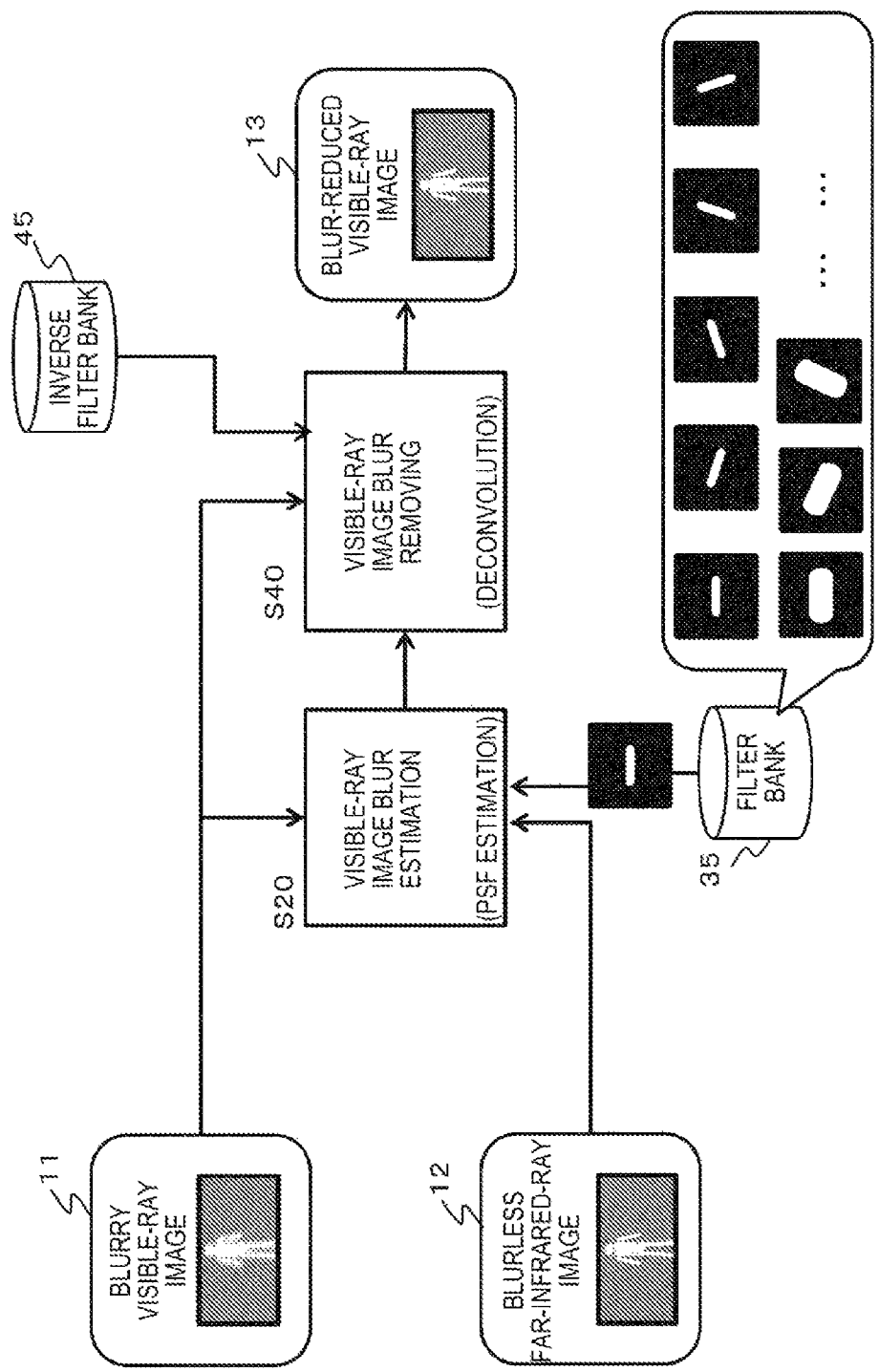

[Fig. 6]
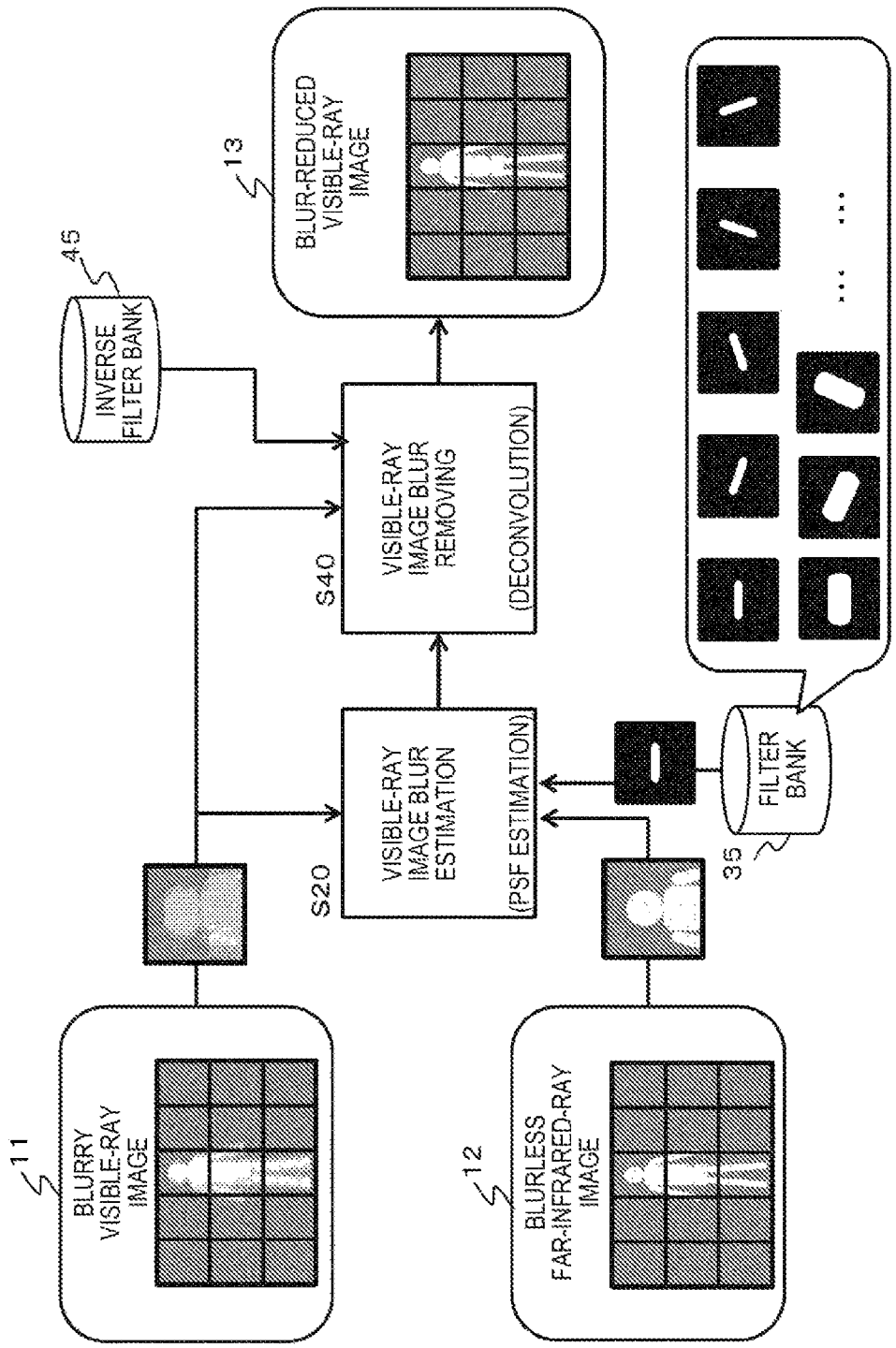

[Fig. 7]
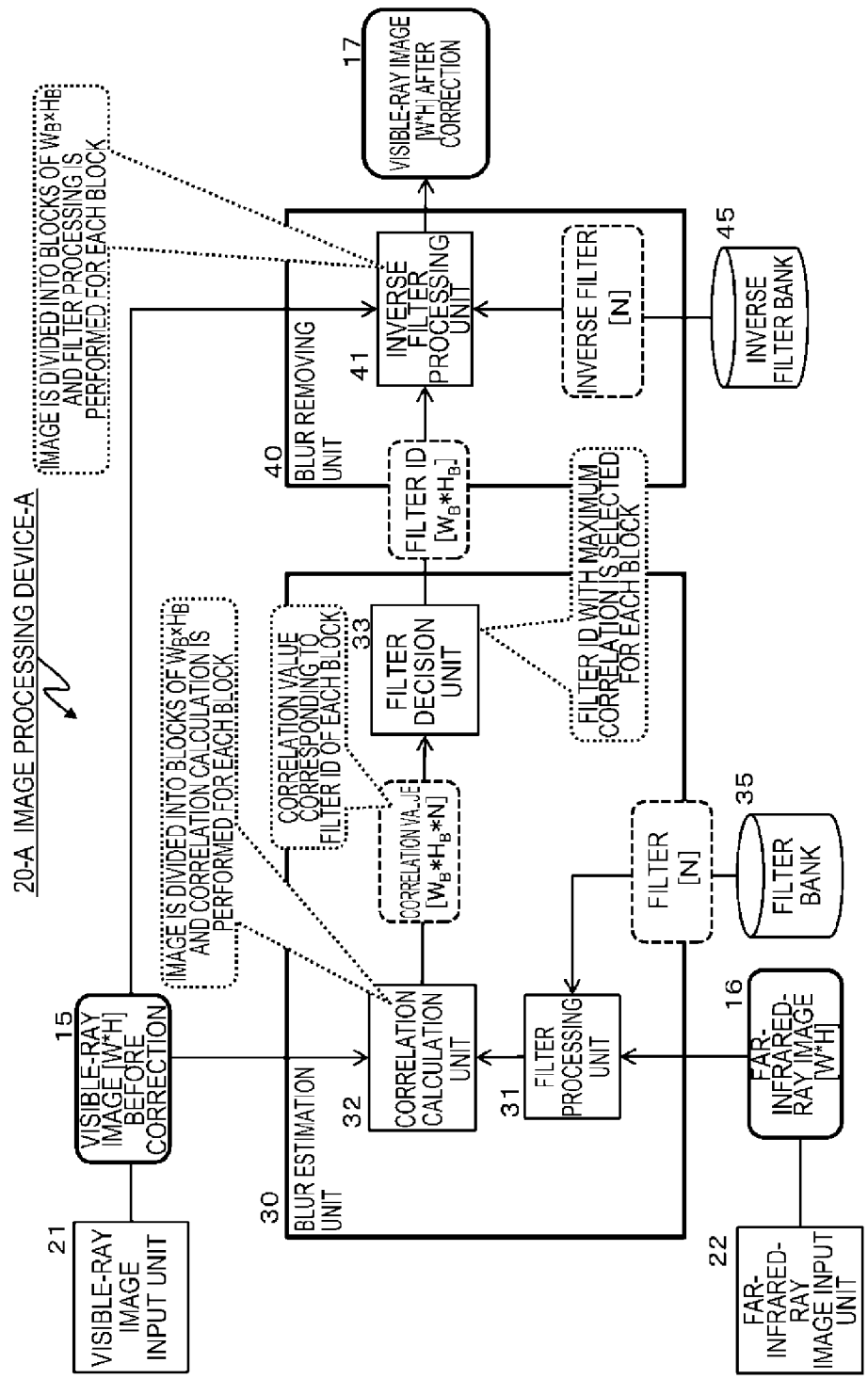

[Fig. 8]
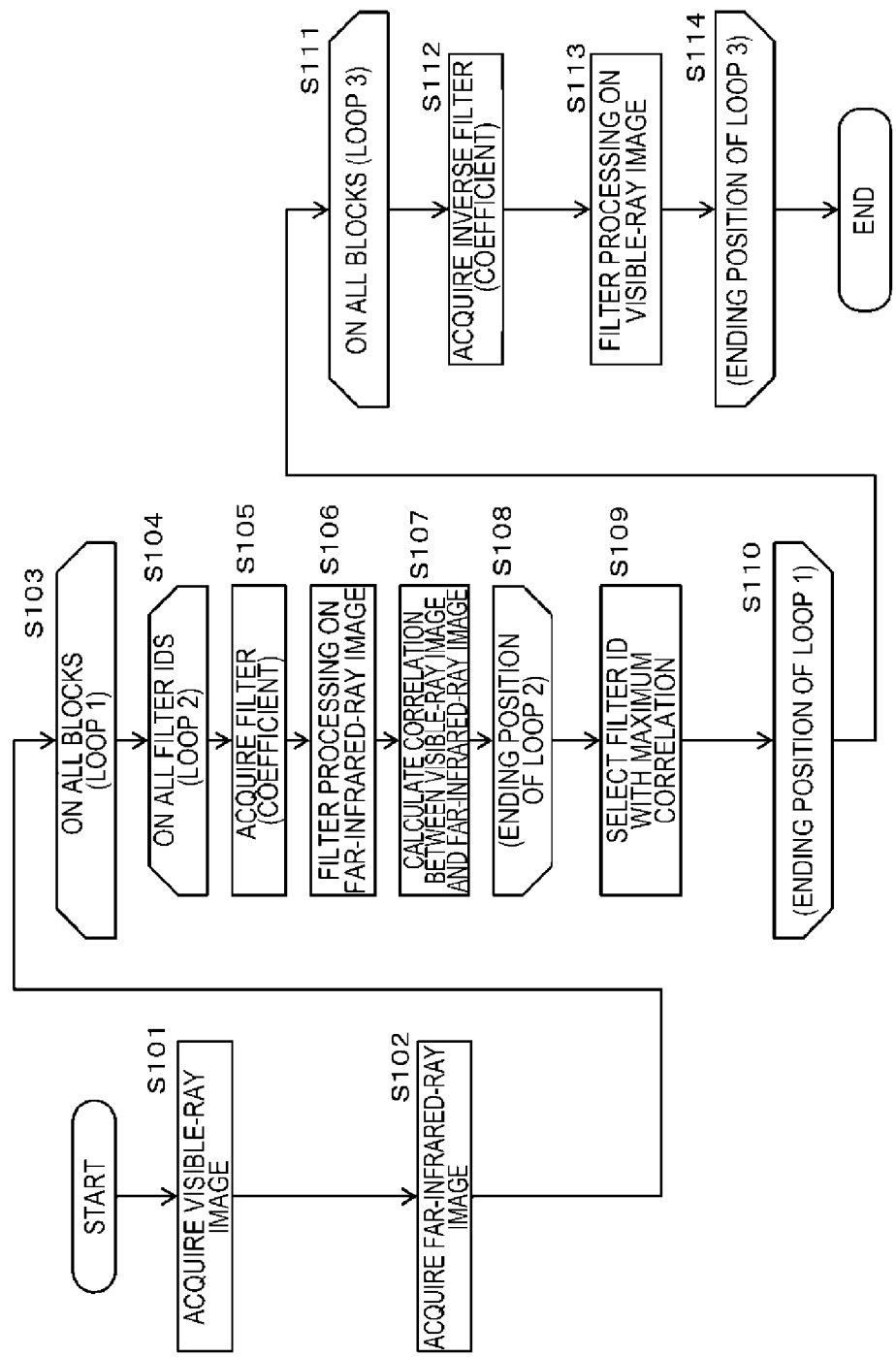

[Fig. 9]
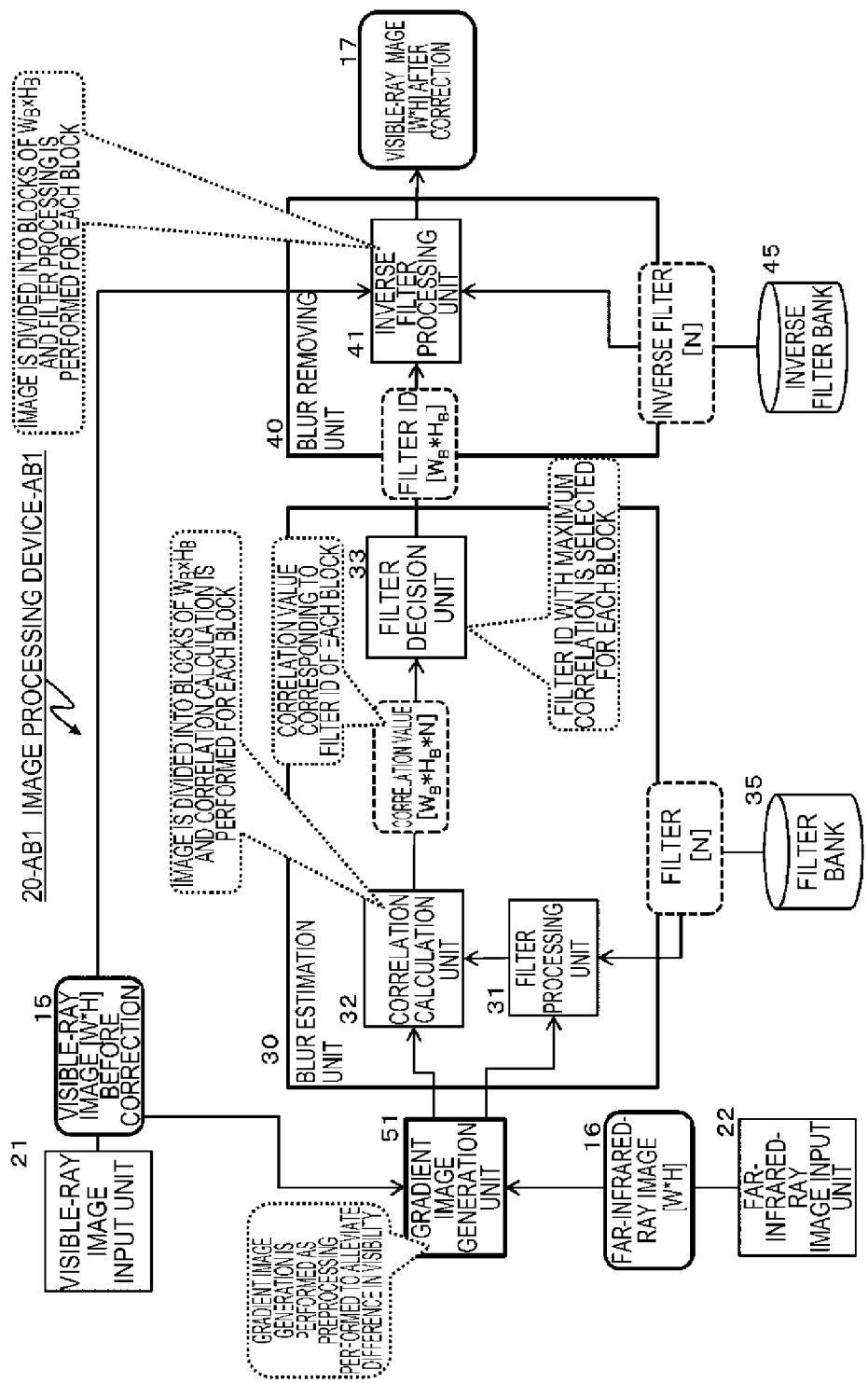

[Fig. 10]
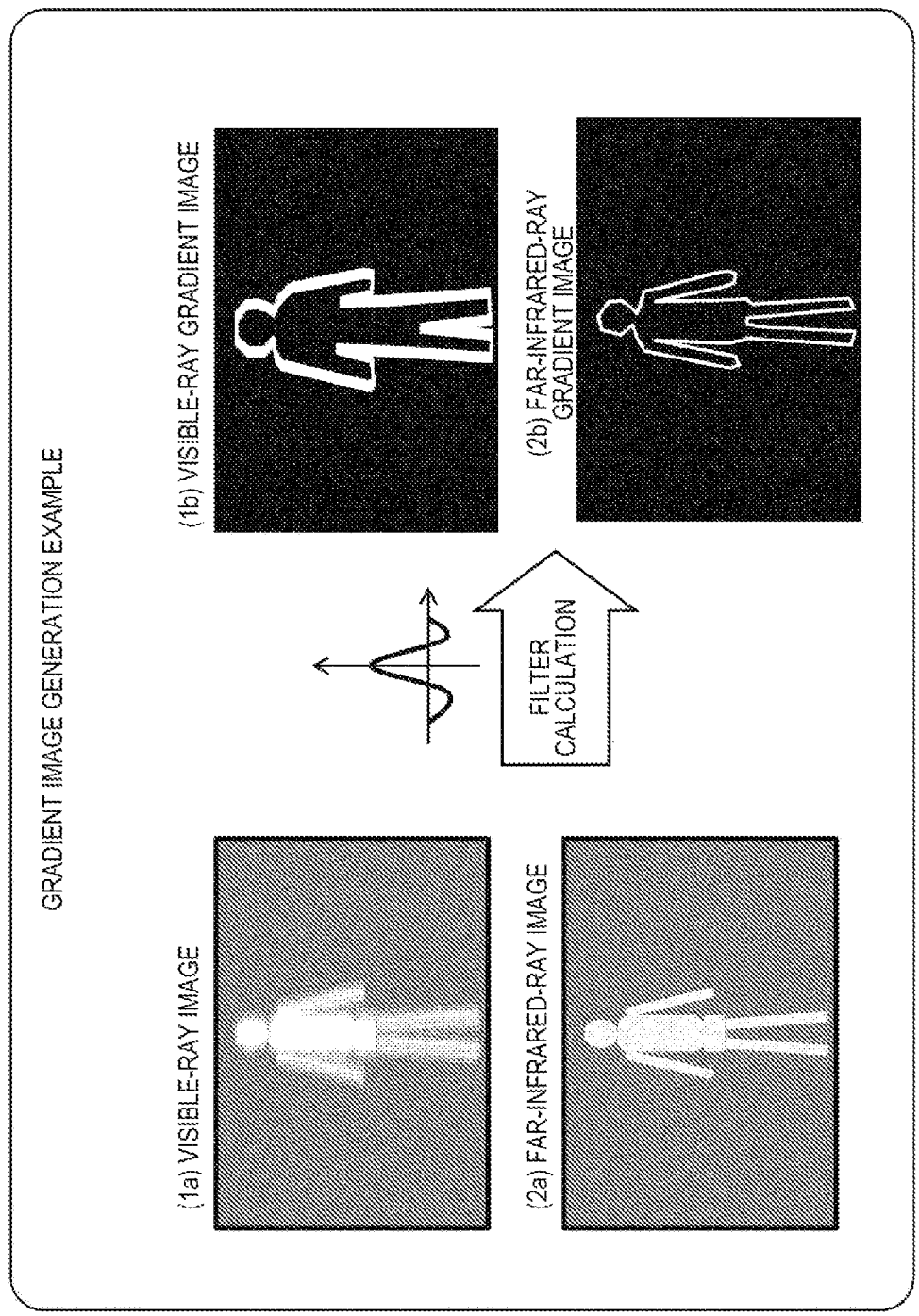

[Fig. 11]
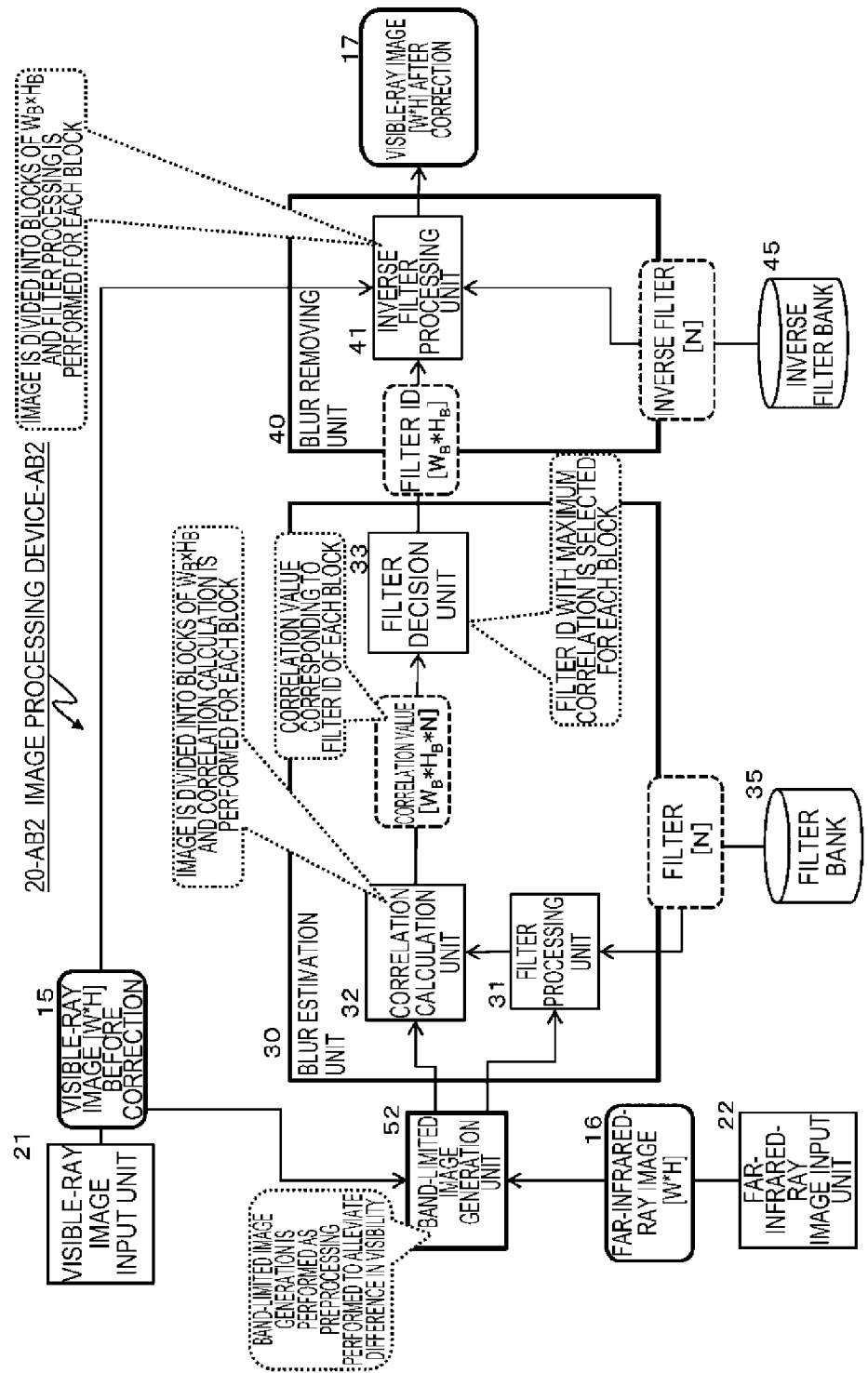

[Fig. 12]
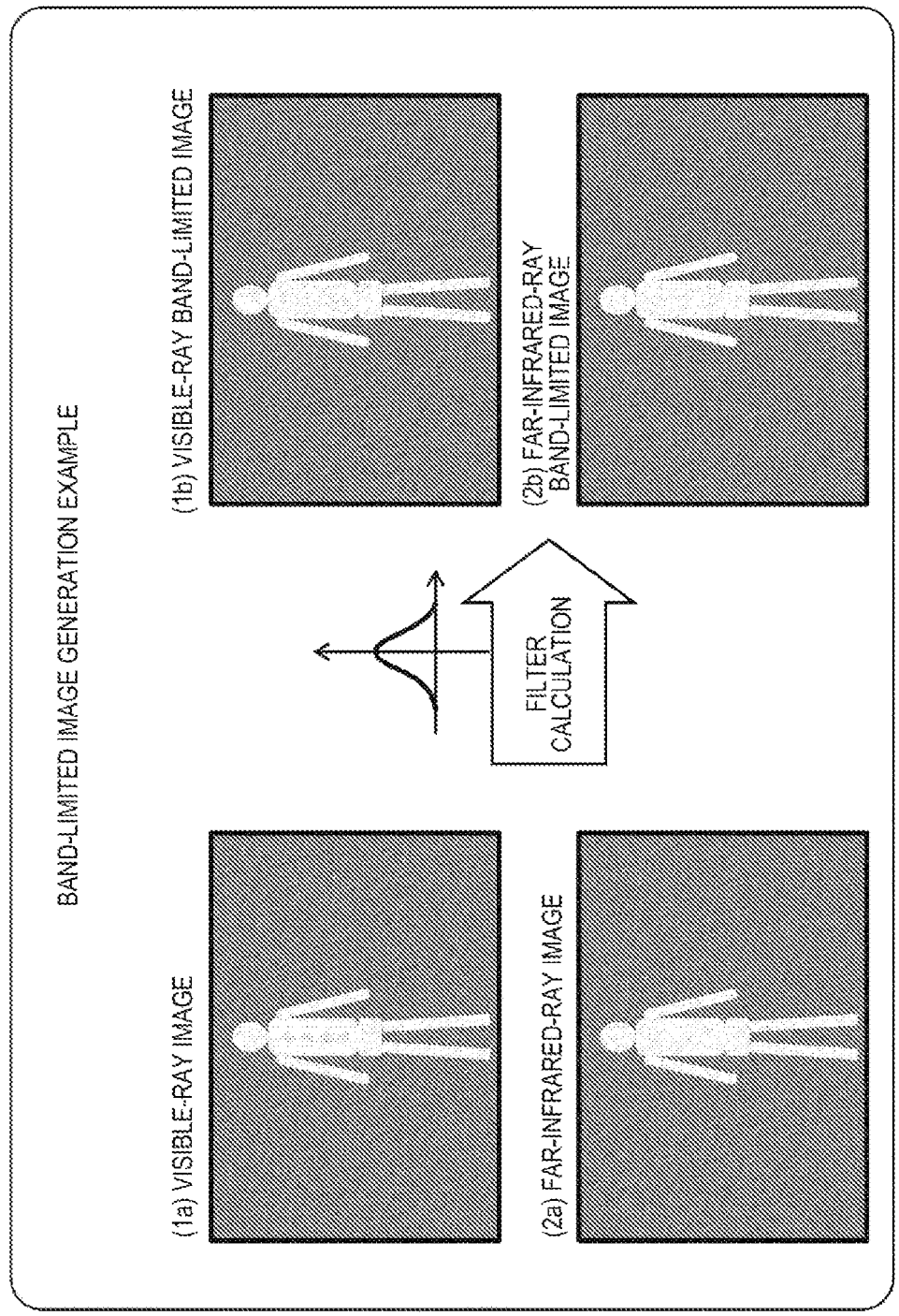

[Fig. 13]
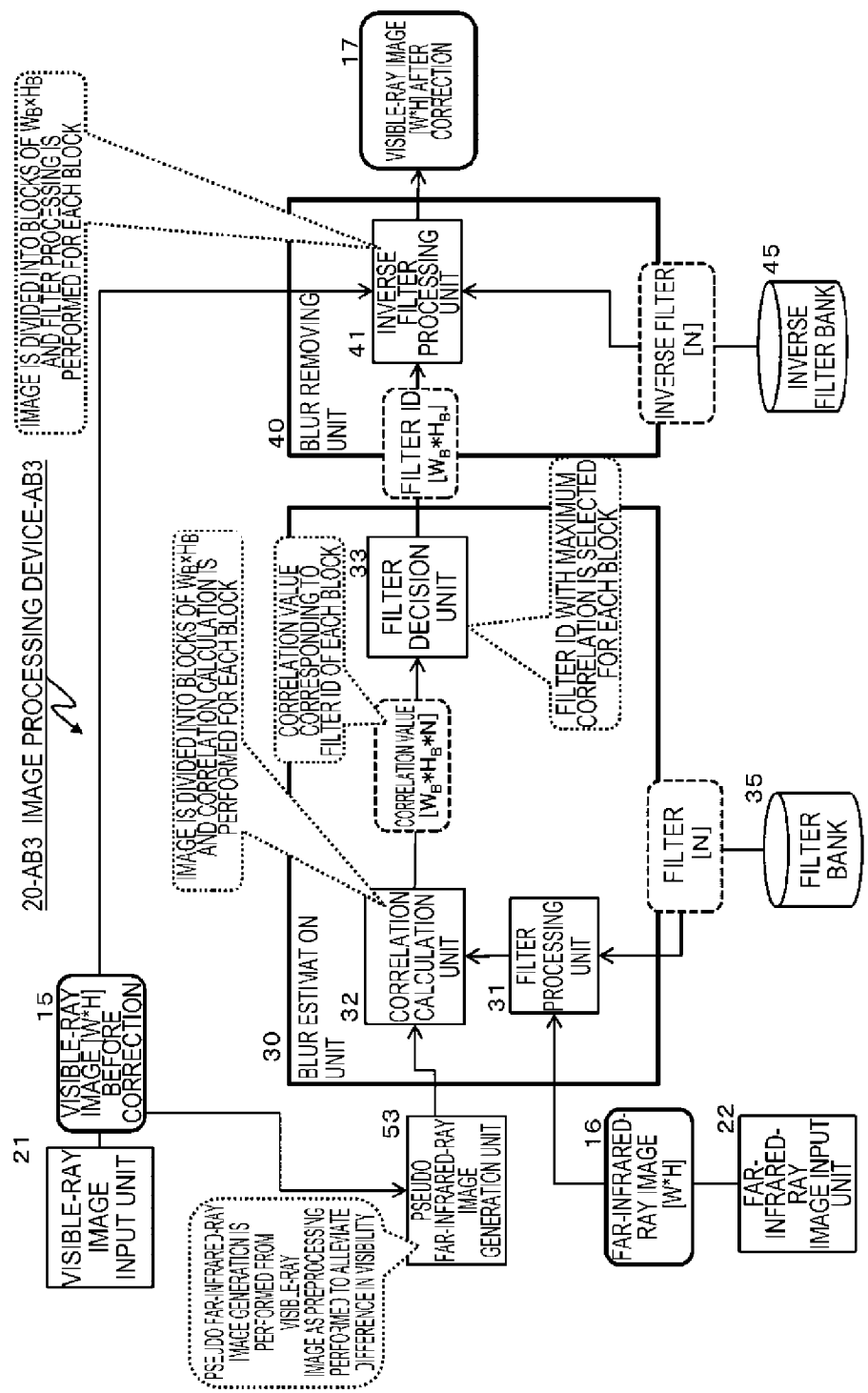

[Fig. 14]
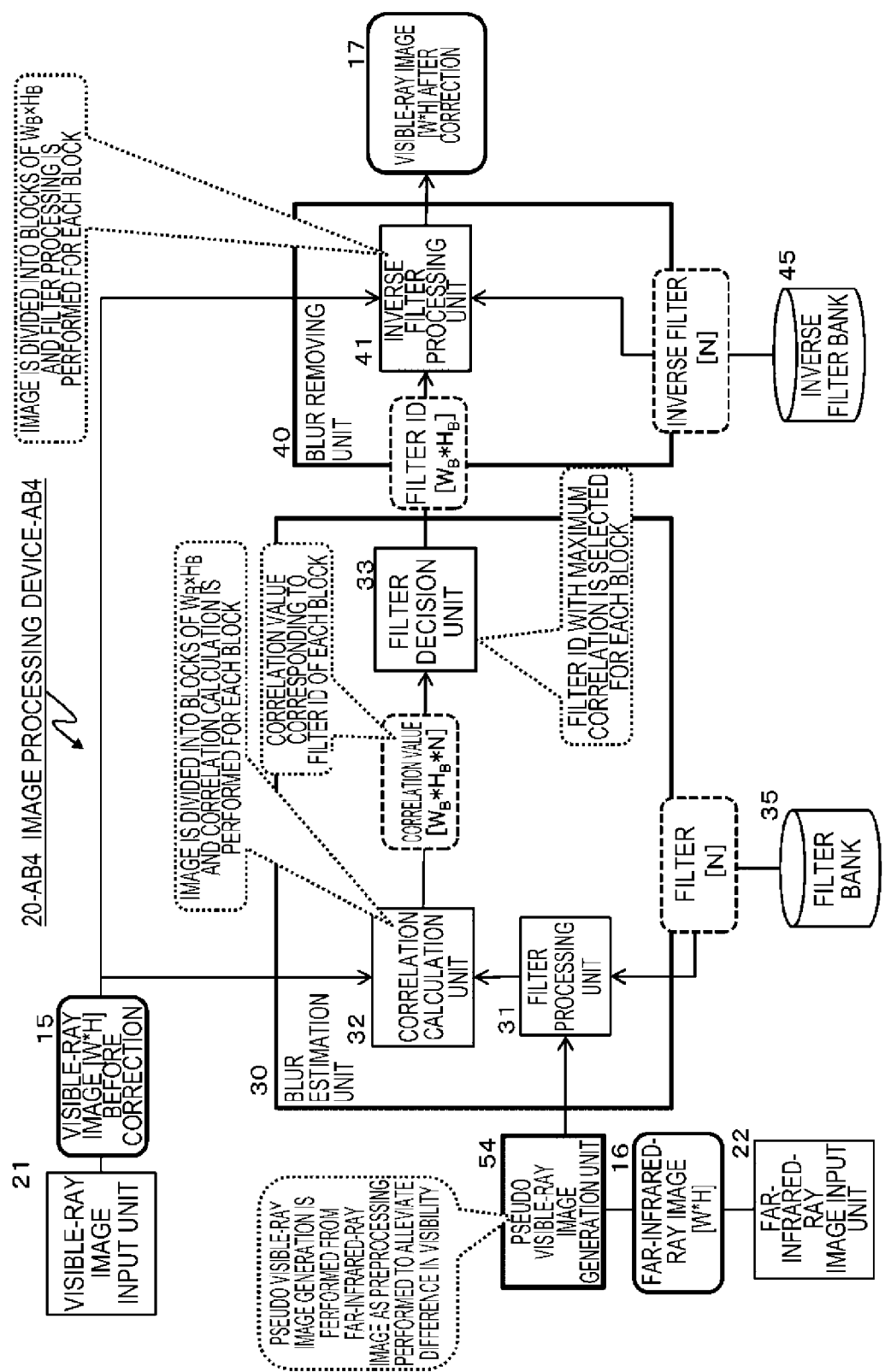

[Fig. 15]
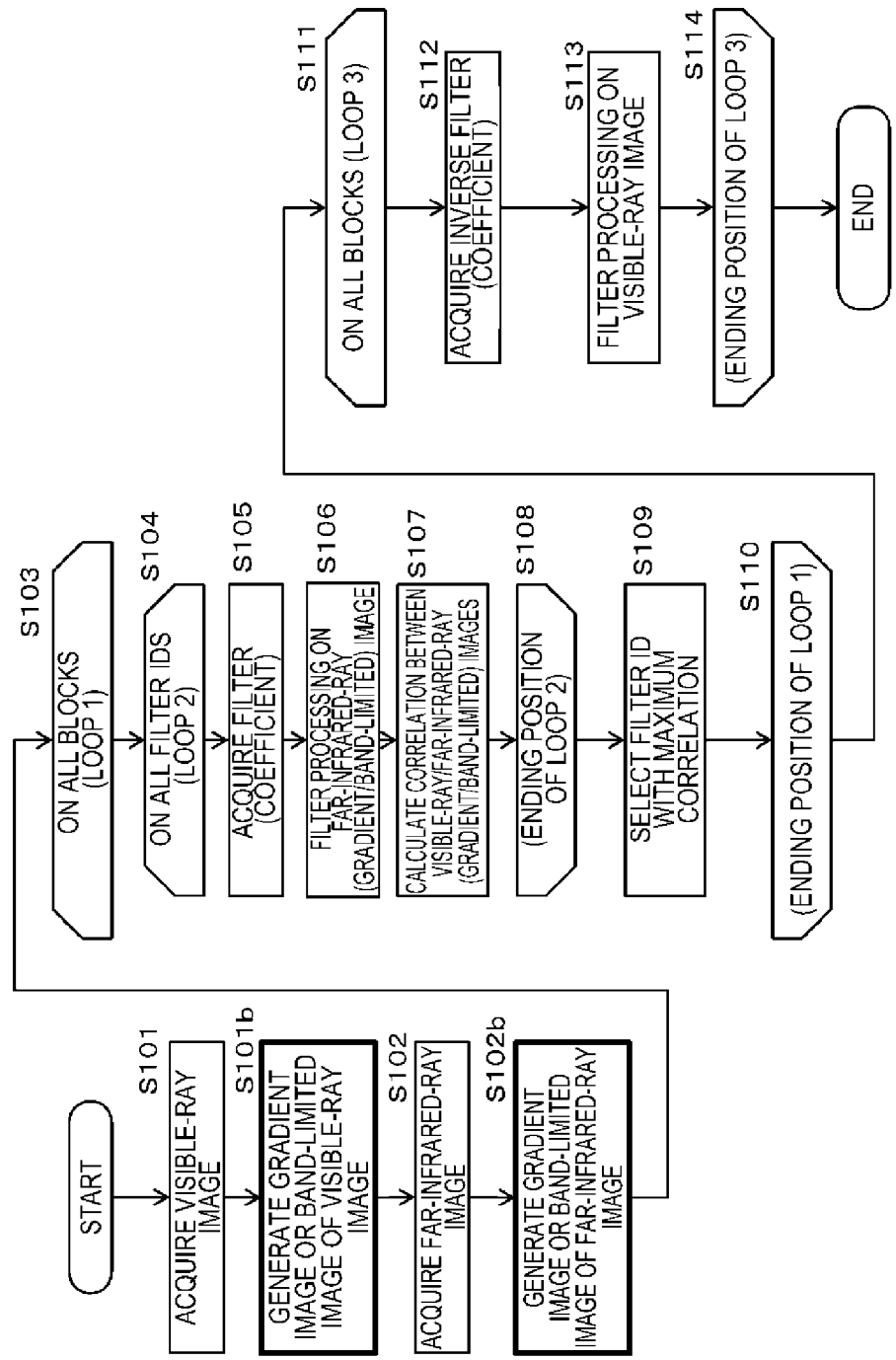

[Fig. 16]
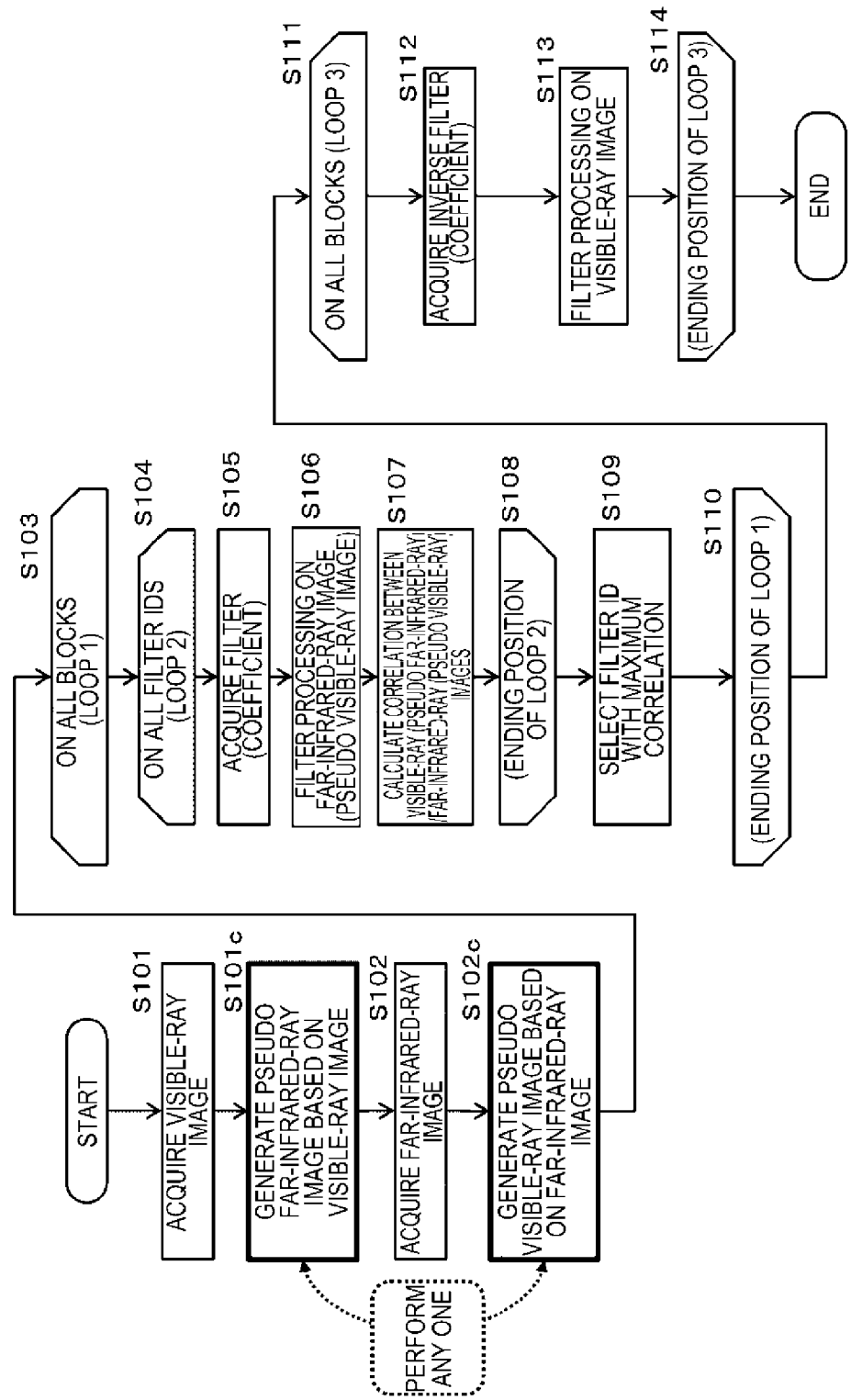

[Fig. 17]
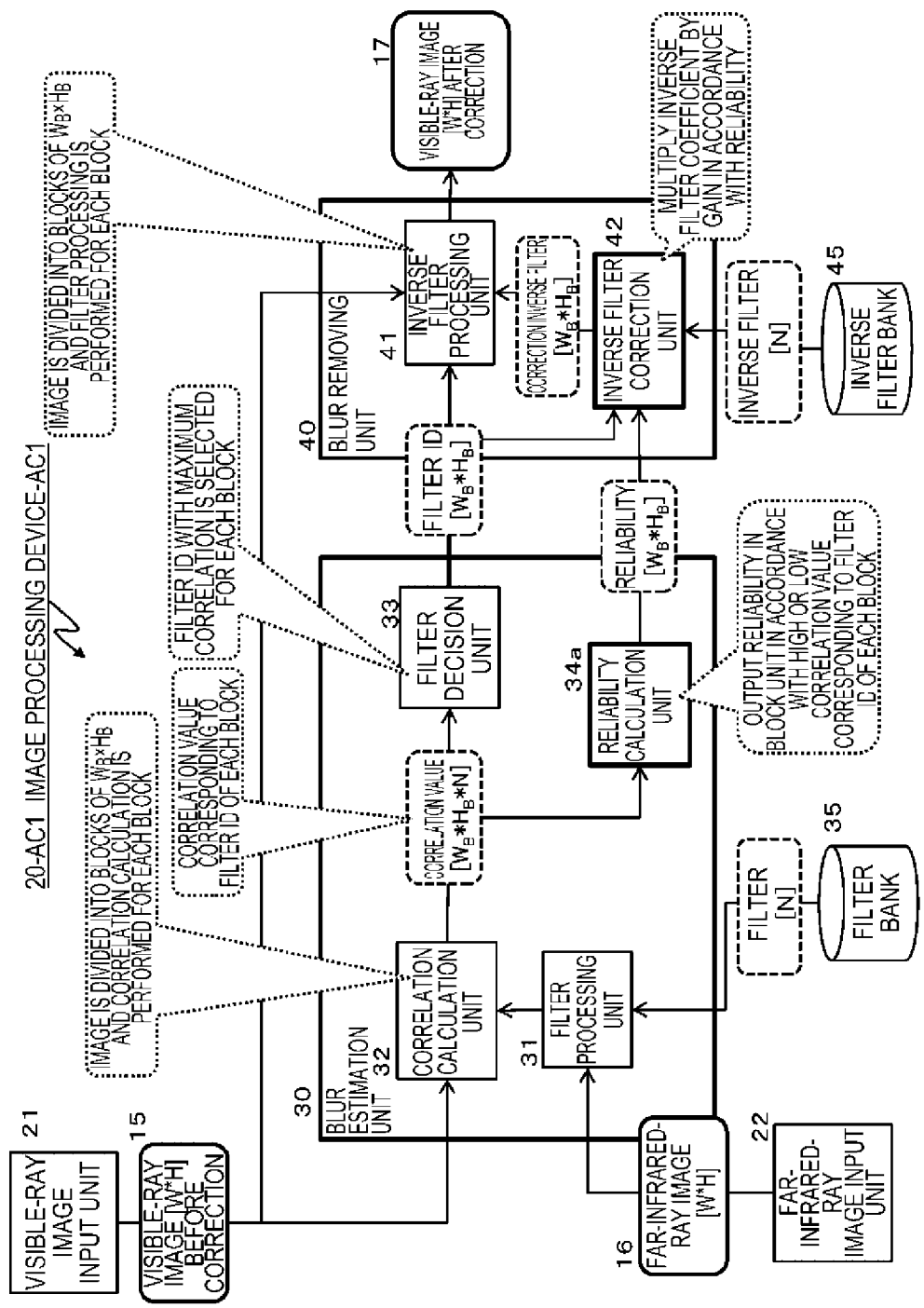

[Fig. 18]
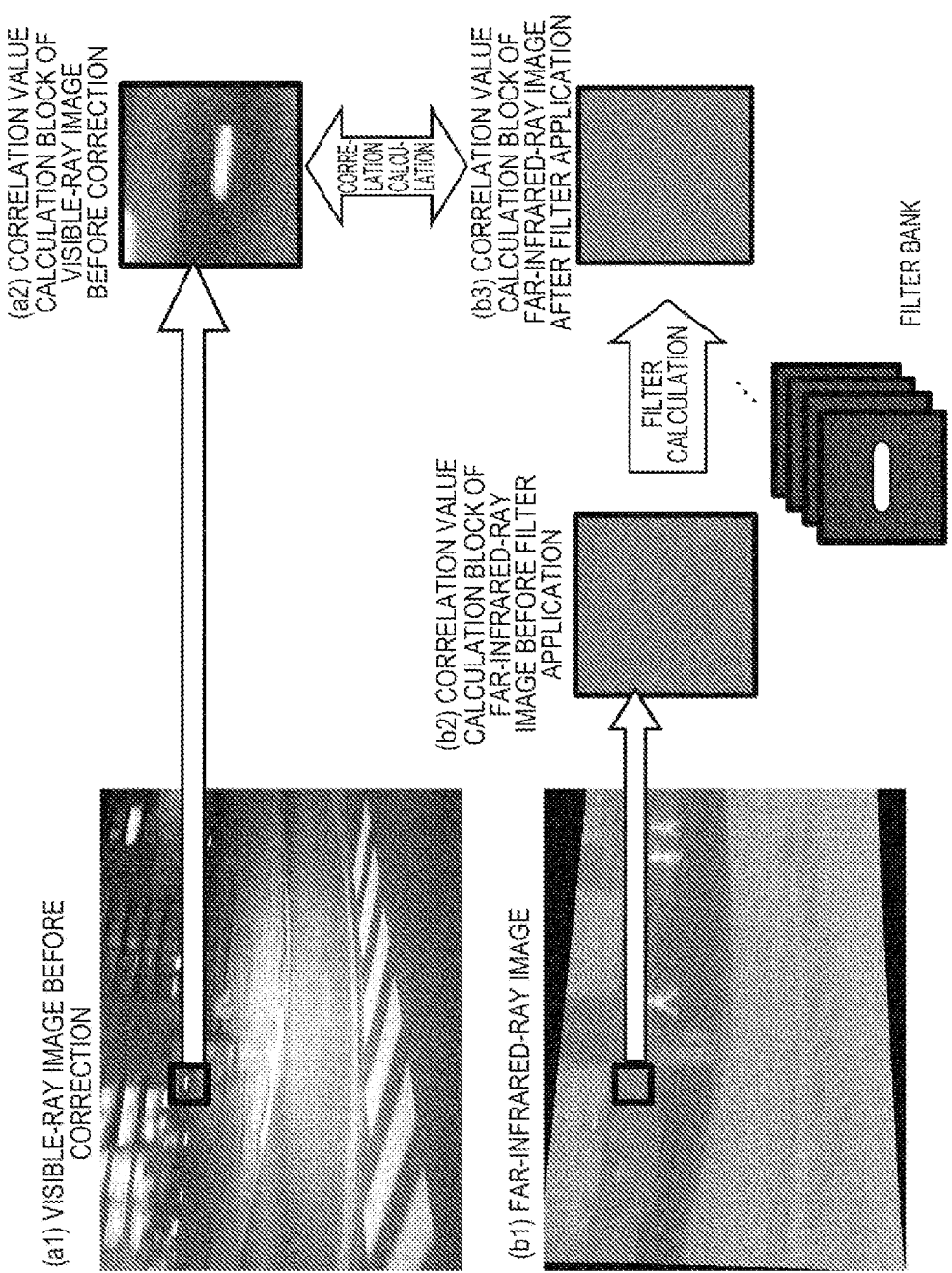

[Fig. 19]
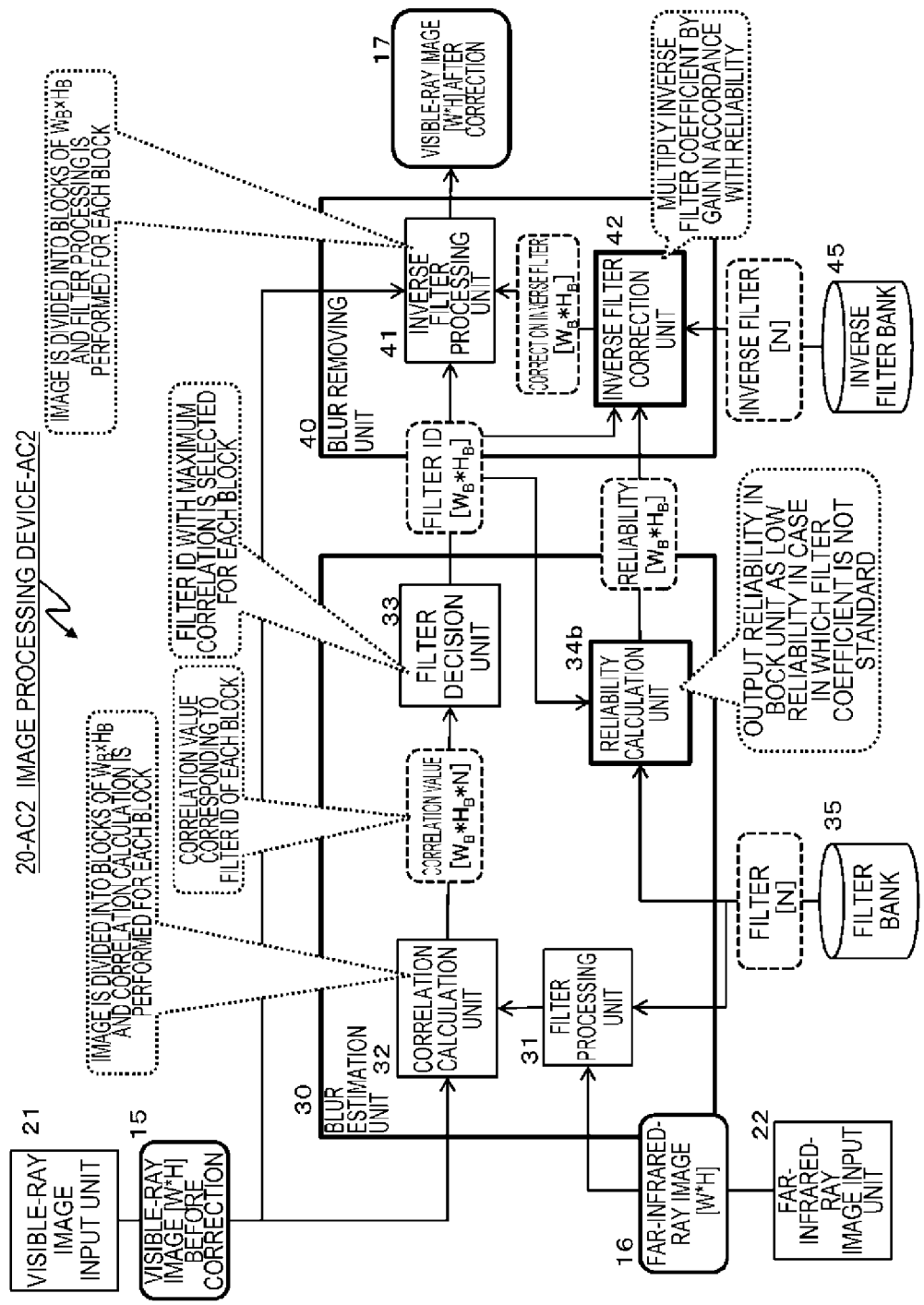

[Fig. 20]
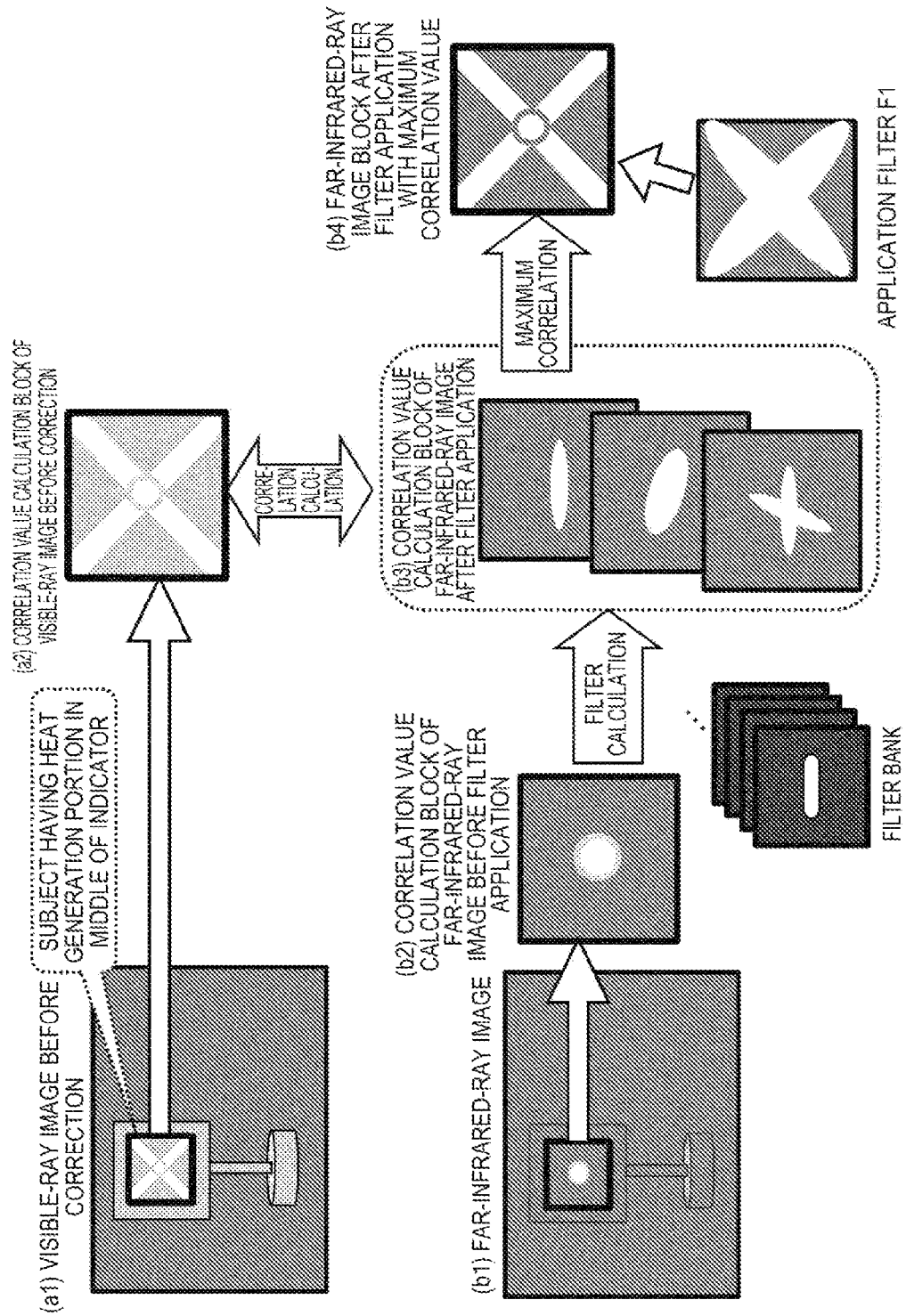

[Fig. 21]
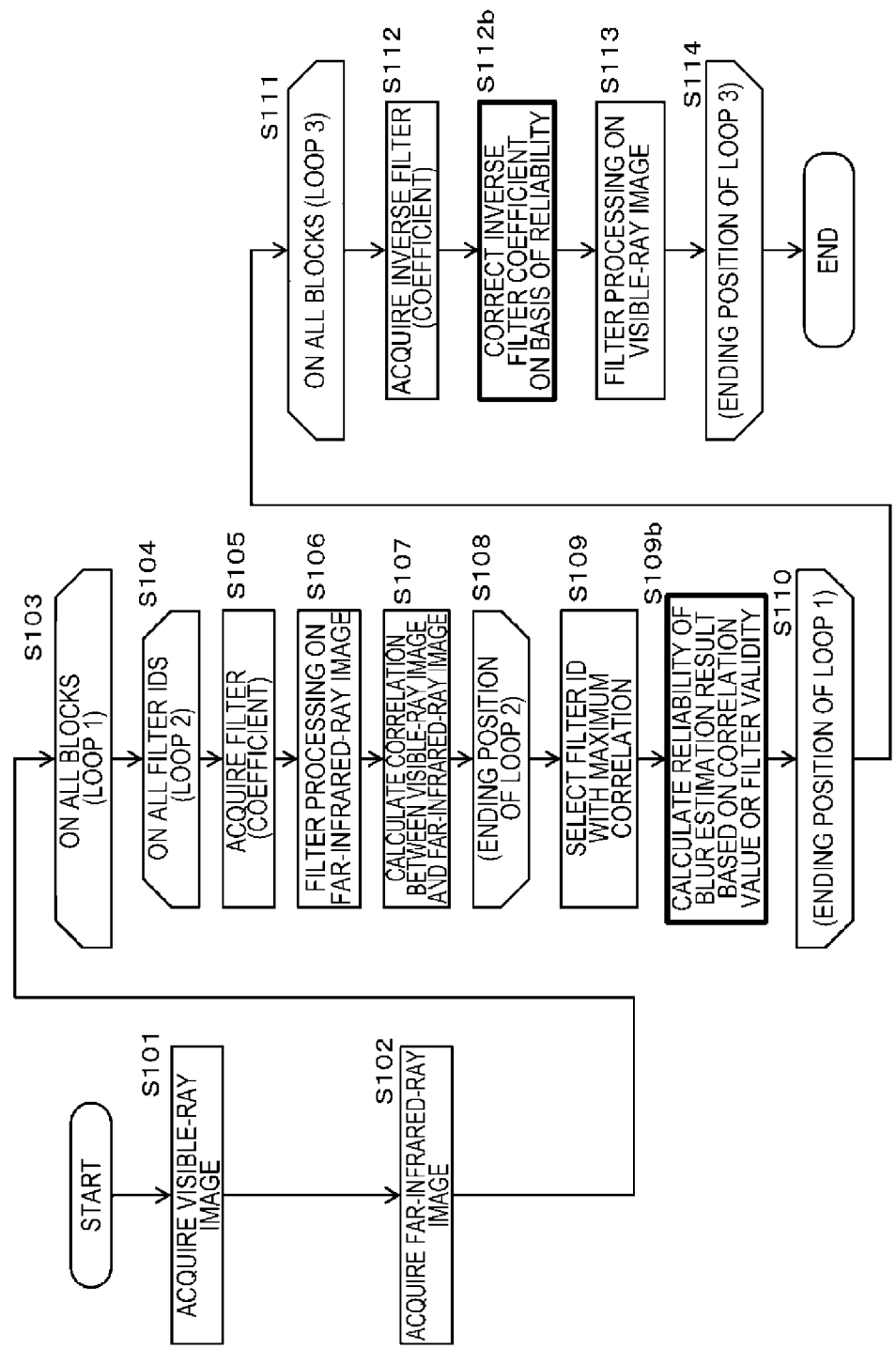

[Fig. 22]
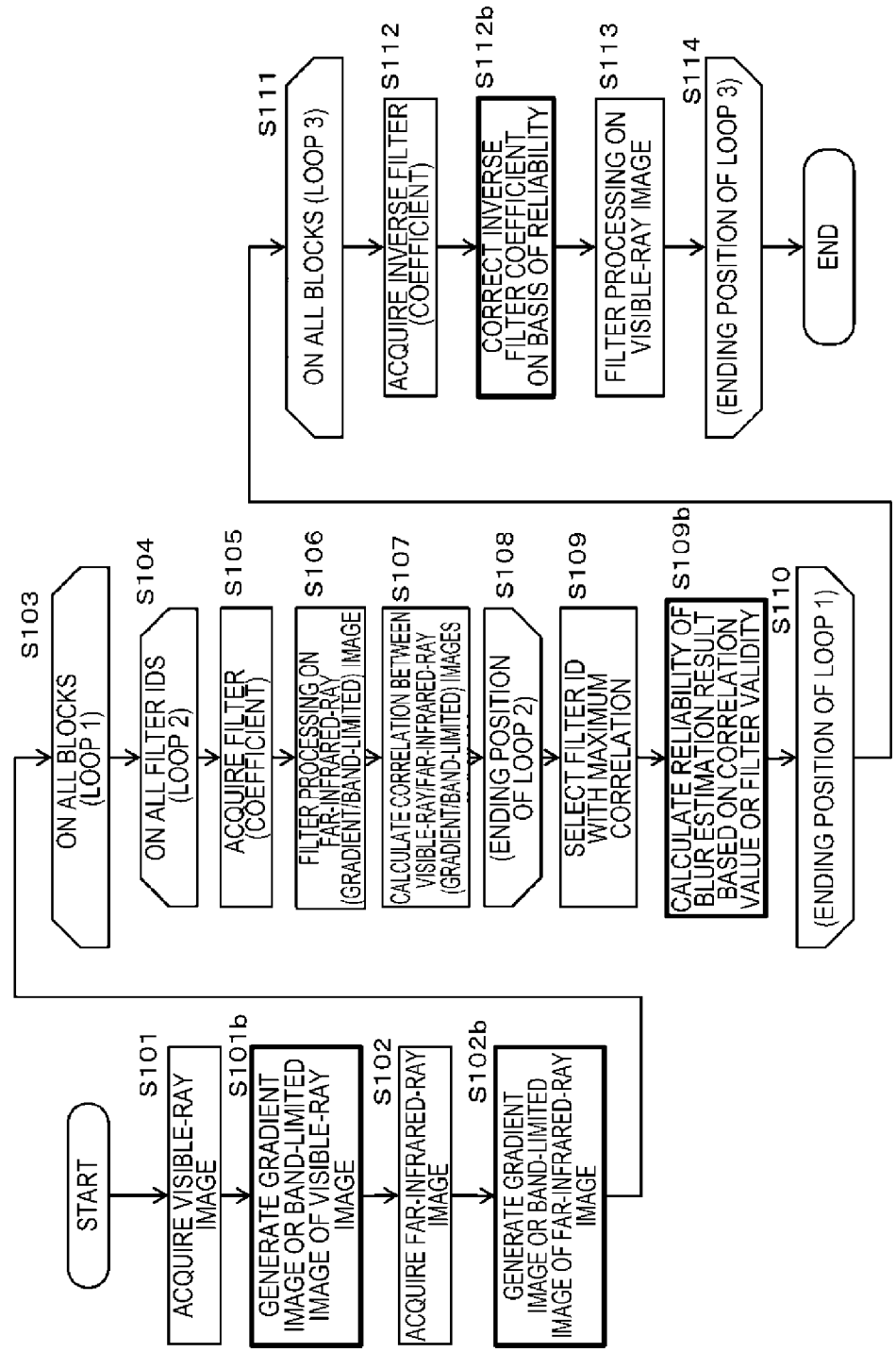

[Fig. 23]
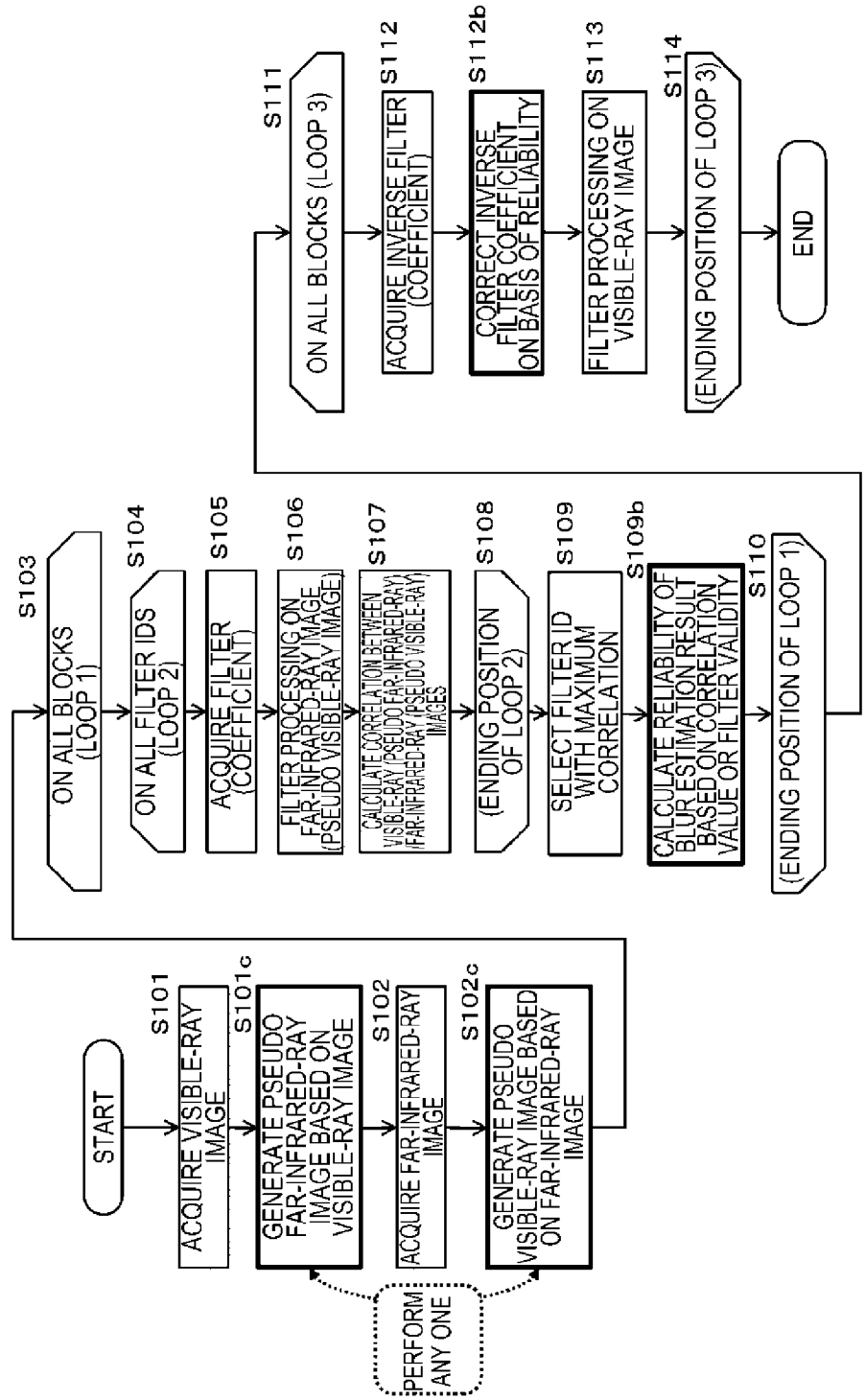

[Fig. 24]
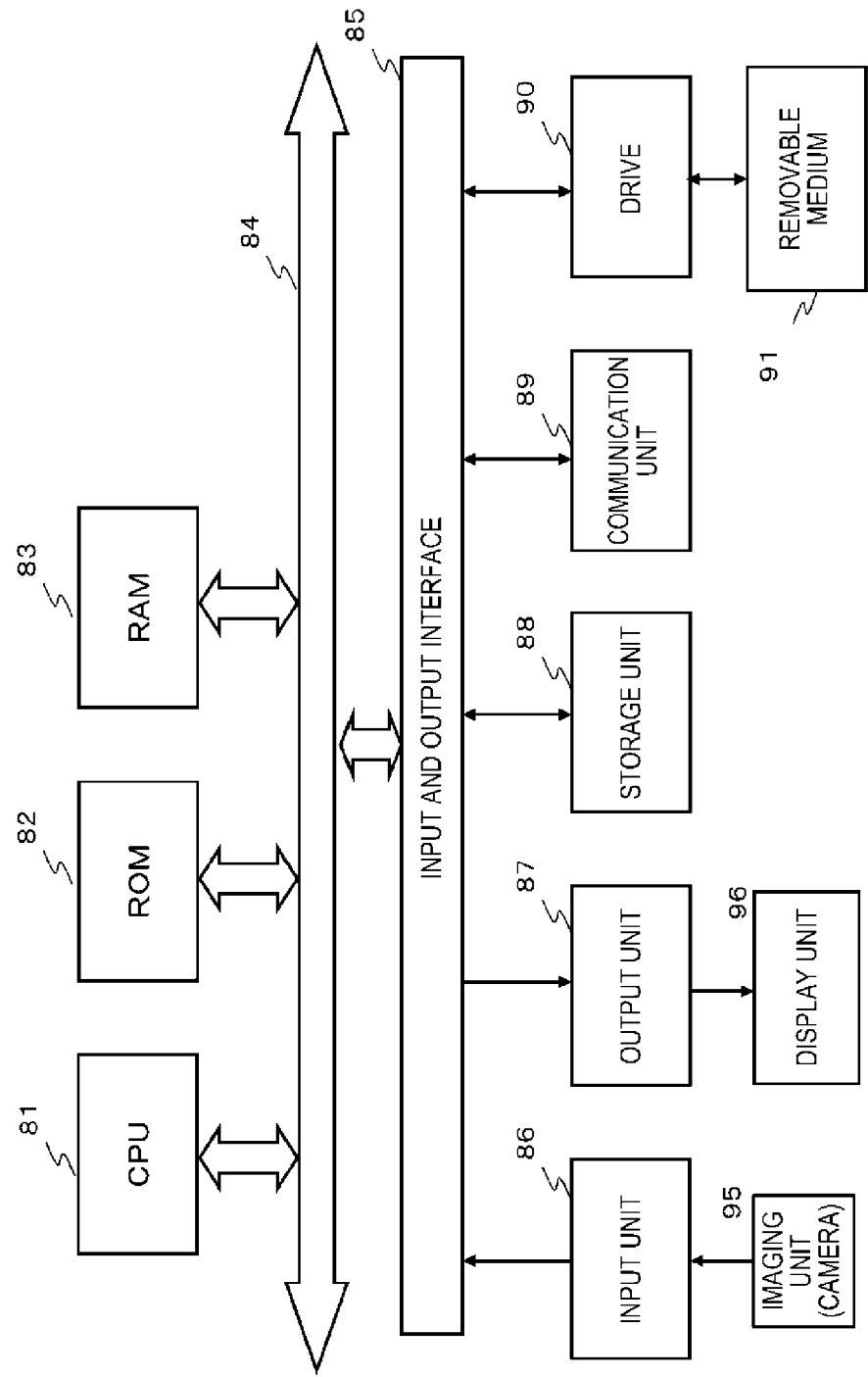

[Fig. 25]
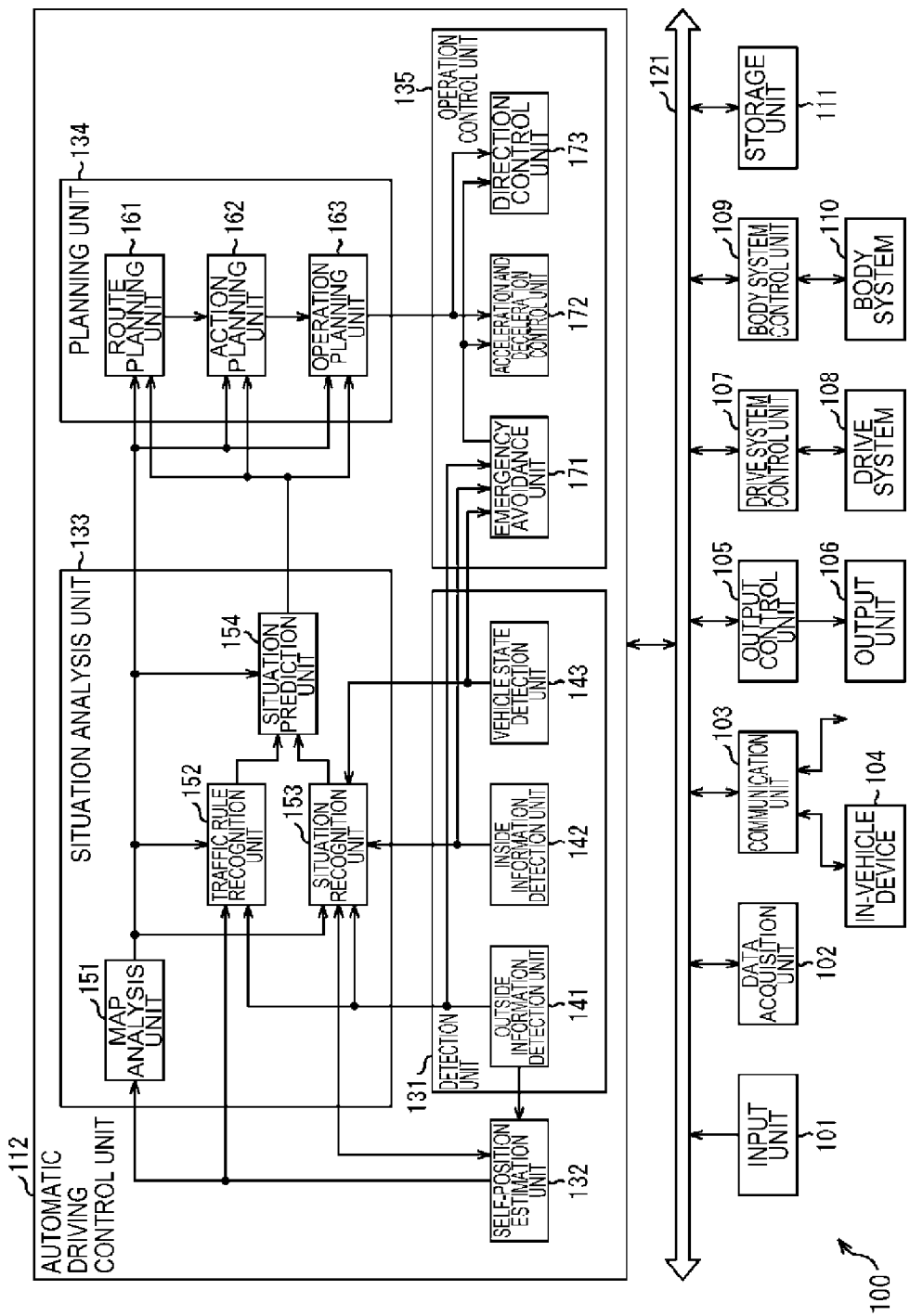

IMAGE PROCESSING DEVICE, IMAGE PROCESSING METHOD, AND PROGRAM

CROSS REFERENCE TO RELATED APPLICATIONS

This is a U.S. National Stage Application under 35 U.S.C. § 371, based on International Application No. PCT/JP2018/032076, which claims the benefit of Japanese Priority Patent Application JP 2017-170034 filed Sep. 5, 2017, the entire contents of which are incorporated herein by reference.

TECHNICAL FIELD

The present disclosure relates to an image processing device, an image processing method, and a program, and particularly, to an image processing device, an image processing method, and a program through which a visible-ray image and an infrared-ray image obtained by photographing the same subject are input and blur of the visible-ray image is reduced.

BACKGROUND ART

In a case in which visible-ray images are photographed in dark environments such as at night, it is necessary to lengthen exposure times. As a result, blur caused due to movement of a camera or movement of a subject easily occurs.

As a technology of the related art for solving this problem, for example, there is a technology disclosed in PTL 1 (JP 2003-209735A).

PTL 1 discloses a technology for analyzing movement in an image using a plurality of images continuously photographed by a visible-ray camera and correcting blur on the basis of an analysis result of the movement.

In the configuration disclosed in PTL 1, however, there is a problem that a plurality of continuously photographed images are necessary and a process for a still screen may be not performed. In addition, there is a problem that a process of analyzing movement in an image from the plurality of continuously photographed images is necessary and an instantaneous process corresponding to each image may not be performed.

CITATION LIST

Patent Literature

PTL 1: JP 2003-209735A

SUMMARY

Technical Problem

The present disclosure is devised in view of, for example, the foregoing problems and the present disclosure provides an image processing device, an image processing method, and a program realizing resolution or reduction in blur of a visible-ray image using a visible-ray image and an infrared-ray image without using a plurality of continuously photographed images.

Solution to Problem

According to the present disclosure, an image processing device is provided. The image processing device comprises image processing circuitry configured to receive input of a visible-ray image and a far-infrared-ray image obtained by photographing a same subject, estimate a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest, and perform a correction process on the visible-ray image based, at least in part, on the blur estimation result to generate a corrected visible-ray image from which blur is reduced, wherein generating the corrected visible-ray image comprises applying, to the visible ray image, an inverse filter having an inverse characteristic to a characteristic of the selected filter.

According to the present disclosure, an image processing method performed in an image processing device is provided. The method comprises receiving input of a visible-ray image and a far-infrared-ray image obtained by photographing a same subject, estimating a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest, and performing a correction process on the visible-ray image based, at least in part, on the blur estimation result to generate a corrected visible-ray image from which the blur is reduced, wherein generating the corrected visible-ray image comprises applying, to the visible ray image, an inverse filter having an inverse characteristic to a characteristic of the selected filter.

According to the present disclosure, a non-transitory computer readable medium is provided. The non-transitory computer readable medium is encoded with a plurality of instructions that, when executed by image processing circuitry of an image processing device, perform an image processing method. The image processing method comprises receiving input of a visible-ray image and a far-infrared-ray image obtained by photographing a same subject, estimating a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest, and performing a correction process on the visible-ray image based, at least in part, on the blur estimation result to generate a corrected visible-ray image from which the blur is reduced, wherein generating the corrected visible-ray image comprises applying, to the visible ray image, an inverse filter having an inverse characteristic to a characteristic of the selected filter.

Note that a program according to an embodiment of the present disclosure is, for example, a program provided in computer-readable format to an information processing device or a computer system capable of executing various program codes, the program being providable by a storage medium or communication medium. By providing such a program in a computer-readable format, processing corresponding to the program is realized on the information processing device or the computer system.

Further objectives, features, and advantages of the present disclosure will be clarified by a more detailed description based on the embodiments of the present disclosure described hereinafter and the attached drawings. Note that in this specification, the term "system" refers to a logical aggregate configuration of multiple devices, and the respective devices of the configuration are not limited to being inside the same housing.

Advantageous Effects of Invention

According to a configuration of one embodiment of the present disclosure, it is possible to realize a device and a method of performing high-quality processing to remove or reduce blur of a visible-ray image.

Specifically, the device includes: a blur estimation unit configured to receive input of a visible-ray image and a far-infrared-ray image obtained by simultaneously photographing the same subject and estimate a form of blur of the visible-ray image; and a blur removing unit configured to receive input of a blur estimation result of the blur estimation unit and perform a correction process on the visible-ray image to generate a corrected visible-ray image from which the blur is removed or reduced. The blur estimation unit calculates a correlation between the visible-ray image and a filter-applied far-infrared-ray image in which a filter is applied to the far-infrared-ray image and selects a filter in which the correlation is highest. The blur removing unit generates a corrected visible-ray image from which the blur is removed or reduced by applying an inverse filter having inverse characteristics to the characteristics of the filter selected by the blur estimation unit to the visible-ray image.

Through these processes, it is possible to realize the device and the method of performing high-quality processing to remove or reduce blur of a visible-ray image.

Note that the advantageous effects described in this specification are merely for the sake of example and non-limiting, and there may be additional advantageous effects.

BRIEF DESCRIPTION OF DRAWINGS

FIG. 1 is an explanatory diagram illustrating an overview of a process performed by an image processing device according to an embodiment of the present disclosure.

FIG. 2 is an explanatory diagram illustrating a correspondent relation between kinds of photographed images and wavelengths of light.

FIG. 3 is an explanatory diagram illustrating examples of a visible-ray image and a far-infrared-ray image.

FIG. 4 is an explanatory diagram illustrating a configuration example and a processing example of the image processing device according to an embodiment of the present disclosure.

FIG. 5 is an explanatory diagram illustrating a configuration example and a processing example of an image processing device according to Embodiment 1 of the present disclosure.

FIG. 6 is an explanatory diagram illustrating a configuration example and a processing example of an image processing device according to Embodiment 1 of the present disclosure.

FIG. 7 is an explanatory diagram illustrating a configuration example and a processing example of an image processing device according to Embodiment 1 of the present disclosure.

FIG. 8 is a diagram illustrating a flowchart to describe a sequence of a process performed by the image processing device according to Embodiment 1 of the present disclosure.

FIG. 9 is an explanatory diagram illustrating a configuration example and a processing example of an image processing device according to Embodiment 2 of the present disclosure.

FIG. 10 is an explanatory diagram illustrating a processing example of a process performed by the image processing device according to Embodiment 2 of the present disclosure.

FIG. 11 is an explanatory diagram illustrating a configuration example and a processing example of an image processing device according to Embodiment 2 of the present disclosure.

FIG. 12 is an explanatory diagram illustrating a processing example of a process performed by the image processing device according to Embodiment 2 of the present disclosure.

FIG. 13 is an explanatory diagram illustrating a configuration example and a processing example of an image processing device according to Embodiment 2 of the present disclosure.

FIG. 14 is an explanatory diagram illustrating a configuration example and a processing example of an image processing device according to Embodiment 2 of the present disclosure.

FIG. 15 is a diagram illustrating a flowchart to describe a sequence of a process performed by the image processing device according to Embodiment 2 of the present disclosure.

FIG. 16 is a diagram illustrating a flowchart to describe a sequence of a process performed by the image processing device according to Embodiment 2 of the present disclosure.

FIG. 17 is an explanatory diagram illustrating a configuration example and a processing example of an image processing device according to Embodiment 3 of the present disclosure.

FIG. 18 is an explanatory diagram illustrating a processing example of a process performed by the image processing device according to Embodiment 3 of the present disclosure.

FIG. 19 is an explanatory diagram illustrating a configuration example and a processing example of an image processing device according to Embodiment 3 of the present disclosure.

FIG. 20 is an explanatory diagram illustrating a processing example of a process performed by the image processing device according to Embodiment 3 of the present disclosure.

FIG. 21 is a diagram illustrating a flowchart to describe a sequence of a process performed by the image processing device according to Embodiment 3 of the present disclosure.

FIG. 22 is a diagram illustrating a flowchart to describe a sequence of a process performed by the image processing device according to Embodiment 4 of the present disclosure.

FIG. 23 is a diagram illustrating a flowchart to describe a sequence of a process performed by the image processing device according to Embodiment 4 of the present disclosure.

FIG. 24 is an explanatory diagram illustrating a hardware configuration example of the image processing device.

FIG. 25 is an explanatory diagram illustrating a configuration example of a vehicle control system that has a function of the image processing device according to an embodiment of the present disclosure.

DESCRIPTION OF EMBODIMENTS

Hereinafter, the details of an image processing device, an image processing method, and a program according to an embodiment of the present disclosure will be described with reference to the drawings. Note that the description will be made in the following sections.

1. Overview of configuration and process of image processing device according to present disclosure 2. Specific example of image processing device according to present disclosure 3. (Embodiment 1) Configuration and process of image processing device corresponding to basic configuration example A 4. (Embodiment 2) (A+B) Configuration and process of image processing device that performs preprocessing before blur estimation 5. (Embodiment 3) (A+C) Configuration and process of image processing device that calculates reliability of blur estimation result and performs blur removing process in accordance with reliability 6. (Embodiment 4) Process of image processing device realizing all of basic configuration (A)+preprocessing (B)+blur removing processes (C) in accordance with reliability 7. Hardware configuration example of image processing device 8. Configuration example of vehicle control system including image processing device according to present disclosure in vehicle 9. Summary of configuration according to present disclosure

1. Overview of Configuration and Process of Image Processing Device According to Present Disclosure First, an overview of a configuration and a process of an image processing device according to an embodiment of the present disclosure will be described with reference to FIG. 1 and the subsequent drawings.

FIG. 1 is an explanatory diagram illustrating an overview of a process performed by the image processing device according to an embodiment of the present disclosure.

The image processing device according to an embodiment of the present disclosure receives input of a visible-ray image and an infrared-ray image obtained by photographing the same subject and reduces blur of the visible-ray image.

In a case in which visible-ray images are photographed in a dark environment such as at night, it is necessary to lengthen exposure times. As a result, blur caused due to movement of a camera or a movement of a subject easily occurs.

The image processing device according to an embodiment of the present disclosure uses, for example, a far-infrared-ray image obtained by simultaneously photographing the same subject to reduce blur of the visible-ray image photographed under such an environment.

An infrared-ray image is an image in which pixel values in accordance with heat emitted from a subject are set and, for example, a human body temperature can be detected. Accordingly, for example, humans or the like emitting heat in darkness or the like can be photographed, and infrared-ray images are used for surveillance cameras.

A far infrared ray with a long wavelength among infrared rays has higher sensitivity to heat, and thus a subject such as a human emitting heat can be relatively clearly photographed even in photographing in which an exposure time is short.

At the time of photographing of a visible-ray image in darkness such as at night, it is necessary to lengthen an exposure time, and blur in accordance with movement of a camera or a subject increases.

However, a far-infrared-ray image is photographed with an exposure time set to be short even in darkness, and a subject emitting heat, for example, a human, can be clearly photographed.

The image processing device according to an embodiment of the present disclosure corrects a visible-ray image with much blur by using a difference in characteristics between the visible-ray image and the far-infrared-ray image. That is, a correction (blur removing) process is performed using an infrared-ray image with little blur as a reference image to generate a visible-ray image in which blur is resolved or reduced.

An overview of a process performed by the image processing device according to an embodiment of the present disclosure will be described with reference to FIG. 1. As illustrated in FIG. 1, the image processing device according to an embodiment of the present disclosure receives input of a blurry visible-ray image 11 and a blurless far-infrared-ray image 12 obtained by simultaneously photographing the same subject.

The image processing device according to an embodiment of the present disclosure first performs blur estimation on the visible-ray image using the two images in step S20.

Specifically, for example, estimation of a point spread function (PSF) which is a function indicating a blur amount of an image is performed.

The PSF is a function indicating a spread state to the periphery of pixel values of certain pixel positions, that is, a blur amount or a blur form.

In step S20, a filter corresponding to various point spread functions (PSF), that is, a filter that produces blur, is applied to the blurless far-infrared-ray image 12, a far-infrared-ray image in which blur is produced intentionally is generated, and the filter-applied far-infrared-ray image and the blurry visible-ray image 11 are compared (correlation calculation).

On the basis of the comparison process (the correlation calculation), a filter corresponding to the point spread function (PSF) and producing the same blur as the blur of the blurry visible-ray image 11 is selected.

Note that the filter to be selected in step S20 is equivalent to a filter in which the blurry visible-ray image 11 is generated in a case in which the filter is applied to a blurless visible-ray image.

However, since the blurless visible-ray image is not acquired as a photographed image, the blurless far-infrared-ray image 12 is used as an alternative image. That is, a filter in which the same blur as the blur existing in the blurry visible-ray image 11 is produced is selected through application to the blurless far-infrared-ray image 12 or the point spread function (PSF) is calculated.

Next, in step S40, a process of removing the blur of the visible-ray image is performed.

The blur removing process is a process of generating an inverse filter that has inverse characteristics to the characteristics of a filter that has characteristics expressed with the foregoing point spread function: PSF=p(x, y) and applying the generated inverse filter to the blurry visible-ray image 11.

Through the process of applying the inverse filter, the blur is removed from the blurry visible-ray image 11 to generate a blur-reduced visible-ray image 13.

Note that, as the visible-ray image blur removing process of step S40, a filtering process in a frequency domain, called a deconvolution process, can be applied. When the point spread function (PSF)=p(x, y) of the blurry visible-ray image 11 is set, the blurry visible-ray image 11 is set to b(x, y), a genuine visible-ray image with no blur is set to s(x, y), and each Fourier transform is P(u, v), B(u, v), and S(u, v), the following relation expressions are established:

$$b(x,y)=p(x,y)*s(x,y); \text{ and}$$

$$B(u,v)=P(u,v)\cdot S(U,v),$$

where * is a convolution operation.

Further, when a Fourier transform is set to FT( ), the following relation expressions can be established:

$$B(u,v)=FT(b(x,y));$$

$$P(u,v)=FT(p(x,y));\text{ and}$$

$$S(u,v)=FT(s(x,y)).$$

A process of calculating a genuine visible-ray image with no blur: s(x, y) is a process (=similar to a process of calculating S(u, v) from B(u, v)) of calculating the genuine visible-ray image with no blur: s(x, y) from the blurry visible-ray image 11: b(x, y), a filter performing this process is called a deconvolution filter, and the filter application process is called a deconvolution process.

The deconvolution filter is an inverse filter that has inverse characteristics to the characteristics of a filter that has characteristics expressed with PSF=p(x, y).

In this way, in step S40, an inverse filter that has inverse characteristics to the characteristics of the filter that has the characteristics expressed with PSF=p(x, y) indicating a blur form of the blur visible-ray image 11 estimated in step S20 is generated, and the generated inverse filter is applied to the blurry visible-ray image 11. That is, the "deconvolution process" is performed to generate the blur-reduced visible-ray image 13 from which the blur is removed from the blurry visible-ray image 11.

Next, a visible-ray image and an infrared-ray image will be described with reference to FIG. 2.

As illustrated in FIG. 2, the visible-ray image is an image in which a wavelength is in the range of about 0.4 micrometers to 0.7 micrometers and is a color image such as an RGB image photographed by a general camera.

On the other hand, an infrared-ray image is an image formed from light with a long wavelength equal to or greater than 0.7 micrometers. An infrared-ray image photographing camera that photographs an infrared-ray image can photograph a human or the like that produces heat, for example, in the darkness and is used as a surveillance camera or the like.

Note that infrared rays are separated into the following rays, as illustrated in FIG. 2: near infrared rays of which a wavelength is in the range of about 0.7 to 1 micrometers;

middle infrared rays of which a wavelength is in the range of about 3 to 5 micrometers; and far infrared rays of which a wavelength is in the range of about 8 to 14 micrometers.

An image processing example in which a far-infrared image which is a photographed image of far infrared rays of which a wavelength is mainly in the range of about 8 to 14 micrometers is used will be described according to an embodiment to be described below.

Here, a process according to an embodiment of the present disclosure can also be applied to a process in which other infrared-ray images are used without being limited to the far-infrared-ray image.

As described above, in a case in which a visible-ray image is photographed in a dark environment such as at night, it is necessary to lengthen an exposure time. As a result, blur caused due to movement of a camera or movement of a subject easily occurs. On the other hand, even when a far-infrared image is photographed with a shorter exposure time, a subject such as a human that produces heat can be clearly photographed.

An example of a specific photographed image is illustrated in FIG. 3.

FIG. 3 illustrates examples of photographed images of a visible-ray image and a far-infrared-ray image photographed at an intersection at night.

The two images are images photographed in a dark environment. Long exposure is performed for the visible-ray image.

When (1) the visible-ray image is compared to (2) the far-infrared-ray image, blur of (1) the visible-ray image is great and the figures of humans can hardly be recognized. In (2) the far-infrared-image, the figures of the humans are clearly shown. This is because the exposure time is short and little blur occurs in the far-infrared-ray image.

The image processing device according to an embodiment of the present disclosure corrects a visible-ray image in which blur occurs in this way using a far-infrared-ray image in which little blur occurs as a reference image to generate the visible-ray image from which the blur is removed or reduced.

2. Specific Example of Image Processing Device According to Present Disclosure

Next, a specific example of the image processing device according to an embodiment of the present disclosure will be described.

FIG. 4 illustrates a plurality of configuration examples of the image processing device according to an embodiment of the present disclosure.

(A) Basic Configuration Example (A+B) configuration example in which basic configuration (A)+preprocessing is performed before blur estimation (A+C) Configuration example in which basic configuration (A)+reliability of blur estimation result is calculated and blur removing process in accordance with reliability is performed (A+B+C) Configuration example in which basic configuration (A)+preprocessing (B)+blur removing process (C) in accordance with reliability are all realized The image processing device according to an embodiment of the present disclosure has various configuration examples illustrated in FIG. 4.

A specific configuration and process of each of the configuration examples will be described in a later section, and overviews of processes in accordance with the four kinds of configurations will first be described.

(A) Basic Configuration Example

The basic configuration example is a configuration example in which the blur estimation process in step S20 and the blur removing process in step S40 are performed as in the processes described with reference to FIG. 1.

First, in step S20, the blurry visible-ray image 11 and the blurless far-infrared-ray image 12 obtained by simultaneously photographing the same subject are input, the two images are compared to each other, and the blur estimation process is performed on the blurry visible-ray image 11.

Specifically, a filter corresponding to various point spread functions (PSFs), that is, a filter that produces blur, is applied to the blurless far-infrared-ray image 12, a far-infrared-ray image in which blur is produced intentionally is generated, and the filter-applied far-infrared-ray image and the blurry visible-ray image 11 are compared (correlation calculation).

On the basis of the comparison process (the correlation calculation), a filter corresponding to the point spread function (PSF) and producing the same blur as the blur of the blurry visible-ray image 11 is selected.

That is, by producing blur by applying various filters to the blurless far-infrared-ray image 12 and comparing the blurless far-infrared-ray image 12 to the blurry visible-ray image 11, the filter that produces the same blur as the blur form of the blurry visible-ray image 11 is selected or the point spread function (PSF) is calculated. The filter is selected, for example, in a predetermined pixel block unit.

Further, in step S40, an inverse filter that has inverse characteristics to the characteristics of the filter that has the same characteristics as the PSF characteristics indicating the blur form of the blur visible-ray image 11 estimated in step S20 is selected or generated, the deconvolution process of applying the selected or generated inverse filter to the blurry visible-ray image 11 is performed, and the blur-reduced visible-ray image 13 is generated from the blurry visible-ray image 11 from which the blur is removed.

Note that the inverse filter application process is performed, for example, in the predetermined pixel block unit.

(A+B) Configuration example in which basic configuration (A)+preprocessing is performed before blur estimation Next, a configuration of (A+B) will be described.

This configuration is a configuration example in which the "preprocessing before the blur estimation" is performed in addition to the process of the basic configuration (A).

In the configuration (A+B), as illustrated in the second drawing (A+B) of FIG. 4, as the processes of steps S11 and S12 at the previous stage of the blur estimation process of step S20, preprocessing is performed on the blurry visible-ray image 11 and the blurless far-infrared-ray image 12.

The preprocessing is a process of alleviating a difference in visibility between a visible-ray image and a far-infrared-ray image. Specifically, for example, any one of the following processes is performed as the preprocessing:

(1) a process of generating a gradient image of each of a visible-ray image and a far-infrared-ray image;

(2) a process of generating a band-limited image of each of a visible-ray image and a far-infrared-ray image;

(3) a process of generating a pseudo far-infrared-ray image from a visible-ray image; and (4) a process of generating a pseudo visible-ray image from a far-infrared-ray image. Any one of the kinds of preprocessing is performed and the blur estimation of step S20 is performed using an image after the preprocessing.

By performing the preprocessing, a difference in visibility between a visible-ray image and a far-infrared-ray image is alleviated. As a result, it is possible to improve precision of the blur estimation process performed in step S20.

Note that a specific configuration example or processing example will be described in a later section.

(A+C) Configuration example in which basic configuration (A)+reliability of blur estimation result is calculated and blur removing process in accordance with reliability is performed Next, a configuration (A+C) will be described.

This configuration is a configuration example in which "the blur removing process in accordance with the reliability obtained by calculating the reliability of the blur estimation result" in addition to the process of the basic configuration (A).

In the configuration (A+C), as illustrated in the third drawing (A+C) of FIG. 4, a process of performing blur removing strength calculation in step S32 by performing calculation of the reliability of the blur estimation result in step S31 is added after the blur estimation process in step S20.

A strength of the inverse filter applied in the blur removing process in step S40 is adjusted in accordance with blur removing strength information calculated in step S32.

Specifically, in a case in which the reliability of the blur estimation result performed in step S20 is low, a process of weakening the strength of the inverse filter applied in the blur removing process in step S40 is performed. Note that the calculation of the reliability is performed, for example, in the predetermined pixel block unit. By performing the process, it is possible to apply the inverse filter in accordance with the reliability of the blur estimation result.

Note that as a mode of the process of calculating the reliability of the blur estimation result in step S31 and the blur removing strength calculation process in step S32, there are the following two modes:

(1) a configuration in which reliability is calculated on the basis of a correlation value between a blurry visible-ray image and a result of filter processing for a blurless far-infrared-ray image, which is performed at the time of the blur estimation process of step S20, and a filter application level at the time of the blur removing process of step S40 is adjusted in accordance with the calculated reliability; and (2) a configuration in which reliability based on validity of a filter applied to a process of filtering the blurless far-infrared-ray image, which is performed to calculate a correlation value between a blurry visible-ray image and a result of filter processing for a blurless far-infrared-ray image, which is performed at the time of the blur estimation process of step S20, is calculated and a filter application level at the time of the blur removing process of step S40 is adjusted in accordance with the calculated reliability.

In steps S31 and S32, any one of the processes is performed.

Note that a specific configuration example or processing example will be described in the later section.

(A+B+C) Configuration example in which basic configuration (A)+preprocessing (B)+blur removing process (C) in accordance with reliability are all realized Next, a configuration of (A+B+C) will be described.

This configuration is a configuration example in which both processes, "(B) the preprocessing before the blur estimation" and "(C) the blur removing process in accordance with the reliability by calculating the reliability of the blur estimation result," are performed in addition to the process of the basic configuration (A).

Note that a specific configuration example or processing example will be described in the later section.

3. (Embodiment 1) Configuration and Process of Image Processing Device Corresponding to Basic Configuration Example A Next, a configuration and a process of an image processing device corresponding to (the basic configuration example A) described with reference to FIG. 4 will be described as Embodiment 1 of the image processing device according to an embodiment of the present disclosure.

FIG. 5 is an explanatory diagram illustrating a configuration and a process of the image processing device corresponding to the basic configuration example A.

"(A) Basic configuration example" is a configuration example in which the blur estimation process in step S20 and the blur removing process in step S40 are performed.

First, in step S20, the blurry visible-ray image 11 and the blurless far-infrared-ray image 12 obtained by simultaneously photographing the same subject, the two images are compared to each other are input, and the blur estimation process is performed on the blurry visible-ray image 11.

Specifically, various filters (blur producing filters) stored in a filter bank 35 are sequentially applied to the blurless far-infrared-ray image 12, various forms of blur are produced intentionally in the blurless far-infrared-ray image 12, and correlation between the blurry visible-ray image 11 and a far-infrared-ray image in which the blur is produced intentionally is calculated.

The filter bank 35 stores many blur production filters in which sizes or directions of blur are different. That is, many filters corresponding to various PSFs are stored.

Note that a filter identifier (ID) is set in each of the filters.

In the visible-ray image blur estimation process in step S20, the filters stored in the filter bank 35 are sequentially applied to the blurless far-infrared-ray image 12 to calculate correlation between the blurry visible-ray image 11 and a far-infrared-ray image in which blur is produced.

The correlation value based on each filter application result is compared and a filter with the highest correlation is selected as a filter that has characteristics of the blur of the blurry visible-ray image 11.

In step S20, the filter ID which is an identifier of the selected filter is acquired. The filter ID is used for the visible-ray image blur removing process of subsequent step S40.

Note that this process is performed, for example, in the predetermined pixel block unit.

In step S40, an inverse filter that has inverse characteristics to the characteristics of the filter that has the same characteristics as the PSF characteristics indicating the blur form of the blur visible-ray image 11 estimated in step S20 is selected or generated, the deconvolution process of applying the selected or generated inverse filter to the blurry visible-ray image 11 is performed, and the blur-reduced visible-ray image 13 from which the blur is removed is generated from the blurry visible-ray image 11.

Note that in the embodiment, an inverse filter is selected for use from an inverse filter bank 45 that stores inverse filters having inverse characteristics to the characteristics of the filters stored in the filter bank 35.

The inverse filter bank 45 stores many inverse filters having inverse characteristics corresponding to the characteristics of all the filters stored in the filter bank 35.

Note that the inverse filter identifier (ID) is set in each of the inverse filters and the ID is set to be associated with the filter ID set in the filter stored in the filter bank 35. For example, the same ID or the IDs of which some are the same are set. That is, on the basis of the filter IDs of the filters stored in the filter bank 35, the inverse filter having the inverse characteristics to the characteristics of the filter with the ID can be instantly selected from the inverse filter bank 45.

In step S40, the inverse filter associated with the filter ID selected in step S20 is selected from the inverse filter bank 45, and the selected inverse filter is applied to the blurry visible-ray image 11 to generate the blur-reduced visible-ray image 13 from which the blur is removed from the blurry visible-ray image 11.

Note that an image is divided into block regions, as illustrated in FIG. 6, and the filter selection and application process is performed in each block unit.

This is because blur production forms are different depending on moving subject regions or stationary subject regions included in the image, and the filter in accordance with blur different in each block region unit is selected and applied.

Next, a specific configuration example and process of the image processing device corresponding to "(A) basic configuration example" will be described with reference to FIG. 7.

An image processing device A or 20-A illustrated in FIG. 7 includes a visible-ray image input unit 21, a far-infrared-ray image input unit 22, a blur estimation unit 30, a blur removing unit 40, the filter bank 35, and the inverse filter bank 45.

Further, the blur estimation unit 30 includes a filter processing unit 31, a correlation calculation unit 32, and a filter decision unit 33.

In addition, the blur removing unit 40 includes an inverse filter processing unit 41.

The visible-ray image input unit 21 inputs the visible-ray image 15 before correction to the blur estimation unit 30 and the blur removing unit 40.

In addition, the far-infrared-ray image input unit 22 inputs the far-infrared-ray image 16 to the blur estimation unit 30.

The visible-ray image 15 before correction and the far-infrared-ray image 16 input by the visible-ray image input unit 21 and the far-infrared-ray image input unit 22 are image obtained by simultaneously photographing the same subject.

These images are, for example, images photographed in the darkness. In the visible-ray image 15 before correction input by the visible-ray image input unit 21, blur is produced due to long-time exposure.

On the other hand, the far-infrared-ray image 16 input by the far-infrared-ray image input unit 22 is a short-time exposure image and is an image in which blur rarely exists.

Note that both the visible-ray image 15 before correction and the far-infrared-ray image 16 are images with W×H pixels of the horizontal side=W pixels and the vertical side=H pixels. In the drawing, the visible-ray image 15 before correction and the far-infrared-ray image 16 are illustrated as a visible-ray image (W*H) before correction 15 and a far-infrared-ray image (W*H) 16.

In addition, ($W_B$*$H_B$) illustrated in the drawing indicates one block region described above with reference to FIG. 6.

The number of blocks of one image frame is assumed to be N.

Next, a process performed by the blur estimation unit 30 will be described.

The filter processing unit 31 of the blur estimation unit 30 sequentially applies various filters (blur production filter) stored in the filter bank 35 to the far-infrared-ray image 16. That is, various forms of blur are produced intentionally in the far-infrared-ray image 16.

As described above, the filter bank 35 stores many blur production filters in which the sizes or directions of the blur are different. That is, many filters corresponding to various PSFs are stored.

The filter processing unit 31 of the blur estimation unit 30 outputs the far-infrared-ray image in which the blur is intentionally produced by applying the filters to the far-infrared-ray image 16, to the correlation calculation unit 32.

The correlation calculation unit 32 calculates correlation between the visible-ray image 15 before correction and the far-infrared-ray image in which the blur is intentionally produced by applying the filters.

Note that the filter application process and a correlation calculation process performed by the filter processing unit 31 and the correlation calculation unit 32 are performed in correspondence block units of N block regions of the visible-ray image 15 before correction and N block regions of the far-infrared-ray image 16.

The filter processing unit 31 sequentially applies various filters (blur production filters) stored in the filter bank 35 to each of the N blocks of the far-infrared-ray image 16.

The correlation calculation unit 32 calculates correlation between the visible-ray image 15 before correction and a result obtained by sequentially applying the various filters (the blur production filters) stored in the filter bank 35 to each of the N blocks of the far-infrared-ray image 16 and outputs a correlation value corresponding to each filter for each of the N blocks to the filter decision unit 33 along with the filter ID.

The filter decision unit 33 selects a filter corresponding to the block with the highest correlation in each block among input data from the correlation calculation unit 32, that is, among correspondence data between the application filter ID and the correlation value in each of the N blocks.

The filter IDs of the N filters in each of the N blocks selected by the filter decision unit 33 are input to the inverse filter processing unit 41 of the blur removing unit 40.

The inverse filter processing unit 41 of the blur removing unit 40 receives input of the following data from the filter decision unit 33 of the blur estimation unit 30. That is, the inverse filter processing unit 41 receives input of:

the filter IDs of the N filters for which the correlation value is determined to be the highest in each of the N blocks; and N filter IDs corresponding to the N blocks.

The inverse filter processing unit 41 of the blur removing unit 40 selects an inverse filter having inverse characteristics to the characteristics of the filter with the filter ID from the inverse filter bank 45 on the basis of the filter ID corresponding to each block and applies the selected inverse filter to the corresponding block of the visible-ray image 15 before correction input from the visible-ray image input unit 21.

That is, the inverse filter processing unit 41 selects the inverse filter having inverse characteristics to the characteristics of the filter corresponding to the block with the highest correlation value selected in the blur estimation unit 30, specifically, the filter having the same characteristics as the PSF characteristics indicating the blur form of the visible-ray image 15 before correction, from the inverse filter bank 45 and applies the selected inverse filter to the corresponding block of the visible-ray image 15 before correction.

The inverse filter bank 45 stores many inverse filters having the inverse characteristics corresponding to the characteristics of all the filters stored in the filter bank 35 along with IDs. On the basis of the filter ID input from the filter decision unit 33 of the blur estimation unit 30, the inverse filter having the inverse characteristics to the characteristics of the filter corresponding to the filter ID can be extracted.

The inverse filter processing unit 41 acquires the inverse filter having inverse characteristics to the characteristics of the filter indicating a maximum correlation value in each block from the inverse filter bank 45 on the basis of the filter ID input from the filter decision unit 33 of the blur estimation unit 30 with regard to each of the N blocks of the visible-ray image 15 before correction input from the visible-ray image input unit 21, and applies the acquired inverse filter to the corresponding block of the visible-ray image 15 before correction input from the visible-ray image input unit 21.

When the inverse filter application process is completed on all the N blocks of the visible-ray image 15 before correction input from the visible-ray image input unit 21, the completed mage is output as a visible-ray image 17 after correction.

Through this process, the visible-ray image 17 after correction from which the blur is removed or reduced from the visible-ray image 15 before correction is generated and output.

Next, a sequence of a process performed by the image processing device corresponding to "(A) basic configuration example" illustrated in FIG. 7 will be described with reference to the flowchart illustrated in FIG. 8.

Note that the process in accordance with the flowchart illustrated in FIG. 8 is, for example, a process that can be performed in accordance with a program stored in a storage unit of the image processing device and can be performed under the control of a control unit (data processing unit) including a CPU that has a program execution function.

Hereinafter, a process of each step of the flow illustrated in FIG. 8 will be described sequentially.

(Step S101)

In step S101, the visible-ray image which is a correction target is first acquired. This process is performed by the visible-ray image input unit 21 in the image processing device illustrated in FIG. 7. Specifically, for example, this process is a process of acquiring an image photographed by a visible-ray image photographing camera.

(Step S102)

Subsequently, in step S102, the far-infrared-ray image to be used as a reference image is acquired.

This process is performed by the far-infrared-ray image input unit 22 in the image processing device illustrated in FIG. 7. Specifically, for example, this process is a process of acquiring an image photographed by a far-infrared-ray image photographing camera.

Note that the visible-ray image and the far-infrared-ray image acquired in steps S101 and S102 are images obtained by simultaneously photographing the same subject. These images are, for example, images photographed in the darkness. In the visible-ray image, blur is produced due to long-time exposure. On the other hand, the far-infrared-ray image is a short-time exposure image and is an image in which blur rarely exists.

(Step S103)

Subsequently, processes from step S103 to step S110 are a loop process (loop 1) sequentially performed repeatedly on all the blocks which are divided regions set in the visible-ray image and the far-infrared-ray image.

Note that the number of blocks is assumed to be N.

(Step S104)

Subsequently, processes from step S104 to step S108 are a loop process (loop 2) sequentially performed repeatedly on all the filter IDs associated with all the filters stored in the filter bank 35.

(Step S105)

In step S105, the filter (coefficient) is acquired.

The processes of steps S105 to S106 are processes performed by the filter processing unit 31 of the blur estimation unit 30 illustrated in FIG. 7. The filter processing unit 31 sequentially acquires the filter (the blur production filter) applied to each block of the far-infrared-ray image from the filter bank 35.

Note that data sequentially acquired from the filter bank 35 may be either the filter or the filter coefficient which is filter constitution data.

(Step S106)

Subsequently, in step S106, the filter acquired in step S105 is applied to one block of the far-infrared-ray image, that is, a block currently selected as a processing target. This process is filter processing performed to produce blur in the far-infrared-ray image intentionally.

(Step S107)

Subsequently, in step S107, the correlation value between the block of the far-infrared-ray image of the filter application result in step S106 and the block corresponding to the visible-ray image is calculated.

This process is a process performed by the correlation calculation unit 32 of the blur estimation unit 30 illustrated in FIG. 7.

The correlation calculation unit 32 calculates correlation between the visible-ray image and the far-infrared-ray image in which the blur is intentionally produced by applying the filter.

(Step S108)

Step S108 is an ending position of loop 2 of steps S104 to S108.

That is, the processes of steps S105 to S107 are sequentially performed repeatedly on all the filter IDs associated with all the filters stored in the filter bank 35.

(Step S109)

When the processes of loop 2 of steps S102 to S108 on one block are completed, the process proceeds to step S109.

That is, when the process of calculating the correlation values corresponding to all the filters stored in the filter bank 35 is completed on one block, the process proceeds to step S109.

The process of step S109 is a process performed by the filter decision unit 33 of the blur estimation unit 30 illustrated in FIG. 7.

In step S109, the filter decision unit 33 selects the ID of the filter with the highest correlation value among the correlation values corresponding to all the filters stored in the filter bank 35 on the block for which the processes of loop 2 of steps S104 to S108 are completed.

(Step S110)

Step S110 is an ending position of loop 1 of steps S103 to S110.

That is, the processes of steps S104 to S109 are sequentially performed repeatedly on all the blocks which are the divided regions set in the visible-ray image and the far-infrared-ray image.

When the loop process (loop 1) is completed, the filter ID of the filter with the highest correlation value is determined in all the N blocks.

(Step S111)

Subsequently, processes from step S111 to step S114 are a loop process (loop 3) sequentially performed repeatedly on all the blocks which are the divided regions set in the visible-ray image and the far-infrared-ray image.

Note that the number of blocks is assumed to be N.

(Step S112)

The processes of steps S112 and S113 are processes performed by the inverse filter processing unit 41 of the blur removing unit 40 illustrated in FIG. 7.

In step S112, the inverse filter processing unit 41 receives input of the filter ID of the filter with the maximum correlation value associated with the block selected as a processing target from the filter decision unit 33 of the blur estimation unit 30 and selects the inverse filter (coefficient) having the inverse characteristics to the characteristics of the filter with the filter ID from the inverse filter bank 45 on the basis of the filter ID.

Note that data acquired from the inverse filter bank 45 may be either the filter or the filter coefficient which is filter constitution data.

(Step S113)

Subsequently, in step S113, the inverse filter processing unit 41 of the blur removing unit 40 applies the inverse filter acquired in step S112 to the blocks of the visible-ray image which is a processing target.

(Step S114)

Step S114 is an ending position of loop 3 of steps S111 to S114.

That is, the processes of steps S112 and S113 are sequentially performed repeatedly on all the blocks which are the divided regions set in the visible-ray image which is a correction target image.

When the process of applying the inverse filter to all the N blocks of the visible-ray image is completed, the completed image is output as a visible-ray image after correction.

Through this process, the blur is removed or reduced from the visible-ray image which is an input image in step S101, that is, the visible-ray image 15 before correction illustrated in FIG. 7, to generate and output the visible-ray image 17 after correction illustrated in FIG. 7.

4. (Embodiment 2) (A+B) Configuration and Process of Image Processing Device that Performs Preprocessing Before Blur Estimation Next, a specific configuration and a specific process of an image processing device that has the configuration (A+B) described with reference to FIG. 4, that is, a configuration in which preprocessing is performed before blur estimation in addition to the basic configuration (A), will be described as Embodiment 2 of the image processing device according to an embodiment of the present disclosure.

Note that, as described above with reference to FIG. 4, preprocessing before blur estimation in the addition configuration of the configuration (A+B) is specifically any one of the following processes, for example:

(1) a process of generating a gradient image of each of the visible-ray image and the far-infrared-ray image;

(2) a process of generating a band-limited image of each of the visible-ray image and the far-infrared-ray image;

(3) a process of generating a pseudo far-infrared-ray image from the visible-ray image; and (4) a process of generating a pseudo visible-ray image from the far-infrared-ray image. Any one of these processes is performed to perform the blur estimation using an image after the preprocessing.

A configuration example of the image processing device that has a configuration in which any one of the four kinds of preprocessing is performed will be described with reference to FIG. 9 and the subsequent drawings.

First, (1) the process of generating a gradient image of each of the visible-ray image and the far-infrared-ray image and a configuration example of the image processing device performing the process will be described as the preprocessing with reference to FIG. 9.

An image processing device AB1 or 20-AB1 illustrated in FIG. 9 has a configuration in which the gradient image generation unit 51 generates a gradient image of each of the visible-ray image and the far-infrared-ray image as the preprocessing of the blur estimation process in the blur estimation unit 30.

The image processing device AB1 or 20-AB1 illustrated in FIG. 9 has a configuration in which the gradient image generation unit 51 is added to the image processing device A or 20-A illustrated in FIG. 7 described above, and the other remaining configuration is the same as that of the image processing device A or 20-A illustrated in FIG. 7.

A process performed by the gradient image generation unit 51 will be described.

The gradient image generation unit 51 performs a process of alleviating a difference in visibility between the visible-ray image 15 before correction and the far-infrared-ray image 16 input by the visible-ray image input unit 21 and the far-infrared-ray image input unit 22.

For example, the visible-ray image 15 before correction is a color image formed by RGB pixels and the far-infrared-ray image 16 is a monochrome image formed by grayscale pixels in accordance with heat.

The correlation calculation unit 32 of the blur estimation unit 30 performs a process of calculating correlation of block units between the visible-ray image and the far-infrared image. In this way, when correlation values are obtained by comparing images in which output pixel values are substantially different, a possibility of correct correlation values not being obtainable increases.

The gradient image generation unit 51 performs preprocessing to solve this problem.

That is, the gradient image generation unit 51 performs a process of alleviating the difference in visibility between the visible-ray image 15 before correction and the far-infrared-ray image 16 input by the visible-ray image input unit 21 and the far-infrared-ray image input unit 22 and converting the images into images formed by similar pixel values.

A specific example of the process performed by the gradient image generation unit 51 will be described with reference to FIG. 10.

FIG. 10 illustrates an example of a process of generating gradient images for a (1a) visible-ray image and a (2a) far-infrared-ray image obtained by photographing the same subject in the darkness.

Note that the (1a) visible-ray image is originally a color image, but is simplified herein as a monochrome image, which will be described as an example.

In the (1a) visible-ray image, blur occurs. In the (2a) far-infrared-ray image, no blur occurs.

The gradient image is an image in which a pixel value is set in accordance with magnitude of a gradient (change) in the pixel value. For example, the gradient image is an image in which a region with a large gradient (change) of a pixel value is set to be close to white and a region with a small gradient (change) of a pixel value is set to be close to black.

In the (1a) visible-ray image and the (2a) far-infrared-ray image, a boundary portion between a human region and a background region is a region with a large change in a pixel value.

Accordingly, both a (1b) visible-ray gradient image generated through the process of generating a gradient image for the (1a) visible-ray image and a (2b) a far-infrared-ray gradient image generated through the process of generating a gradient image for the (2a) far-infrared-ray image are gradient images in which a boundary portion between a human region and a background region is set to be close to white and the other regions, that is, regions with small changes in pixel values, are set to be close to black.

Note that a gradient image can be generated through filter calculation in which a filter with a predetermined filter coefficient is applied.

In this way, the gradient image generation unit 51 performs a process of causing output pixel configurations of two images to be similar or identical to each other by converting a visible-ray image and a far-infrared-ray image having different configurations of output pixel values into gradient images.

As illustrated in FIG. 9, the gradient image generation unit 51 receives input of the generated visible-ray gradient image and the far-infrared-ray image to the blur estimation unit 30.

The visible-ray gradient image generated by the gradient image generation unit 51 is input to the correlation calculation unit 32 and the far-infrared-ray gradient image is input to the filter processing unit 31.

The filter processing unit 31 of the blur estimation unit 30 generates the far-infrared-ray gradient image in which blur is produced intentionally by sequentially applying various filters (blur production filters) stored in the filter bank 35 to the far-infrared-ray gradient image generated on the basis of the far-infrared-ray image 16, and then outputs the far-infrared-ray gradient image to the correlation calculation unit 32.

The correlation calculation unit 32 receives input of the following two gradient images and performs a correlation value calculation process in the block unit:

(visible-ray gradient image): a visible-ray gradient image generated when the gradient image generation unit 51 performs the gradient image generation process based on the visible-ray image 15 before correction; and (far-infrared-ray gradient image): a far-infrared-ray gradient image in which blur is produced intentionally by applying the filters in the filter processing unit 31 to the far-infrared-ray gradient image generated when the gradient image generation unit 51 performs the gradient image generation process based on the far-infrared-ray image 16.

The correlation calculation unit 32 receives input of the following two gradient images and performs a correlation value calculation process in the block unit.

The two gradient images are set such that output pixel values are similar and it is easy to calculate correct correlation values, compared to the original input images.

The correlation calculation unit 32 calculates correlation between the visible-ray gradient image generated on the basis of the visible-ray image 15 before correction and a result obtained by sequentially applying the various filters (the blur production filters) stored in the filter bank 35 to each of the N blocks of the far-infrared-ray gradient image and outputs a correlation value corresponding to each filter for each of the N blocks to the filter decision unit 33 along with the filter ID.

The subsequent process is the same process as the process performed by the image processing device A or 20-A that has (basic configuration A) described above with reference to FIG. 7.

Subsequently, (2) the process of generating a band-limited image of each of the visible-ray image and the far-infrared-ray image and a configuration example of the image processing device performing the process will be described as the preprocessing with reference to FIG. 11.

An image processing device AB2 or 20-AB2 illustrated in FIG. 11 has a configuration in which a band-limited image generation unit 52 generates a band-limited image of each of the visible-ray image and the far-infrared-ray image as the preprocessing of the blur estimation process in the blur estimation unit 30.

The image processing device AB2 or 20-AB2 illustrated in FIG. 11 has a configuration in which the band-limited image generation unit 52 is added to the image processing device A or 20-A illustrated in FIG. 7 described above, and the other remaining configuration is the same as that of the image processing device A or 20-A illustrated in FIG. 7.

A process performed by the band-limited image generation unit 52 will be described.

The band-limited image generation unit 52 performs a process of generating a band-limited image as the process of alleviating a difference in visibility between the visible-ray image 15 before correction and the far-infrared-ray image 16 input by the visible-ray image input unit 21 and the far-infrared-ray image input unit 22.

A specific example of the process performed by the band-limited image generation unit 52 will be described with reference to FIG. 12.

FIG. 12 illustrates an example of a process of generating band-limited images for the (1a) visible-ray image and the (2a) far-infrared-ray image obtained by photographing the same subject in the darkness.

Note that the (1a) visible-ray image is originally a color image, but is simplified herein as a monochrome image, which will be described as an example.

In the (1a) visible-ray image, blur occurs. In the (2a) far-infrared-ray image, no blur occurs.

The band-limited image is an image generated by performing a process of converting a high-band portion in which there is no image, that is, a region with a large change in a pixel value such as texture, into a low-band region with a small change in a pixel value. For example, the pattern of a human cloth is displayed in the (1a) visible-ray image illustrated in FIG. 12, but the shape portion is a pixel region with a large change in the pixel value, that is, a high-band portion.

By performing a band limitation process, it is possible to generate an image in which the shape of the cloth or the like disappears as a result of the conversion from the high-band portion into the low-band portion.

The shape of the cloth or the like is output to the visible-ray image, but is not output to a far-infrared-ray image in which temperature information is set with output pixel values.

Accordingly, in a case in which the correlation calculation is performed in the correlation calculation unit 32 of the blur estimation unit 30, information regarding the shape or the like is interference in calculation of a correct correlation value.

To solve this problem, the band-limited image generation unit 52 performs a process of generating a band-limited image as a process of alleviating the difference in visibility between the visible-ray image 15 before correction and the far-infrared-ray image 16 input by the visible-ray image input unit 21 and the far-infrared-ray image input unit 22.

As illustrated in FIG. 12, both a (1b) visible-ray band-limited image generated through the process of generating a band-limited image for the (1a) visible-ray image and a (2b) a far-infrared-ray band-limited image generated through the process of generating a band-limited image for the (2a) far-infrared-ray image are images in which the visibility is similar without outputting the shape of the cloth. Note that a band-limited image can be generated through filter calculation in which a filter with a predetermined filter coefficient is applied.

In this way, the band-limited image generation unit 52 performs a process of causing output pixel configurations of two images to be similar or identical to each other by converting a visible-ray image and a far-infrared-ray image having different configurations of output pixel values into band-limited images.

As illustrated in FIG. 11, the band-limited image generation unit 52 inputs the generated visible-ray band-limited image and the far-infrared-ray band-limited image to the blur estimation unit 30.

The visible-ray band-limited image generated by the band-limited image generation unit 52 is input to the correlation calculation unit 32 and the far-infrared-ray band-limited image is input to the filter processing unit 31.

The filter processing unit 31 of the blur estimation unit 30 generates the far-infrared-ray band-limited image in which blur is produced intentionally by sequentially applying various filters (blur production filters) stored in the filter bank 35 to the far-infrared-ray band-limited image generated on the basis of the far-infrared-ray image 16, and then outputs the far-infrared-ray band-limited image to the correlation calculation unit 32.

The correlation calculation unit 32 receives input of the following two band-limited images and performs a correlation value calculation process in the block unit: (visible-ray band-limited image): the visible-ray band-limited image generated when the band-limited image generation unit 52 performs the band-limited image generation process based on the visible-ray image 15 before correction; and (far-infrared-ray band-limited image): the far-infrared-ray band-limited image in which blur is produced intentionally by applying the filters in the filter processing unit 31 to the far-infrared-ray band-limited image generated when the band-limited image generation unit 52 performs the band-limited image generation process based on the far-infrared-ray image 16.

The correlation calculation unit 32 receives input of the following two band-limited images and performs a correlation value calculation process in the block unit.

The two band-limited images are set such that output pixel values are similar and it is easy to calculate correct correlation values, compared to the original input images.

The correlation calculation unit 32 calculates correlation between the visible-ray band-limited image generated on the basis of the visible-ray image 15 before correction and a result obtained by sequentially applying the various filters (the blur production filters) stored in the filter bank 35 to each of the N blocks of the far-infrared-ray band-limited image and outputs a correlation value corresponding to each filter for each of the N blocks to the filter decision unit 33 along with the filter ID.

The subsequent process is the same process as the process performed by the image processing device A or 20-A that has (basic configuration A) described above with reference to FIG. 7.

Subsequently, (3) the process of generating a pseudo far-infrared-ray image from the visible-ray image and a configuration example of the image processing device performing the process will be described as the preprocessing with reference to FIG. 13.

An image processing device AB3 or 20-AB3 illustrated in FIG. 13 has a configuration in which a pseudo far-infrared-ray image generation unit 53 generates a pseudo far-infrared-ray image based on the visible-ray image 15 before correction input from the visible-ray image input unit 21 as the preprocessing of the blur estimation process in the blur estimation unit 30.

The image processing device AB3 or 20-AB3 illustrated in FIG. 13 has a configuration in which the pseudo far-infrared-ray image generation unit 53 is added to the image processing device A or 20-A illustrated in FIG. 7 described above, and the other remaining configuration is the same as that of the image processing device A or 20-A illustrated in FIG. 7.

A process performed by the pseudo far-infrared-ray image generation unit 53 will be described.

The pseudo far-infrared-ray image generation unit 53 performs a process of converting the visible-ray image 15 before correction into a pseudo far-infrared-ray image, as the process of alleviating a difference in visibility between the visible-ray image 15 before correction and the far-infrared-ray image 16 input by the visible-ray image input unit 21 and the far-infrared-ray image input unit 22.

In the image conversion process, for example, machine learning data generated in advance is used.

Specifically, many image pairs of the visible-ray images and the far-infrared-ray images obtained by simultaneously photographing the same subject in the darkness are prepared. A conversion function of whether the visible-ray image approaches the far-infrared-ray image set as the pair when certain image conversion is performed on the visible-ray image is calculated through a machine learning process.

Through the learning process, for example, a round shape with a skin color in a visible-ray image is a human face and, for example, a process of converting pixel values of the visible-ray image into pixel values of a far-infrared-ray image corresponding to human temperature can be performed.

The pseudo far-infrared-ray image generation unit 53 performs image conversion on the visible-ray image 15 before correction input from the visible-ray image input unit 21 using the learning data to generate a pseudo far-infrared-ray image.

As illustrated in FIG. 13, the pseudo far-infrared-ray image generation unit 53 receives input of the pseudo far-infrared-ray image generated on the basis of the visible-ray image 15 before correction to the correlation calculation unit 32 of the blur estimation unit 30.

The correlation calculation unit 32 receives input of the following two images and performs the correlation value calculation process in the block unit:

(pseudo far-infrared-ray image): a pseudo far-infrared-ray image generated when the pseudo far-infrared-ray image generation unit 53 performs a process of generating a pseudo far-infrared-ray image based on the visible-ray image 15 before correction; and (far-infrared-ray image) a far-infrared-ray image in which the filter processing unit 31 produces blur intentionally by applying the filters in the far-infrared-ray image 16.

The correlation calculation unit 32 receives input of the following two images and performs a correlation value calculation process in the block unit.

The two images are set such that output pixel values are similar and it is easy to calculate correct correlation values, compared to the original input images.

The correlation calculation unit 32 calculates correlation between the pseudo far-infrared-ray image generated on the basis of the visible-ray image 15 before correction and a result obtained by sequentially applying the various filters (the blur production filters) stored in the filter bank 35 to each of the N blocks of the far-infrared-ray image 16 and outputs a correlation value corresponding to each filter for each of the N blocks to the filter decision unit 33 along with the filter ID.

The subsequent process is the same process as the process performed by the image processing device A or 20-A that has (basic configuration A) described above with reference to FIG. 7.

Subsequently, (4) the process of generating a pseudo visible-ray image from the far-infrared-ray image and a configuration example of the image processing device performing the process will be described as the preprocessing with reference to FIG. 14.

An image processing device AB4 or 20-AB4 illustrated in FIG. 14 has a configuration in which a pseudo visible-ray image generation unit 54 generates a pseudo visible-ray image based on the far-infrared-ray image 16 input from the far-infrared-ray image input unit 22 as the preprocessing of the blur estimation process in the blur estimation unit 30.

The image processing device AB4 or 20-AB4 illustrated in FIG. 14 has a configuration in which the pseudo visible-ray image generation unit 54 is added to the image processing device A or 20-A illustrated in FIG. 7 described above, and the other remaining configuration is the same as that of the image processing device A or 20-A illustrated in FIG. 7.

A process performed by the pseudo visible-ray image generation unit 54 will be described.

The pseudo visible-ray image generation unit 54 performs a process of converting the far-infrared-ray image 16 into a pseudo visible-ray image as the process of alleviating a difference in visibility between the visible-ray image 15 before correction and the far-infrared-ray image 16 input by the visible-ray image input unit 21 and the far-infrared-ray image input unit 22.

In the image conversion process, for example, machine learning data generated in advance is used.

Specifically, many image pairs of the visible-ray images and the far-infrared-ray images obtained by simultaneously photographing the same subject in the darkness are prepared. A conversion function of whether the far-infrared-ray image approaches the visible-ray image set as the pair when certain image conversion is performed on the far-infrared-ray image is calculated through a machine learning process.

The pseudo visible-ray image generation unit 54 performs image conversion on the far-infrared-ray image 16 input from the far-infrared-ray image input unit 22 using the learning data to generate a pseudo visible-ray image.

As illustrated in FIG. 14, the pseudo visible-ray image generation unit 54 receives input of the pseudo visible-ray image generated on the basis of the far-infrared-ray image 16 to the filter processing unit 31 of the blur estimation unit 30.

The filter processing unit 31 generates the pseudo visible-ray image in which blur is produced intentionally by sequentially applying various filters (blur production filters) stored in the filter bank 35 to the pseudo visible-ray image generated on the basis of the far-infrared-ray image 16, and then outputs the pseudo visible-ray image to the correlation calculation unit 32.

The correlation calculation unit 32 receives input of the following two images and performs a correlation value calculation process in the block unit:

(visible-ray image 15 before correction) the visible-ray image 15 before correction input from the visible-ray image input unit 21; and (pseudo visible-ray image) the pseudo visible-ray image in which blur is produced intentionally by applying the filters in the filter processing unit 31 to the pseudo visible-ray image generated on the basis of the far-infrared-ray image 16 by the pseudo visible-ray image generation unit 54.

The correlation calculation unit 32 receives input of the following two images and performs a correlation value calculation process in the block unit.

The two images are set such that output pixel values are similar and it is easy to calculate correct correlation values, compared to the original input images.

The correlation calculation unit 32 calculates correlation between the visible-ray image 15 before correction and a result obtained by sequentially applying the various filters (the blur production filters) stored in the filter bank 35 to each of the N blocks of the pseudo visible-ray image generated on the basis of the far-infrared image 16 and outputs a correlation value corresponding to each filter for each of the N blocks to the filter decision unit 33 along with the filter ID.

The subsequent process is the same process as the process performed by the image processing device A or 20-A that has (basic configuration A) described above with reference to FIG. 7.

As described with reference to FIGS. 9 to 14, any one of the following processes is performed as the preprocessing before the blur estimation in the addition configuration of the configuration (A+B):

(1) the process of generating a gradient image of each of the visible-ray image and the far-infrared-ray image (FIG. 9);

(2) the process of generating a band-limited image of each of the visible-ray image and the far-infrared-ray image (FIG. 11);

(3) the process of generating a pseudo far-infrared-ray image from the visible-ray image (FIG. 13); and (4) the process of generating a pseudo visible-ray image from the far-infrared-ray image (FIG. 14).

Any one of these processes is performed to perform the blur estimation using an image after the preprocessing.

Sequences of processes performed by the image processing device that performs the preprocessing before the blur estimation will be described with reference to the flowcharts illustrated in FIGS. 15 and 16.

The flowchart illustrated in FIG. 15 is a flowchart in a case in which one of (1) and (2) the following processes is performed as the preprocessing.

(1) the process of generating a gradient image of each of the visible-ray image and the far-infrared-ray image (FIG. 9); and (2) the process of generating a band-limited image of each of the visible-ray image and the far-infrared-ray image (FIG. 11).

The flowchart illustrated in FIG. 16 is a flowchart in a case in which one of (3) and (4) the following processes is performed as the preprocessing.

(3) the process of generating a pseudo far-infrared-ray image from the visible-ray image (FIG. 13); and (4) the process of generating a pseudo visible-ray image from the far-infrared-ray image (FIG. 14).

First, the flowchart in the case in which one of (1) and (2) the following processes is performed will be described with reference to the flowchart illustrated in FIG. 15.

(1) the process of generating a gradient image of each of the visible-ray image and the far-infrared-ray image (FIG. 9); and (2) the process of generating a band-limited image of each of the visible-ray image and the far-infrared-ray image (FIG. 11).

The flowchart illustrated in FIG. 15 is a flowchart in which processes of steps S101b and S102b are added to the processes of steps S101 to S114 of the process flow performed by the image processing device corresponding to "(A) basic configuration example" of FIG. 7 described above with reference to FIG. 8.

Since the processes other than steps S101b and S102b which are the added processes are the same as the processes of steps S101 to S114 of the flow described with reference to FIG. 8, the description thereof will be omitted. Only the processes of steps S101b and S102b which are the added processes will be described.

(Step S101b)

The process of step S101b is preprocessing on the visible-ray image which is a correction target input in step S101.

The preprocessing is performed by the gradient image generation unit 51 described with reference to FIG. 9 or the band-limited image generation unit 52 described with reference to FIG. 11.

In step S101, the visible-ray image which is a correction target is acquired.

The process is performed by the visible-ray image input unit 21 of the image processing device. Specifically, the process is, for example, a process of acquiring an image photographed by a visible-ray image photographing camera.

In step S101b, the gradient image or the band-limited image of the visible-ray image input in step S101 is generated.

In the process of calculating the correlation value in the block unit performed in step S103 and the subsequent steps, a process of calculating the correlation value using the gradient image or the band-limited image of the visible-ray image is performed.

(Step S102b)

The process of step S102b is preprocessing on the far-infrared-ray image input in step S102.

The preprocessing is performed by the gradient image generation unit 51 described with reference to FIG. 9 or the band-limited image generation unit 52 described with reference to FIG. 11.

In step S102, the far-infrared-ray image which is a reference image is acquired.

The process is performed by the far-infrared-ray image input unit 22 of the image processing device. Specifically, the process is, for example, a process of acquiring an image photographed by a far-infrared-ray image photographing camera.

In step S102b, the gradient image or the band-limited image of the far-infrared-ray image input in step S102 is generated.

Note that in a case in which the gradient image of the visible-ray image is generated in step S101b, the gradient image of the far-infrared-ray image is generated in step S102b.

In addition, in a case in which the band-limited image of the visible-ray image is generated in step S101b, the band-limited image of the far-infrared-ray image is generated in step S102b.

In the filter application process and the correlation value calculation process in the block unit performed in step S103 and the subsequent steps, any one of the following processes is performed:

the filter application process and the correlation value calculation process using the gradient image of the visible-ray image and the far-infrared-ray image; and the filter application process and the correlation value calculation process using the band-limited image of the visible-ray image and the far-infrared-ray image.

Next, the flowchart in the case in which one of (3) and (4) the following processes is performed will be described with reference to the flowchart illustrated in FIG. 16.

(3) the process of generating a pseudo far-infrared-ray image from the visible-ray image (FIG. 13); and (4) the process of generating a pseudo visible-ray image from the far-infrared-ray image (FIG. 14).

The flowchart illustrated in FIG. 16 is a flowchart in which processes of steps S101c and S102c are added to the processes of steps S101 to S114 of the process flow performed by the image processing device corresponding to "(A) basic configuration example" of FIG. 7 described above with reference to FIG. 8.

Note that in a case in which (3) the process of generating a pseudo far-infrared-ray image from the visible-ray image (FIG. 13) is performed as the preprocessing of the blur estimation, the process of step S101c is performed as an added process and the process of step S102c is not performed.

On the other hand, in a case in which (4) the process of generating a pseudo visible-ray image from the far-infrared-ray image (FIG. 14) is performed as the preprocessing of the blur estimation, the process of step S101c is not performed and the process of step S102c is performed as an added process.

Since the processes other than steps S101c and S102c which are the added processes are the same as the processes of steps S101 to S114 of the flow described with reference to FIG. 8, the description thereof will be omitted. Only the processes of steps S101c and S102c which are the added processes will be described.

(Step S101c)

The process of step S101c is preprocessing on the visible-ray image which is a correction target input in step S101.

The preprocessing is performed by the pseudo far-infrared-ray image generation unit 53 described with reference to FIG. 13.

In step S101, the visible-ray image which is a correction target is acquired.

The process is performed by the visible-ray image input unit 21 of the image processing device. Specifically, the process is, for example, a process of acquiring an image photographed by a visible-ray image photographing camera.

In step S101c, the pseudo far-infrared-ray image is generated on the basis of the visible-ray image input in step S101.

As described above with reference to FIG. 13, the pseudo far-infrared-ray image based on the visible-ray image is generated using, for example, learning data generated in advance.

In the process of calculating the correlation value in the block unit performed in step S103 and the subsequent steps, a process of calculating the correlation value using the pseudo far-infrared-ray image generated on the basis of the visible-ray image is performed.

That is, in step S107, correlation calculation between the pseudo far-infrared-ray image generated in step S101c and the filter application result of the far-infrared-ray image input in step S102 is performed.

(Step S102c)

The process of step S102c is preprocessing on the far-infrared-ray image input in step S102.

The preprocessing is performed by the pseudo visible-ray image generation unit 54 described with reference to FIG. 14.

In step S102, the far-infrared-ray image which is a reference image is acquired.

The process is performed by the far-infrared-ray image input unit 22 of the image processing device. Specifically, the process is, for example, a process of acquiring an image photographed by a far-infrared-ray image photographing camera.

In step S102c, the pseudo visible-ray image is generated on the basis of the far-infrared-ray image input in step S102.

As described above with reference to FIG. 14, the pseudo visible-ray image based on the far-infrared-ray image is generated using, for example, learning data generated in advance.

In the filter application process and the process of calculating the correlation value in the block unit performed in step S103 and the subsequent steps, a filter application process and a correlation value calculation process are performed using the pseudo visible-ray image.

That is, in step S106, the filter application process is performed on the pseudo visible-ray image generated in step S102c. In addition, in step S107, correlation calculation of the filter application results of the visible-ray image input in step S101 and the pseudo visible-ray image generated in step S102c is performed.

In this way, the "image processing device performing the preprocessing before the blur estimation according to Example 2 (A+B)" performs the preprocessing before the bur estimation, that is, one of the kinds of following preprocessing and performs the blur estimation using the image after the preprocessing:

(1) the process of generating a gradient image of each of the visible-ray image and the far-infrared-ray image;

(2) the process of generating a band-limited image of each of the visible-ray image and the far-infrared-ray image;

(3) the process of generating a pseudo far-infrared-ray image from the visible-ray image; and (4) the process of generating a pseudo visible-ray image from the far-infrared-ray image.

By performing the preprocessing, the difference in visibility between the visible-ray image 15 before correction and the far-infrared-ray image 16 is alleviated, the correlation value calculation based on an image formed by pseudo pixel values can be performed, and correlation value calculation with higher precision is performed. A blur removing effect of the finally generated visible-ray image 17 after correction is further improved.

5. (Embodiment 3) (A+C) Configuration and Process of Image Processing Device that Calculates Reliability of Blur Estimation Result and Performs Blur Removing Process in Accordance with Reliability Next, a specific configuration and a specific process of an image processing device that has the configuration (A+C) described with reference to FIG. 4, that is, a configuration in which reliability of a blur estimation result estimated by the blur estimation unit 30 is calculated and a blur removing process in accordance with the reliability is performed in addition to the basic configuration (A), will be described as Embodiment 3 of the image processing device according to an embodiment of the present disclosure.

Note that, as described above with reference to FIG. 4, there are the following two configurations as configurations for a reliability application process of the blur estimation result which are added configurations in the configuration (A+C):

(1) the configuration in which reliability is calculated on the basis of a correlation value between the blurry visible-ray image and a result of filter processing for a blurless far-infrared-ray image, which is performed at the time of the blur estimation process of step S20, and a filter application level at the time of the blur removing process of step S40 is adjusted in accordance with the calculated reliability; and (2) the configuration in which reliability based on validity of a filter applied to a process of filtering the blurless far-infrared-ray image, which is performed to calculate a correlation value between a blurry visible-ray image and a result of filter processing for a blurless far-infrared-ray image, which is performed at the time of the blur estimation process of step S20, is calculated and a filter application level at the time of the blur removing process of step S40 is adjusted in accordance with the calculated reliability.

There are the two kinds of reliability calculation configurations.

A configuration example of the image processing device that has a configuration to perform the foregoing two kinds of reliability calculation processes will be described in sequence with reference to FIG. 17 and the subsequent drawings.

First, a configuration and a process of the image processing device that has the reliability calculation process, (1) the configuration in which reliability is calculated on the basis of a correlation value between the blurry visible-ray image and a result of filter processing for a blurless far-infrared-ray image, which is performed at the time of the blur estimation process of step S20, and a filter application level at the time of the blur removing process of step S40 is adjusted in accordance with the calculated reliability, will be described with reference to FIG. 17.

An image processing device AC1 or 20-AC1 illustrated in FIG. 17 includes a reliability calculation unit 34a in the blur estimation unit 30 and further includes an inverse filter correction unit 42 in the blur removing unit 40.

The image processing device AC1 or 20-AC1 illustrated in FIG. 17 has a configuration in which the reliability calculation unit 34a and the inverse filter correction unit 42 are added to the image processing device A or 20-A illustrated in FIG. 7 described above. The other remaining configuration is the same as that of the image processing device A or 20-A illustrated in FIG. 7.

Processes performed by the reliability calculation unit 34a and the inverse filter correction unit 42 will be described.

The reliability calculation unit 34a calculates reliability based on a correlation value calculated by the correlation calculation unit 32 of the blur estimation unit 30, that is, reliability based on the correlation value between the blurry visible-ray image and a filter processing result of the blurless far-infrared-ray image.

The reliability calculation unit 34a outputs the calculated correlation value reliability to the inverse filter correction unit 42 of the blur removing unit 40.

The inverse filter correction unit 42 adjusts strength of an inverse filter to be applied in the inverse filter processing unit 41 in accordance with the correlation value reliability input from the reliability calculation unit 34a.

For example, in a case in which the correlation value reliability input from the reliability calculation unit 34a is high, a coefficient set in the inverse filter acquired from the inverse filter bank 45 is used without change without weakening the strength of the inverse filter to be applied in the inverse filter processing unit 41. That is, the inverse filter acquired from the inverse filter bank 45 is applied to a processing target block of the visible-ray image 15 before correction without change.

Conversely, in a case in which the correlation value reliability input from the reliability calculation unit 34a is low, the strength of the inverse filter to be applied in the inverse filter processing unit 41 is weakened. That is, the coefficient set in the inverse filter acquired from the inverse filter bank 45 is adjusted to reduce an application effect of the inverse filter.

Specifically, for example, in a case in which the correlation value reliability calculated by the reliability calculation unit 34a is set in the range of a correlation value reliability $\alpha=1$ (high reliability) to 0 (low reliability), the inverse filter correction unit 42 generates a correction inverse filter by multiplying the coefficient set in the inverse filter acquired from the inverse filter bank 45 by the reliability $\alpha$ and outputs the correction inverse filter to the inverse filter processing unit 41.

The inverse filter processing unit 41 applies the correction inverse filter input from the inverse filter correction unit 42 to the processing target block of the visible-ray image 15 before correction.

Note that the correlation calculation in the correlation calculation unit 32 of the blur estimation unit 30 is performed in the block unit, and the reliability calculation process in the reliability calculation unit 34a, an inverse filter correction process in the inverse filter correction unit 42, and an inverse filter application process in the inverse filter processing unit 41 are also performed as processes in the block unit.

A specific calculation processing example of the correlation value reliability performed by the reliability calculation unit 34a will be described with reference to FIG. 18.

FIG. 18 illustrates the following drawings:
(a1) a visible-ray image before correction;
(a2) a correlation value calculation block of a visible-ray image before correction;
(b1) a far-infrared-ray image;
(b2) a correlation value calculation block of a far-infrared-ray image before filter application; and
(b3) a correlation value calculation block of a far-infrared-ray image after filter application.

Input images are the following images:
(a1) the visible-ray image before correction; and
(b1) the far-infrared-ray image.

The (b2) the correlation value calculation block of the far-infrared-ray image before filter application is input to the filter processing unit of the blur estimation unit 30 and filter processing is performed with a filter selected from the filter bank 35.

The filter result is (b3) the correlation value calculation block of the far-infrared-ray image after filter application.

Blocks which are the correlation value calculation targets of the correlation calculation in the correlation calculation unit 32 of the blur estimation unit 30 are the following two blocks:
(a2) the correlation value calculation block of the visible-ray image before correction; and
(b3) the correlation value calculation block of the far-infrared-ray image after filter application.

In the example illustrated in FIG. 18, a horizontally brightly shining image appears in a block shown in (a1) the visible-ray image before correction or (a2) the correlation value calculation block of the visible-ray image before correction.

Conversely, such a horizontal image is not seen in (b1) the far-infrared-ray image, (b2) the correlation value calculation block of the far-infrared-ray image before filter application, and (b3) the correlation value calculation block of the far-infrared-ray image after filter application.

This phenomenon is a phenomenon occurring in a case in which the horizontally brightly shining subject is a subject that does not much heat.

The correlation calculation unit 32 of the blur estimation unit 30 calculates a correlation value of the following two blocks:

(a2) the correlation value calculation block of the visible-ray image before correction; and (b3) the correlation value calculation block of the far-infrared-ray image after filter application.

However, since similarity between these two blocks is low, the correlation value is a considerably low value.

In this way, in a case in which the correlation value calculated by the correlation calculation unit 32 of the blur estimation unit 30 is a low value, the reliability calculation unit 34a sets the correlation value reliability to a low value.

For example, in a case in which the correlation value reliability calculated by the reliability calculation unit 34a is set in the range of the correlation value reliability α=1 (high reliability) to 0 (low reliability), the reliability calculation unit 34a sets the correlation value reliability to a low value of the correlation value reliability α=about 0 to 0.1 and outputs the low value to the inverse filter correction unit 42.

The inverse filter correction unit 42 generates a correction inverse filter by multiplying the coefficient set in the inverse filter acquired from the inverse filter bank 45 by the reliability a and outputs the correction inverse filter to the inverse filter processing unit 41.

The inverse filter processing unit 41 applies the correction inverse filter input from the inverse filter correction unit 42 to the processing target block of the visible-ray image 15 before correction.

As a result, the application effect of the inverse filter in the block in which the low correlation value of the reliability is set is suppressed to be low.

In contrast, the application effect of the inverse filter to a block in which a high correlation value of the reliability is set is set to be high.

In this way, in the embodiment, the inverse filter application process in accordance with the reliability of the correlation value calculated in the correlation calculation unit 32 is realized, it is possible to perform the process in which the application effect of the inverse filter is increased in a block with a high correlation value and the application effect of the inverse filter is suppressed to be low in a block with a low correlation value reliability, and it is possible to perform an effective blur resolving process in accordance with the correlation value reliability.

Next, a configuration and a process of the image processing device that has the reliability calculation configuration, (2) the configuration in which reliability based on validity of a filter applied to a process of filtering the blurless far-infrared-ray image, which is performed to calculate a correlation value between a blurry visible-ray image and a result of filter processing for a blurless far-infrared-ray image, which is performed at the time of the blur estimation process of step S20, is calculated and a filter application level at the time of the blur removing process of step S40 is adjusted in accordance with the calculated reliability, will be described with reference to FIG. 19.

An image processing device AC2 or 20-AC2 illustrated in FIG. 19 includes a reliability calculation unit 34b in the blur estimation unit 30 and further includes the inverse filter correction unit 42 in the blur removing unit 40.

The image processing device AC2 or 20-AC2 illustrated in FIG. 19 has a configuration in which the reliability calculation unit 34b and the inverse filter correction unit 42 are added to the image processing device A or 20-A illustrated in FIG. 7 described above. The other remaining configuration is the same as that of the image processing device A or 20-A illustrated in FIG. 7.

Processes performed by the reliability calculation unit 34b and the inverse filter correction unit 42 will be described.

The reliability calculation unit 34b calculates reliability based on validity of the filter applied to the far-infrared-ray image after the filter processing used for the correlation calculation process in the correlation calculation unit 32 of the blur estimation unit 30.

The reliability calculation unit 34b outputs the calculated filter validity reliability to the inverse filter correction unit 42 of the blur removing unit 40.

The inverse filter correction unit 42 adjusts strength of an inverse filter to be applied in the inverse filter processing unit 41 in accordance with the filter validity reliability input from the reliability calculation unit 34b.

For example, in a case in which the filter validity reliability input from the reliability calculation unit 34b is high, a coefficient set in the inverse filter acquired from the inverse filter bank 45 is used without change without weakening the strength of the inverse filter to be applied in the inverse filter processing unit 41. That is, the inverse filter acquired from the inverse filter bank 45 is applied to a processing target block of the visible-ray image 15 before correction without change.

Conversely, in a case in which the filter validity reliability input from the reliability calculation unit 34b is low, the strength of the inverse filter to be applied in the inverse filter processing unit 41 is weakened. That is, the coefficient set in the inverse filter acquired from the inverse filter bank 45 is adjusted to reduce an application effect of the inverse filter.

Specifically, for example, in a case in which the filter validity reliability calculated by the reliability calculation unit 34b is set in the range of a filter validity reliability α=1 (high reliability) to 0 (low reliability), the inverse filter correction unit 42 generates a correction inverse filter by multiplying the coefficient set in the inverse filter acquired from the inverse filter bank 45 by the reliability α and outputs the correction inverse filter to the inverse filter processing unit 41.

The inverse filter processing unit 41 applies the correction inverse filter input from the inverse filter correction unit 42 to the processing target block of the visible-ray image 15 before correction.

Note that the correlation calculation in the correlation calculation unit 32 of the blur estimation unit 30 is performed in the block unit, and the reliability calculation process in the reliability calculation unit 34b, an inverse filter correction process in the inverse filter correction unit 42, and an inverse filter application process in the inverse filter processing unit 41 are also performed as processes in the block unit.

A specific calculation processing example of the correlation value reliability performed by the reliability calculation unit 34b will be described with reference to FIG. 20.

FIG. 20 illustrates the following drawings:

(a1) the visible-ray image before correction;

(a2) the correlation value calculation block of the visible-ray image before correction;

(b1) the far-infrared-ray image;

(b2) the correlation value calculation block of the far-infrared-ray image before filter application;

(b3) a correlation value calculation block of a far-infrared-ray image after filter application; and (b4) a correlation value calculation block of a far-infrared-ray image after filter application with a maximum correlation value.

Input images are the following images:

(a1) the visible-ray image before correction; and (b1) the far-infrared-ray image.

The (b2) the correlation value calculation block of the far-infrared-ray image before filter application is input to the filter processing unit of the blur estimation unit 30 and filter processing is performed with a filter selected from the filter bank 35. The filter result is (b3) the correlation value calculation block of the far-infrared-ray image after filter application.

Blocks which are the correlation value calculation targets of the correlation calculation in the correlation calculation unit 32 of the blur estimation unit 30 are the following two blocks:

(a2) the correlation value calculation block of the visible-ray image before correction; and (b3) the correlation value calculation block of the far-infrared-ray image after filter application.

A block selected as a correlation value calculation block of the far-infrared-ray image after filter application having the maximum correlation value as a result of the correlation value calculation process through the correlation calculation in the correlation calculation unit 32 of the blur estimation unit 30 is:

(b4) the correlation value calculation block of the far-infrared-ray image after filter application with the maximum correlation value.

In the example illustrated in FIG. 20, a processing target block of the correlation value calculation process through the correlation calculation in the correlation calculation unit 32 of the blur estimation unit 30 is an indicator, as illustrated in the block shown in (a1) the visible-ray image before correction. This indicator is painted with a pattern of an X mark and a heat generation portion is further set in the middle of the indicator.

In this case, in (b1) the far-infrared-ray image or (b2) the correlation value calculation block of the far-infrared-ray image before filter application, a region of the heat generation portion of the middle of the indicator is output as a round image, but the shape of the X mark is not output consequently.

In the filter processing unit 31 of the blur estimation unit 30, the filters stored in the filter bank 35 are sequentially applied to (b2) the correlation value calculation block of the far-infrared-ray image before filter application and are output to the correlation calculation unit 32.

The correlation calculation unit 32 calculates a correlation value of the following two blocks:

(a2) the correlation value calculation block of the visible-ray image before correction; and (b3) the correlation value calculation block of the far-infrared-ray image after filter application obtained consequently by applying various filters.

Then, (b3) the correlation value calculation block of the far-infrared-ray image after filter application with the maximum correlation value is selected and the correlation value is calculated.

The selection result is, as illustrated in the drawing:

(b4) the correlation value calculation block of the far-infrared-ray image after filter application with the maximum correlation value.

A filter applied to generate (b4) the correlation value calculation block of the far-infrared-ray image after filter application with the maximum correlation value is a filter F1 illustrated in FIG. 20.

The reliability calculation unit 34b calculates the reliability based on validity of the filter F1 applied to generate (b4) the correlation value calculation block of the far-infrared-ray image after filter application with the maximum correlation value.

The filter F1 is a filter that generates blur flowing in lines crossing at right angles in two directions and is a form of blur which may not exist from a natural motion of a subject or a natural motion of a camera.

Normally, since a motion of a subject or a camera is a motion along one line, blur is produced along the line.

From this point, the filter F1 illustrated in FIG. 20 is determined to have low reliability as a filter that produces blur assumed to be normal.

In this way, the reliability calculation unit 34b determines that the reliability of the filter is low, for example, in a case in which a filter that has lines in a plurality of lines illustrated in FIG. 20 is applied to a maximum calculation value calculation block.

Conversely, the reliability calculation unit 34b determines that the reliability of the filter is high, for example, in a case in which a filter that has a line in one direction is applied to the maximum calculation value calculation block.

For example, in a case in which the filter validity reliability calculated by the reliability calculation unit 34b is set in the range of the filter validity reliability $\alpha=1$ (high reliability) to 0 (low reliability) and a case in which the filter that has the lines in the plurality of directions illustrated in FIG. 20 is applied to the maximum correlation value calculation block, the reliability calculation unit 34b sets the filter validity reliability to a low value of the filter validity reliability $\alpha=$about 0 to 0.1 and outputs the low value to the inverse filter correction unit 42.

The inverse filter correction unit 42 generates a correction inverse filter by multiplying the coefficient set in the inverse filter acquired from the inverse filter bank 45 by the reliability $\alpha$ and outputs the correction inverse filter to the inverse filter processing unit 41.

The inverse filter processing unit 41 applies the correction inverse filter input from the inverse filter correction unit 42 to the processing target block of the visible-ray image 15 before correction.

As a result, the application effect of the inverse filter in the block in which the filter validity reliability is low is suppressed to be low.

In contrast, the application effect of the inverse filter to a block in which a filter validity reliability is high is set to be high.

In this way, in the embodiment, the inverse filter application process in accordance with the filter validity reliability applied to the far-infrared image is realized, it is possible to perform the process in which the application effect of the inverse filter is increased in a block with high filter validity and the application effect of the inverse filter is suppressed to be low in a block with a low filter validity reliability, and it is possible to perform an effective blur resolving process in accordance with the filter validity reliability.

Next, a process sequence in the image processing device that calculates reliability of the blur estimation result and performs the blur removing process in accordance with reliability in Embodiment 3 described with reference to FIGS. 17 to 20, that is, the configuration (A+C), will be described with reference to FIG. 21.

The flowchart illustrated in FIG. 21 is a flowchart in which processes of steps S109b and S112b are added to the processes of steps S101 to S114 of the process flow performed by the image processing device corresponding to "(A) basic configuration example" of FIG. 7 described above with reference to FIG. 8.

Since the processes other than steps S109b and S112b which are the added processes are the same as the processes of steps S101 to S114 of the flow described with reference to FIG. 8, the description thereof will be omitted. Only the processes of steps S109b and S112b which are the added processes will be described.

(Step S109b)

Step S109 is a process of calculating reliability of the blur estimation result performed by the blur estimation unit 30 on the basis of the correlation value or the filter validity.

The process of step S109b is a process performed by the reliability calculation unit 34a of the blur estimation unit 30 described with reference to FIGS. 17 and 18 or the reliability calculation unit 34b of the blur estimation unit 30 described with reference to FIGS. 19 and 20.

In the configuration in which the image processing device AC1 or 20-AC1 illustrated in FIG. 17, the reliability calculation unit 34a calculates the reliability based on the correlation value calculated by the correlation calculation unit 32 of the blur estimation unit 30, that is, the correlation value between the blurry visible-ray image and the filter processing result of the blurless far-infrared-ray image.

First, as described with reference to FIG. 18, the correlation calculation unit 32 of the blur estimation unit 30 calculates a correlation value of, for example, the two blocks illustrated in FIG. 18, that is, the following two blocks:

(a2) the correlation value calculation block of the visible-ray image before correction; and (b3) the correlation value calculation block of the far-infrared-ray image after filter application.

In the example illustrated in FIG. 18, since similarity of the two blocks is low, the correlation value is a considerably low value.

In this way, in a case in which the correlation value calculated by the correlation calculation unit 32 of the blur estimation unit 30 is a low value, the reliability calculation unit 34a sets the correlation value reliability to a low value.

For example, in a case in which the correlation value reliability calculated by the reliability calculation unit 34a is set in the range of the correlation value reliability α=1 (high reliability) to 0 (low reliability), the reliability calculation unit 34a sets the correlation value reliability to a low value of the correlation value reliability α=about 0 to 0.1 and outputs the low value to the inverse filter correction unit 42.

In contrast, in a case in which the similarity of the two blocks is high, the correlation value is a high value. Then, the reliability calculation unit 34a sets the correlation value reliability to a high value and outputs the high value to the inverse filter correction unit 42.

In this way, in the configuration in which the image processing device AC1 or 20-AC1 illustrated in FIG. 17, the reliability calculation unit 34a calculates the reliability based on the correlation value calculated by the correlation calculation unit 32 of the blur estimation unit 30, that is, the correlation value between the blurry visible-ray image and the filter processing result of the blurless far-infrared-ray image.

Note that the reliability calculation process is a process performed in loop 1 of the flow and is repeatedly performed in the block unit.

That is, the reliability calculation unit 34a calculates the correlation value reliability in the block unit based on the correlation value in the block unit calculated by the correlation calculation unit 32 of the blur estimation unit 30, that is, the correlation value in the block unit between the filter processing result of the blurless far-infrared-ray image and the blurry visible-ray image.

Next, a process of step S109b in the case of the configuration in which the image processing device AC2 or 20-AC2 illustrated in FIG. 19 is used will be described.

In the configuration in which the image processing device AC2 or 20-AC2 illustrated in FIG. 19, the reliability calculation unit 34b calculates the reliability based on the validity of the filter applied to the far-infrared-ray image after the filter application used for the correlation calculation process in the correlation calculation unit 32 of the blur estimation unit 30.

As described above with reference to FIG. 20, the reliability calculation unit 34b calculates the reliability based on validity of the filter F1 applied to generate "(b4) the correlation value calculation block of the far-infrared-ray image after filter application with the maximum correlation value", as illustrated in FIG. 20.

For example, in a case in which the filter producing blur along the lines in the plurality of directions illustrated in FIG. 20 is applied to the maximum correlation value calculation block, the reliability of the filter is determined to be low.

Conversely, in which the filter producing blur along a line in one direction is applied to the maximum calculation value calculation block, the reliability of the filter is determined to be high.

In this way, the reliability calculation unit 34b calculates the reliability based on the validity of the filter applied to the far-infrared-ray image after the filter process used for the correlation calculation process in the correlation calculation unit 32 of the blur estimation unit 30.

For example, in a case in which the filter validity reliability calculated by the reliability calculation unit 34b is set in the range of the filter validity reliability α=1 (high reliability) to 0 (low reliability) and a case in which the filter that has the lines in the plurality of directions illustrated in FIG. 20 is applied to the maximum correlation value calculation block, the reliability calculation unit 34b sets the filter validity reliability to a low value of the filter validity reliability α=about 0 to 0.1 and outputs the low value to the inverse filter correction unit 42.

In contrast, for example, in a case in which the filter that has a line in one direction is applied to the maximum correlation value calculation block, the reliability calculation unit 34b sets the filter validity reliability to a high value and outputs the high value to the inverse filter correction unit 42.

In this way, in the configuration in which the image processing device AC2 or 20-AC2 illustrated in FIG. 19, the reliability calculation unit 34b calculates the reliability based on the validity of the filter applied to the far-infrared-ray image after the filter application used for the correlation calculation process in the correlation calculation unit 32 of the blur estimation unit 30.

Note that the reliability calculation process is a process performed in loop 1 of the flow and is repeatedly performed in the block unit.

(Step S112b)

Next, a process of step S112b which is a process of one further added step of the flow illustrated in FIG. 21 will be described.

Step S112b is a process performed in the inverse filter correction unit 42 of the blur removing unit 40 illustrated in FIGS. 17 and 19.

In the configuration illustrated in FIG. 17, the inverse filter correction unit 42 adjusts the strength of the inverse filter to be applied in the inverse filter processing unit 41 in accordance with the correlation value reliability which is blur estimation result reliability input from the reliability calculation unit 34a.

In addition, in the configuration illustrated in FIG. 19, the inverse filter correction unit 42 adjusts the strength of the inverse filter to be applied in the inverse filter processing unit 41 in accordance with the filter validity reliability which is blur estimation result reliability input from the reliability calculation unit 34b.

For example, in a case in which the correlation value reliability or the filter validity reliability which is the blur estimation result reliability input from the reliability calculation unit 34a or the reliability calculation unit 34b is high, the coefficient set in the inverse filter acquired from the inverse filter bank 45 is used without change without the strength of the inverse filter to be applied in the inverse filter processing unit 41. That is, the inverse filter acquired from the inverse filter bank 45 is applied to the processing target block of the visible-ray image 15 before correction without change.

Conversely, in a case in which the correlation value reliability or the filter validity reliability which is the blur estimation result reliability input from the reliability calculation unit 34a or the reliability calculation unit 34b is low, the strength of the inverse filter to be applied in the inverse filter processing unit 41 is weakened. That is, the coefficient set in the inverse filter acquired from the inverse filter bank 45 is adjusted to reduce an application effect of the inverse filter.

In this way, "(Embodiment 3) (A+C) the image processing device that calculates the reliability of the blur estimation result and performs the blur removing process in accordance with the reliability" calculates any one of the following reliabilities as the reliability of the blur estimation result and performs a process of adjusting the application effect of the inverse filter in accordance with the reliability of the blur estimation result:
the correlation value reliability calculated by the correlation calculation unit 32; and the validity reliability of the filter applied to the far-infrared-ray image.

It is possible to perform the process in which the application effect of the inverse filter is increased in the block with the high reliability of the blur estimation result and the application effect of the inverse filter is suppressed to be low in the block with the low reliability of the blur estimation result, and it is possible to perform the optimum blur removing process in accordance with the reliability of the blur estimation result.

6. (Embodiment 4) Process of Image Processing Device Realizing all of Basic Configuration (A)+Preprocessing (B)+Blur Removing Processes (C) in Accordance with Reliability Next, a process of an image processing device that realizes all of the basic configuration (A)+the preprocessing (B)+the blur removing process (C) in accordance with the reliability will be described as Embodiment 4 of the image processing device according to an embodiment of the present disclosure.

Embodiment 4 is the configuration (A+B+C) described above with reference to FIG. 4, that is, a configuration example in which both processes, "(B) the preprocessing before the blur estimation" and "(C) the blur removing process in accordance with the reliability by calculating the reliability of the blur estimation result," are performed in addition to the process of the basic configuration (A).

The configuration of an image processing device is, for example, a combination configuration of any one of the configurations of FIGS. 9, 11, 13, and 14 of the image processing device corresponding to the configuration (A+B) for performing "(B) the preprocessing before the blur estimation" described above as Embodiment 2 and any one of the configurations of FIGS. 17 and 19 of the image processing device corresponding to the configuration (A+C) for performing "(C) the blur removing process in accordance with the reliability by calculating the reliability of the blur estimation result" described above as Embodiment 3.

A process flow is a combination flow of any one of the process flows illustrated in FIGS. 15 and 16 which are the process flows for performing "(B) the preprocessing before the blur estimation" described above as Embodiment 2 and the process flow illustrated in FIG. 21 which is the process flow for performing "(C) the blur removing process in accordance with the reliability by calculating the reliability of the blur estimation result" described above as Embodiment 3.

Flowcharts for describing a process sequence of Embodiment 4 are illustrated in FIGS. 22 and 23.

The flowchart illustrated in FIG. 22 is a combination flow of the process flow illustrated in FIG. 15 which is the process flow for performing "(B) the preprocessing before the blur estimation" described above as Embodiment 2 and the process flow illustrated in FIG. 21 which is the process flow for performing "(C) the blur removing process in accordance with the reliability by calculating the reliability of the blur estimation result" described above as Embodiment 3.

The flow illustrated in FIG. 22 is a flow in which the following processes are added to the processes of step S101 to S114 of the process flow performed by the image processing device corresponding to "(A) basic configuration example" of FIG. 7 described above with reference to FIG. 8:

(added process 1) the processes of steps S101b and S102b which are process steps performed by the image processing device with the (A+B) configuration for performing "(B) the preprocessing before the blur estimation" described with reference to FIG. 15; and (added process 2) the processes of steps S109b and S112b which are process steps performed by the image processing device with the (A+C) configuration for performing "(C) the blur removing process in accordance with the reliability by calculating the reliability of the blur estimation result" described with reference to FIG. 21.

Since the specific process of each step has been described above, the description thereof will be described.

Further, the flowchart illustrated in FIG. 23 is a combination flow of the process flow illustrated in FIG. 16 which is the process flow for performing "(B) the preprocessing before the blur estimation" described above as Embodiment 2 and the process flow illustrated in FIG. 21 which is the process flow for performing "(C) the blur removing process in accordance with the reliability by calculating the reliability of the blur estimation result" described above as Embodiment 3.

The flow illustrated in FIG. 23 is a flow in which the following processes are added to the processes of step S101 to S114 of the process flow performed by the image processing device corresponding to "(A) basic configuration example" of FIG. 7 described above with reference to FIG. 8:

(added process 1) the processes of steps S101c and S102c which are process steps performed by the image processing device with the (A+B) configuration for performing "(B) the preprocessing before the blur estimation" described with reference to FIG. 16; and (added process 2) the processes of steps S109b and S112b which are process steps performed by the image processing device with the (A+C) configuration for performing "(C) the blur removing process in accordance with the reliability by calculating the reliability of the blur estimation result" described with reference to FIG. 21.

Since the specific process of each step has been described above, the description thereof will be described.

Embodiment 4 is a configuration in which the two processes, the preprocessing before the blur estimation described above in Embodiment 2 and the blur removing process in accordance with the reliability by calculating the reliability of the blur estimation result according to Embodiment 3, are performed in conjunction.

By performing the preprocessing, the difference in visibility between the visible-ray image 15 before correction and the far-infrared-ray image 16 is alleviated, the correlation value calculation based on an image formed by pseudo pixel values can be performed, and correlation value calculation with higher precision is performed. A blur removing effect of the finally generated visible-ray image 17 after correction is further improved.

In addition, by calculating the reliability of the blur estimation result and performing the blur removing process in accordance with the reliability, it is possible to perform the optimum blur removing process in accordance with the reliability of the blur estimation result.

7. Hardware Configuration Example of Image Processing Device

Next, a hardware configuration example of the image processing device will be described with reference to FIG. 24.

FIG. 24 is a diagram illustrating a hardware configuration example of the image processing device performing the process according to an embodiment of the present disclosure.

A central processing unit (CPU) 81 functions as a control unit or a data processing unit that performs various processes in accordance with a program stored in a read-only memory (ROM) 82 or a storage unit 88. For example, a process is performed in accordance with the sequence described in the above-described embodiment. A random access memory (RAM) 83 stores, for example, data or a program to be executed by the CPU 81. The CPU 81, the ROM 82, and the RAM 83 are connected to each other by a bus 84.

The CPU 81 is connected to an input and output interface 85 via the bus 84. An input unit 86 that inputs an image photographed by an imaging unit 95 formed of a visible-ray camera, a (far)-infrared-ray camera, or the like and is various switches, a keyboard, a mouse, a microphone, or the like capable of performing a user input, and an output unit 87 that performs data output to a display unit 96, a speaker, or the like are connected to the input and output interface 85. The CPU 81 performs various processes in response to instructions input from the input unit 86 and outputs processing results to, for example, the output unit 87.

The storage unit 88 connected to the input and output interface 85 is formed of, for example, a hard disk and stores various kinds of data and programs to be executed by the CPU 81. The communication unit 89 functions as a transmission and reception unit for Wi-Fi communication, Bluetooth (registered trademark) (BT) communication, and other data communication via a network such as the Internet or a local area network and communicates with an external device.

A drive 90 connected to the input and output interface 85 drives a removable medium 91 such as a magnetic disk, an optical disc, a magneto-optical disc, or a semiconductor memory such as a memory card and performs data recording or reading.

8. Configuration Example of Vehicle Control System Including Image Processing Device According to Present Disclosure in Vehicle Next, one configuration example of a vehicle control system in which the image processing device according to the above-described present disclosure is provided in a vehicle will be described.

FIG. 25 is a block diagram illustrating a configuration example of a schematic function of a vehicle control system 100 including the image processing device that performs the above-described process.

Note that the image processing device according to the above-described disclosure corresponds to a part of a configuration of an outside information detection unit 141, a data acquisition unit 102, an output control unit 105, and an output unit 106 of a detection unit 131 of the vehicle control system 100 illustrated in FIG. 25.

A process performed by the image processing device according to the above-described present disclosure is performed mainly by the outside information detection unit 141 of the detection unit 131 of the vehicle control system 100 illustrated in FIG. 25.

The data acquisition unit 102 of the vehicle control system 100 illustrated in FIG. 25 includes a visible-ray camera and a (far)-infrared-ray camera and the outside information detection unit 141 receives input of an image photographed by this camera and performs the above-described process.

Note that, for example, a processing result is displayed on a display unit including the output unit 106 of the vehicle control system 100 illustrated in FIG. 25, and the processing result is confirmed by a user (driver).

Hereinafter, a configuration of the vehicle control system 100 illustrated in FIG. 25 will be described.

Note that in a case in which a vehicle in which the vehicle control system 100 is installed is distinguished from other vehicles, the vehicle is referred to as a self-car or a self-vehicle below.

The vehicle control system 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected to each other a communication network 121. For example, the communication network 121 is formed of an in-vehicle network, a bus, or the like conforming to any standard such as Controller Area Network (CAN), Local Interconnect Network (LIN), Local Area Network (LAN), or FlexRay (registered trademark). Note that each unit of the vehicle control system 100 is directly connected without being connected to the communication network 121 in some cases.

Note that in a case in which each unit of the vehicle control system 100 performs communication via the communication network 121, the communication network 121 will not be described below. For example, in a case in which the input unit 101 and the automatic driving control unit 112 perform communication via the communication network 121, it is simply described that the input unit 101 and the automatic driving control unit 112 perform communication.

The input unit 101 includes a device that is used for a passenger to input various kinds of data, instructions, and the like. For example, the input unit 101 includes a manipulation device such as a touch panel, a button, a microphone, a switch, and a lever and a manipulation device capable of performing input in accordance with a method other than a manual manipulation by a sound, a gesture, or the like. In addition, for example, the input unit 101 may be an external connection device such as a remote control device using an infrared ray or other radio waves or a mobile device or a wearable device corresponding to a manipulation on the vehicle control system 100. The input unit 101 generates an input signal on the basis of data, an instruction, or the like input by a passenger and supplies the input signal to each unit of the vehicle control system 100.

The data acquisition unit 102 includes various sensors that acquire data to be used for a process of the vehicle control system 100 and supplies the acquired data to each unit of the vehicle control system 100.

For example, the data acquisition unit 102 includes various sensors that detect a state or the like of the self-car. Specifically, for example, the data acquisition unit 102 includes a gyro sensor, an acceleration sensor, an inertial measurement unit (IMU), and a sensor that detects a manipulation amount of an accelerator pedal, a manipulation amount of a brake pedal, a steering angle of a steering wheel, the number of rotations of an engine, the number of rotations of a motor, a rotation speed of a wheel, or the like.

In addition, for example, the data acquisition unit 102 includes various sensors that detect external information of the self-car. Specifically, for example, the data acquisition unit 102 includes a imaging device such as a time of flight (ToF) camera, a visible-ray camera, a stereo camera, a monocular camera, a (far)-infrared-ray camera, and other cameras. In addition, for example, the data acquisition unit 102 includes an environment sensor that detects weather, an atmospheric condition, or the like and a surrounding information detection sensor that detects an object around the self-car. The environment sensor is formed of, for example, a raindrop sensor, a fog sensor, a sunshine sensor, or a snow sensor. The surrounding information detection sensor is formed of, for example, an ultrasonic sensor, a radar, light detection and ranging or laser imaging detection and ranging (LiDAR), or a sonar.

Further, for example, the data acquisition unit 102 includes various sensors that detect a current position of the self-car. Specifically, for example, the data acquisition unit 102 includes a Global Navigation Satellite System (GNSS) receiver or the like that receives a GNSS signal from a GNSS satellite.

In addition, for example, the data acquisition unit 102 includes various sensors that detect information inside the car. Specifically, for example, the data acquisition unit 102 includes an imaging device that images a driver, a biological sensor that detects biological information of the driver, and a microphone that collects a sound inside the car. The biological sensor is installed in, for example, a surface of a seat or a steering wheel and detects biological information of a passenger who sits on the seat or the driver who grips the steering wheel.

The communication unit 103 performs communication with the in-vehicle device 104 and various devices, a server, a base station, and the like outside the car and transmits data supplied from each unit of the vehicle control system 100 or supplies received data to each unit of the vehicle control system 100. Note that a communication protocol supported by the communication unit 103 is not particularly limited and the communication unit 103 can also support a plurality of kinds of communication protocols.

For example, the communication unit 103 performs wireless communication with the in-vehicle device 104 through a wireless LAN, Bluetooth (registered trademark), Near Field Communication (NFC), wireless USB (WUSB), or the like. In addition, for example, the communication unit 103 performs wired communication with the in-vehicle device 104 via a connection terminal (not illustrated) (and a cable as necessary) through a Universal Serial Bus (USB), a High-Definition Multimedia Interface (HDMI: registered trademark), Mobile High-definition Link (MHL), or the like.

Further, for example, the communication unit 103 performs communication with a device (for example, an application server or a control server) which is on an external network (for example, the Internet, a cloud network, or a network belonging to a service provider) via a base station or an access point. In addition, for example, the communication unit 103 performs communication with a terminal (for example, a pedestrian or store terminal or a machine type communication (MTC) terminal) which is near the self-car using a Peer to Peer (P2P) technology. Further, for example, the communication unit 103 performs V2X communication such as vehicle to vehicle communication, vehicle to infrastructure communication, vehicle to home communication, and vehicle to pedestrian communication. In addition, for example, the communication unit 103 includes a beacon reception unit, receives radio waves or electromagnetic waves sent from a wireless station or the like installed on a road, and acquires information such as a current position, congestion, traffic regulation, an elapsed time.

The in-vehicle device 104 includes, for example, a mobile device or a wearable device carried by a passenger, an information device carried in and mounted on fitted in the self-car, and a navigation device that performs a route searching up to any destination.

The output control unit 105 controls output of various kinds of information regarding a passenger of the self-car or the outside of the car. For example, the output control unit 105 controls output of visual information and auditory information from the output unit 106 by generating an output signal including at least one piece of information between visual information (for example, image data) and auditory information (for example, sound data) and supplying the output signal to the output unit 106. Specifically, for example, the output control unit 105 combines image data imaged by a different imaging device from the data acquisition unit 102, generates a bird's eye image, a panorama image, or the like, and supplies an output signal including the generated image to the output unit 106. In addition, for example, the output control unit 105 generates sound data including a warning sound, a warning message, or the like for a danger such as collision, contact, or entrance to a danger area and supplies an output signal including the generated sound data to the output unit 106.

The output unit 106 includes a device capable of outputting visual information or auditory information of a passenger of the self-car or the outside of the car. For example, the output unit 106 includes a display device, an instrument panel, an audio speaker, a headphone, a wearable device such as a glasses type display worn on a passenger, a projector, and a lamp. The display device included in the output unit 106 may be a device including a normal display and may also be, for example, a device that displays visual information within a field of view of a driver, such as a head-up display, a transmissive display, or a device that has a an augmented reality (AR) display function.

The drive system control unit 107 controls the drive system 108 by generating various control signals and supplying the control signals to the drive system 108. In addition, the drive system control unit 107 supplies a control signal to each unit other than the drive system 108, as necessary, and performs notification of a control state or the like of the drive system 108.

The drive system 108 includes various devices related to the drive system of the self-car. For example, the drive system 108 includes a drive force generation device that generates a drive force of an internal combustion engine, a drive motor, or the like, a drive force transmission mechanism that transmits a drive force to wheels, a steering mechanism that adjusts a rudder angle, a braking device that generates a braking force, an antilock brake system (ABS), an electronic stability control (ESC), and an electric power steering device.

The body system control unit 109 controls the body system 110 by generating various control signals and supplying the control signals to the body system 110. In addition, the body system control unit 109 supplies a control signal to each unit other than the body system 110, as necessary, and performs notification of a control state or the like of the body system 110.

The body system 110 includes various devices of the body system equipped in the car body. For example, the body system 110 includes a keyless entry system, a smart key system, a power window device, a power seat, a steering wheel, an air-conditioning device, and various lamps (for example, a head lamp, a back lamp, a brake lamp, a blinker, and a fog lamp).

The storage unit 111 includes, for example, a read-only memory (ROM), a random access memory (RAM), a magnetic storage device such as a hard disc drive (HDD), a semiconductor storage device, an optical storage device, and a magneto-optical storage device. The storage unit 111 stores data, various programs, and the like to be used by each unit of the vehicle control system 100. For example, the storage device 111 stores map data such as a 3-dimensional high-precision map such as a dynamic map, a global map that is lower than a high-precision map in precision and covers a broad area, and a local map including surrounding information of the self-car.

The automatic driving control unit 112 performs control related to automatic driving such as autonomous traveling or driving assistance. Specifically, for example, the automatic driving control unit 112 performs cooperative control to realize a function of advanced driver assistance system (ADAS) including collision avoidance or shock mitigation of the self-car, following travel based on an inter-vehicle distance, a vehicle speed maintenance travel, a collision warning of the self-car, or a lane deviation warning of the self-car. In addition, for example, the automatic driving control unit 112 performs cooperative control to perform automatic driving or the like in which the vehicle autonomously travels regardless of a manipulation of a driver. The automatic driving control unit 112 includes a detection unit 131, a self-position estimation unit 132, a situation analysis unit 133, a planning unit 134, and an operation control unit 135.

The detection unit 131 detects various kinds of information necessary for control of automatic driving. The detection unit 131 includes an outside information detection unit 141, an inside information detection unit 142, and a vehicle state detection unit 143.

The outside information detection unit 141 performs a process of detecting outside information of the self-car on the basis of data or a signal from each unit of the vehicle control system 100. For example, the outside information detection unit 141 performs processes of detecting, recognizing, and tracking an object around the self-car and a process of detecting a distance up to the object. Examples of a detection target object include a vehicle, a person, an obstacle, a structure, a road, a traffic light, a traffic sign, and a road sign. In addition, for example, the outside information detection unit 141 performs a process of detecting a surrounding environment of the self-car. Examples of a detection target surrounding environment include weather, temperature, humidity, lightness, and a road surface state. The outside information detection unit 141 supplies data indicating a result of the detection process to the self-position estimation unit 132, a map analysis unit 151, a traffic rule recognition unit 152, and a situation recognition unit 153 of the situation analysis unit 133, and an emergency avoidance unit 171 of the operation control unit 135.

The inside information detection unit 142 performs a process of detecting information inside the vehicle on the basis of data or a signal from each unit of the vehicle control system 100. For example, the inside information detection unit 142 performs processes of authenticating and recognizing a driver, a process of detecting a driver state, a process of detecting a passenger, and a process of detecting an environment inside the vehicle. Examples of a detection target driver state include a condition, the degree of awakening, the degree of concentration, the degree of fatigue, and a visual line direction. Examples of a detection target environment inside the vehicle include temperature, humidity, lightness, and nasty smell. The inside information detection unit 142 supplies data indicating a result of the detection result to the situation recognition unit 153 of the situation analysis unit 133, the emergency avoidance unit 171 of the operation control unit 135, and the like.

The vehicle state detection unit 143 performs a process of detecting a self-car state on the basis of data or a signal from each unit of the vehicle control system 100. Examples of a detection target self-car state include a speed, acceleration, a rudder angle, presence or absence and content of abnormality, a driving manipulation state, a position and an inclination of a power seat, a door lock state, and other vehicle device states. The vehicle state detection unit 143 supplies data indicating a result of the detection process to the situation recognition unit 153 of the situation analysis unit 133, the emergency avoidance unit 171 of the operation control unit 135, and the like.

The self-position estimation unit 132 performs a process of estimating a position, an attitude, and the like of the self-car on the basis of data or a signal from each unit of the vehicle control system 100, such as the outside information detection unit 141 and the situation recognition unit 153 of the situation analysis unit 133. In addition, the self-position estimation unit 132 generates a local map to be used to estimate a self-position (hereinafter referred to as a self-position estimation map), as necessary. The self-position estimation map is considered as, for example, a high-precision map in which a technology such as simultaneous localization and mapping (SLAM). The self-position estimation unit 132 supplies data indicating a result of the estimation process to the map analysis unit 151, the traffic rule recognition unit 152, and the situation recognition unit 153 of the situation analysis unit 133. In addition, the self-position estimation unit 132 stores the self-position estimation map in the storage unit 111.

The situation analysis unit 133 performs a process of analyzing a situation of the self-car and the surrounding situation. The situation analysis unit 133 includes the map analysis unit 151, the traffic rule recognition unit 152, the situation recognition unit 153, and a situation prediction unit 154.

The map analysis unit 151 constructs a map including information necessary for an automatic driving process by performing a process of analyzing various maps stored in the storage unit 111 while using data or a signal from each unit of the vehicle control system 100, such as the self-position estimation unit 132 and the outside information detection unit 141, as necessary. The map analysis unit 151 supplies the constructed map to the traffic rule recognition unit 152, the situation recognition unit 153, the situation prediction unit 154, a route planning unit 161, an action planning unit 162, and an operation planning unit 163 of the planning unit 134, and the like.

The traffic rule recognition unit 152 performs a process of recognizing traffic rules around the self-car on the basis of data or a signal from each unit of the vehicle control system 100 such as the self-position estimation unit 132, the outside information detection unit 141, and the map analysis unit 151. Through the recognition process, for example, a position and a state of a signal around the self-car, content of traffic regulation around the self-car, and a lane along which traveling is possible are recognized. The traffic rule recognition unit 152 supplies data indicating a result of the recognition process to the situation prediction unit 154 and the like.

The situation recognition unit 153 performs a process of recognizing a situation related to the self-car on the basis of data or a signal from each unit of the vehicle control system 100, such as the self-position estimation unit 132, the outside information detection unit 141, the inside information detection unit 142, the vehicle state detection unit 143, and the map analysis unit 151. For example, the situation recognition unit 153 performs a process of recognizing a situation of the self-car, a situation around the self-car, a situation of a driver of the self-car, and the like. In addition, the situation recognition unit 153 generates a local map to be used to recognize a situation around the self-car (hereinafter referred to as a situation recognition map), as necessary. The situation recognition map is considered as, for example, an occupancy grid map.

Examples of a recognition target situation of the self-car include a position, an attitude, a movement (for example, a speed, acceleration, or a moving direction) of the self-car and presence or absence and content of abnormality. Examples of a recognition target situation around the self-car include a kind and a position of a surrounding stationary object, a kind, a position, and a movement (for example, a speed, acceleration, or a moving direction) of a surrounding moving body, a configuration and a surface state of a surrounding road, surrounding weather, temperature, humidity, and lightness. Examples of a recognition target driver state include a condition, the degree of awakening, the degree of concentration, the degree of fatigue, a movement of a visual line, and a driving manipulation.

The situation recognition unit 153 supplies data indicating a result (including the situation recognition map, as necessary) of the recognition process to the self-position estimation unit 132, the situation prediction unit 154, and the like. In addition, the situation recognition unit 153 stores the situation recognition map in the storage unit 111.

The situation prediction unit 154 performs a process of predicting a situation related to the self-car on the basis of data or a signal from each unit of the vehicle control system 100, such as the map analysis unit 151, the traffic rule recognition unit 152, and the situation recognition unit 153. For example, the situation prediction unit 154 performs a process of predicting a situation of the self-car, a situation around the self-car, a situation of a driver, and the like.

Examples of a prediction target situation of the self-car include a behavior of the self-car, occurrence of abnormality, and a travelable distance. Examples of a prediction target situation around the self-car include a behavior of a moving body around the self-car, a change in a signal state, and a change in an environment such as weather. Examples of a prediction target situation of a driver include a behavior and a condition of the driver.

The situation prediction unit 154 supplies data indicating a result of the prediction process to the route planning unit 161, the action planning unit 162, and the operation planning unit 163 of the planning unit 134 along with data from the traffic rule recognition unit 152 and the situation recognition unit 153.

The route planning unit 161 plans a route up to a destination on the basis of data or a signal from each unit of the vehicle control system 100, such as the map analysis unit 151 and the situation prediction unit 154. For example, the route planning unit 161 sets a route up to a destination designated from a current position on the basis of a global map. In addition, for example, the route planning unit 161 appropriately changes the route on the basis of a situation such as congestion, accident, traffic regulation, or construction work and a condition or the like of a driver. The route planning unit 161 supplies data or the like indicating the planned route to the action planning unit 162.

The action planning unit 162 plans an action of the self-car so that the self-car can safely travels within a time in which the route planned by the route planning unit 161 is planned on the basis of data or a signal from each unit of the vehicle control system 100, such as the map analysis unit 151 and the situation prediction unit 154. For example, the action planning unit 162 performs planning of departure, stop, a traveling direction (for example, forward movement, backward movement, left turn, right turn, and a change in a direction), a traveling lane, a traveling speed, and passing. The action planning unit 162 supplies data indicating a planned action of the self-car to the operation planning unit 163 and the like.

The operation planning unit 163 plans an operation of the self-car to realize an action planned by the action planning unit 162 on the basis of data or a signal from each unit of the vehicle control system 100, such as the map analysis unit 151 and the situation prediction unit 154. For example, the operation planning unit 163 performs planning of acceleration, deceleration, a traveling track, and the like. The operation planning unit 163 supplies data indicating the planned operation of the self-car to an acceleration and deceleration control unit 172 and a direction control unit 173 of the operation control unit 135 and the like.

The operation control unit 135 performs control of an operation of the self-car. The operation control unit 135 includes an emergency avoidance unit 171, the acceleration and deceleration control unit 172, and the direction control unit 173.

The emergency avoidance unit 171 performs a process of detecting an emergency such as collision, contact, entrance to a danger area, abnormality of a driver, and abnormality of a vehicle on the basis of detection results of the outside information detection unit 141, the inside information detection unit 142, and the vehicle state detection unit 143. In a case in which occurrence of an emergency is detected, the emergency avoidance unit 171 plans an operation of the self-car to avoid an emergency such as sudden stop or steep turn. The emergency avoidance unit 171 supplies data indicating the planned operation of the self-car to the acceleration and deceleration control unit 172, the direction control unit 173, and the like.

The acceleration and deceleration control unit 172 performs acceleration and deceleration control to realize the operation of the self-car planned by the operation planning unit 163 or the emergency avoidance unit 171. For example, the acceleration and deceleration control unit 172 calculates a control target value of a drive force generation device or a braking device to realize planned acceleration or deceleration or sudden stop and supplies a control instruction indicating the calculated control target value to the drive system control unit 107.

The direction control unit 173 performs direction control to realize an operation of the self-car planned by the operation planning unit 163 or the emergency avoidance unit 171. For example, the direction control unit 173 calculates a control target value of a steering mechanism to realize a traveling track or steep turn planned by the operation planning unit 163 or the emergency avoidance unit 171 and supplies a control instruction indicating the calculated control target value to the drive system control unit 107.

9. Summary of Configuration According to Present Disclosure

The foregoing thus provides a detailed explanation of embodiments of the present disclosure with reference to specific embodiments. However, it is obvious that persons skilled in the art may make modifications and substitutions to these embodiments without departing from the gist of the present disclosure. In other words, the present disclosure has been disclosed by way of example, and should not be interpreted in a limited manner. The gist of the present disclosure should be determined in consideration of the claims.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
An image processing device comprising:
image processing circuitry configured to:
receive input of a visible-ray image and a far-infrared-ray image obtained by photographing a same subject;
estimate a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest; and
perform a correction process on the visible-ray image based, at least in part, on the blur estimation result to generate a corrected visible-ray image from which blur is reduced, wherein generating the corrected visible-ray image comprises applying, to the visible ray image, an inverse filter having an inverse characteristic to a characteristic of the selected filter.

(2)
The image processing device according to (1), wherein the image processing circuitry is further configured to select the filter based on applying the filter to a portion of the visible-ray image, and wherein the inverse filter corresponding to the selected filter is applied to a portion of the visible-ray image corresponding to the portion of the far-infrared ray-image to which the selected filter was applied.

(3)
The image processing device according to (1), wherein the image processing circuitry is further configured to sequentially acquire different filters from a filter bank that stores different filters corresponding to point spread functions and apply the different filters to the far-infrared-ray image.

(4)
The image processing device according to (1), wherein the image processing circuitry is further configured to perform preprocessing to improve a precision of the calculation of the correlation prior to estimating the blur estimation result.

(5)
The image processing device according to (4), wherein performing preprocessing comprises generating gradient images of the visible-ray image and the far-infrared-ray image to produce a visible-ray gradient image and far-infrared-ray gradient image, and wherein calculating the correlation between the visible-ray image and each of the plurality of filter-applied far-infrared-ray images comprises calculating the correlation between the visible-ray gradient image and each of a plurality of filter-applied far-infrared-ray images in which a different filter is applied to the far-infrared-ray gradient image.

(6)
The image processing device according to (4), wherein performing preprocessing comprises generating band-limited images of the visible-ray image and the far-infrared-ray image to produce a visible-ray band-limited image and a far-infrared-ray band-limited image, and wherein calculating the correlation between the visible-ray image and each of the plurality of filter-applied far-infrared-ray images comprises calculating the correlation between the visible-ray band-limited image and each of a plurality of filter-applied far-infrared band-limited images in which a different filter is applied to the far-infrared-ray band-limited image.

(7)
The image processing device according to (4), wherein performing preprocessing comprises generating a pseudo far-infrared-ray image based on the visible-ray image, and wherein the image processing circuitry is further configured to calculate a correlation between the pseudo far-infrared-ray image and each of the plurality of the plurality of filter-applied far-infrared-ray images in which a different filter is applied to the far-infrared-ray image.

(8)

The image processing device according to (4), wherein performing preprocessing comprises generating a pseudo visible-ray image based on the far-infrared-ray image, and wherein the image processing circuitry is further configured to calculate a correlation between the visible-ray image and each of the plurality of filter-applied pseudo visible-ray images in which a different filter is applied to the pseudo visible-ray image.

(9)

The image processing device according to (1), wherein the image processing circuitry is further configured to:
  calculate a reliability of the blur estimation result; and
    weaken an application strength of the inverse filter on the visible-ray image in a case in which the reliability of the blur estimation result is less than a first threshold value.

(10)

The image processing device according to (9), wherein the reliability of the blur estimation result is calculated in accordance with a correlation value calculated to correspond to the selected filter such that the reliability is above the first threshold value when the correlation value is above a second threshold value and the reliability is less than the first threshold value when the correlation value is less than the second threshold value.

(11)

The image processing device according to (9), wherein the reliability is calculated based on a validity of the selected filter.

(12)

The image processing device according to (11), wherein calculating the reliability calculation unit comprises setting the reliability to be less than the first threshold value when the selected filter is a filter that produces blur along lines in a plurality of directions, and setting the reliability to be higher than the first threshold value when the selected filter is a filter that produces blur along a line in one direction.

(13)

An image processing method that is performed in an image processing device, the method comprising:
  receiving input of a visible-ray image and a far-infrared-ray image obtained by photographing a same subject;
  estimating a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest; and
  performing a correction process on the visible-ray image based, at least in part, on the blur estimation result to generate a corrected visible-ray image from which the blur is reduced, wherein generating the corrected visible-ray image comprises applying, to the visible ray image, an inverse filter having an inverse characteristic to a characteristic of the selected filter.

(14)

A non-transitory computer readable medium encoded with a plurality of instructions that, when executed by image processing circuitry of an image processing device, perform an image processing method, the image processing method comprising:
  receiving input of a visible-ray image and a far-infrared-ray image obtained by photographing a same subject;
  estimating a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest; and
  performing a correction process on the visible-ray image based, at least in part, on the blur estimation result to generate a corrected visible-ray image from which the blur is reduced, wherein generating the corrected visible-ray image comprises applying, to the visible ray image, an inverse filter having an inverse characteristic to a characteristic of the selected filter.

In addition, the series of processes described in this specification can be executed by hardware, software, or a combination configuration of the hardware and the software. In a case in which a process is executed by software, a program that records a process sequence can be installed in a memory of a computer embedded in dedicated hardware to be executed or a program can be installed in a general-purpose computer capable of executing various processes to be executed. For example, the program can be recorded in advance on a recording medium. In addition to the installation on a computer from a recording medium, the program can also be received via a network such as a Local Area Network (LAN) or the Internet and can be installed on a recording medium such as a built-in hard disk.

Also, various processes described in this specification may be executed chronologically as described above and may also be executed in parallel or individually according to a processing capability of a device executing the processes or as necessary. Note that in this specification, the term "system" refers to a logical aggregate configuration of multiple devices, and the respective devices of the configuration are not limited to being inside the same housing.

INDUSTRIAL APPLICABILITY

As described above, according to a configuration of one embodiment of the present disclosure, it is possible to realize a device and a method of performing high-quality processing to remove or reduce blur of a visible-ray image.

Specifically, the device includes: a blur estimation unit configured to input a visible-ray image and a far-infrared-ray image obtained by simultaneously photographing a same subject and estimate a form of blur of the visible-ray image; and a blur removing unit configured to input a blur estimation result of the blur estimation unit and perform a correction process on the visible-ray image to generate a corrected visible-ray image from which the blur is removed or reduced. The blur estimation unit calculates correlation between the visible-ray image and a filter-applied far-infrared-ray image in which a filter is applied to the far-infrared-ray image and selects a filter in which the correlation is the highest. The blur removing unit generates a corrected visible-ray image from which the blur is removed or reduced by applying an inverse filter having inverse characteristics to the filter selected by the blur estimation unit to the visible-ray image.

Through these processes, it is possible to realize the device and the method of performing high-quality processing to remove or reduce blur of a visible-ray image.

REFERENCE SIGNS LIST 11 blurry visible-ray image
12 blurless far-infrared-ray image
13 blur-reduced visible-ray image 15 visible-ray image before correction
16 far-infrared-ray image
17 visible-ray image after correction
21 visible-ray image input unit
22 far-infrared-ray image input unit
30 blur estimation unit
31 filter processing unit
32 correlation calculation unit
33 filter decision unit
34 reliability calculation unit
40 blur removing unit
41 inverse filter processing unit
42 inverse filter correction unit
35 filter bank
45 filter bank
81 CPU
82 ROM
83 RAM
84 bus
85 input and output interface
86 input unit
87 output unit
88 storage unit
89 communication unit
90 drive
91 removable medium
95 imaging unit (camera)
96 display unit
100 vehicle traveling control device
101 input unit
102 data acquisition unit
103 communication unit
104 in-vehicle device
105 output control unit
106 output unit
107 drive system control unit
108 drive system
109 body system control unit
110 body system
111 storage unit
112 automatic driving control unit
131 detection unit
132 self-position estimation unit
133 situation analysis unit
134 planning unit
135 operation control unit
141 outside information detection unit
142 inside information detection unit
143 vehicle state detection unit
151 map analysis unit
152 traffic rule recognition unit
153 situation recognition unit
154 situation prediction unit
161 route planning unit
162 action planning unit
163 operation planning unit
171 emergency avoidance unit
172 acceleration and deceleration control unit
173 direction control unit
201 display unit

The invention claimed is:

1. An image processing device comprising:
image processing circuitry configured to:
receive input of a visible-ray image and a far-infrared-ray image obtained by photographing a same subject;
estimate a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest; and
perform a correction process on the visible-ray image based, at least in part, on the blur estimation result to generate a corrected visible-ray image from which blur is reduced, wherein generating the corrected visible-ray image comprises applying, to the visible ray image, an inverse filter having an inverse characteristic to a characteristic of the selected filter.

2. The image processing device according to claim 1, wherein the image processing circuitry is further configured to select the filter based on applying the filter to a portion of the visible-ray image, and wherein the inverse filter corresponding to the selected filter is applied to a portion of the visible-ray image corresponding to the portion of the far-infrared ray-image to which the selected filter was applied.

3. The image processing device according to claim 1, wherein the image processing circuity is further configured to sequentially acquire different filters from a filter bank that stores different filters corresponding to point spread functions and apply the different filters to the far-infrared-ray image.

4. The image processing device according to claim 1, wherein the image processing circuitry is further configured to perform preprocessing to improve a precision of the calculation of the correlation prior to estimating the blur estimation result.

5. The image processing device according to claim 4, wherein performing preprocessing comprises generating gradient images of the visible-ray image and the far-infrared-ray image to produce a visible-ray gradient image and far-infrared-ray gradient image, and wherein calculating the correlation between the visible-ray image and each of the plurality of filter-applied far-infrared-ray images comprises calculating the correlation between the visible-ray gradient image and each of a plurality of filter-applied far-infrared-ray images in which a different filter is applied to the far-infrared-ray gradient image.

6. The image processing device according to claim 4, wherein performing preprocessing comprises generating band-limited images of the visible-ray image and the far-infrared-ray image to produce a visible-ray band-limited image and a far-infrared-ray band-limited image, and wherein calculating the correlation between the visible-ray image and each of the plurality of filter-applied far-infrared-ray images comprises calculating the correlation between the visible-ray band-limited image and each of a plurality of filter-applied far-infrared band-limited images in which a different filter is applied to the far-infrared-ray band-limited image.

7. The image processing device according to claim 4, wherein performing preprocessing comprises generating a pseudo far-infrared-ray image based on the visible-ray image, and wherein the image processing circuitry is further configured to calculate a correlation between the pseudo far-infrared-ray image and each of the plurality of the plurality of filter-applied far-infrared-ray images in which a different filter is applied to the far-infrared-ray image.

8. The image processing device according to claim 4, wherein performing preprocessing comprises generating a pseudo visible-ray image based on the far-infrared-ray image, and wherein the image processing circuitry is further configured to calculate a correlation between the visible-ray image and each of the plurality of filter-applied pseudo visible-ray images in which a different filter is applied to the pseudo visible-ray image.

9. The image processing device according to claim 1, wherein the image processing circuitry is further configured to:
- calculate a reliability of the blur estimation result; and
- weaken an application strength of the inverse filter on the visible-ray image in a case in which the reliability of the blur estimation result is less than a first threshold value.

10. The image processing device according to claim 9, wherein the reliability of the blur estimation result is calculated in accordance with a correlation value calculated to correspond to the selected filter such that the reliability is above the first threshold value when the correlation value is above a second threshold value and the reliability is less than the first threshold value when the correlation value is less than the second threshold value.

11. The image processing device according to claim 9, wherein the reliability is calculated based on a validity of the selected filter.

12. The image processing device according to claim 11, wherein calculating the reliability calculation unit comprises setting the reliability to be less than the first threshold value when the selected filter is a filter that produces blur along lines in a plurality of directions, and setting the reliability to be higher than the first threshold value when the selected filter is a filter that produces blur along a line in one direction.

13. An image processing method that is performed in an image processing device, the method comprising:
- receiving input of a visible-ray image and a far-infrared-ray image obtained by photographing a same subject;
- estimating a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest; and
- performing a correction process on the visible-ray image based, at least in part, on the blur estimation result to generate a corrected visible-ray image from which the blur is reduced, wherein generating the corrected visible-ray image comprises applying, to the visible ray image, an inverse filter having an inverse characteristic to a characteristic of the selected filter.

14. A non-transitory computer readable medium encoded with a plurality of instructions that, when executed by image processing circuitry of an image processing device, perform an image processing method, the image processing method comprising:
- receiving input of a visible-ray image and a far-infrared-ray image obtained by photographing a same subject;
- estimating a blur estimation result in the visible-ray image, wherein estimating a blur estimation result comprises calculating a correlation between the visible-ray image and each of a plurality of filter-applied far-infrared ray images in which a different filter is applied to the far-infrared-ray image and selecting the filter for which the calculated correlation is highest; and
- performing a correction process on the visible-ray image based, at least in part, on the blur estimation result to generate a corrected visible-ray image from which the blur is reduced, wherein generating the corrected visible-ray image comprises applying, to the visible ray image, an inverse filter having an inverse characteristic to a characteristic of the selected filter.

* * * * *